US010490106B2

(12) United States Patent
Bergs et al.

(10) Patent No.: US 10,490,106 B2
(45) Date of Patent: Nov. 26, 2019

(54) SYSTEMS, APPARATUSES, AND METHODS FOR PATIENT SIMULATORS

(71) Applicants: Board of Regents, The University of Texas System, Austin, TX (US); ACDET LLC, Fort Worth, TX (US)

(72) Inventors: Richard A. Bergs, Dallas, TX (US); David G. Aldrich; Nicholas T. Papa, Fort Worth, TX (US); Jonathan E. Ruffin, Fort Worth, TX (US); David M. Huitt, Fort Worth, TX (US)

(73) Assignees: Board of Regents, The University of Texas System, Austin, TX (US); ACDET LLC, Fort Worth, TX (US)

( * ) Notice: Subject to any disclaimer, the term of this patent is extended or adjusted under 35 U.S.C. 154(b) by 93 days.

(21) Appl. No.: 15/103,835

(22) PCT Filed: Dec. 15, 2014

(86) PCT No.: PCT/US2014/070417
§ 371 (c)(1),
(2) Date: Jun. 10, 2016

(87) PCT Pub. No.: WO2015/089512
PCT Pub. Date: Jun. 18, 2015

(65) Prior Publication Data
US 2016/0314718 A1     Oct. 27, 2016

Related U.S. Application Data

(60) Provisional application No. 61/915,844, filed on Dec. 13, 2013.

(51) Int. Cl.
*G09B 23/32*     (2006.01)
*G09B 23/30*     (2006.01)
*G09B 23/28*     (2006.01)

(52) U.S. Cl.
CPC ............. *G09B 23/32* (2013.01); *G09B 23/28* (2013.01); *G09B 23/30* (2013.01)

(58) Field of Classification Search
CPC ....................................................... G09B 23/32
See application file for complete search history.

(56) References Cited

U.S. PATENT DOCUMENTS 5,947,743 A * 9/1999 Hasson ................ G09B 23/286
434/262
5,957,694 A * 9/1999 Bunch .................... G09B 23/36
434/262

(Continued)

FOREIGN PATENT DOCUMENTS

CN     202855169 U     4/2013

OTHER PUBLICATIONS

EPO, EPO Supplementary Search Report, Annex, and Written Opinion in EP Application No. EP 14869302.1, Apr. 24, 2017, 7 pages, Munich, Germany.

(Continued)

*Primary Examiner* — Omkar Deodhar
(74) *Attorney, Agent, or Firm* — Thomas | Horstemeyer, LLP

(57) ABSTRACT

Provided herein are systems, methods, and apparatuses for simulating ailments that can be diagnosed by an abdominal palpation exam. Furthermore, provided herein are systems, methods, and apparatuses for analyzing an abdominal palpation exam. An abdominal simulator may include a surface layer, a sensor layer beneath the surface layer, a muscle layer beneath the sensor layer, a tensing layer beneath the muscle layer, an ailment module layer beneath the tensing layer, and a control portion. The abdominal simulator may simulate an ailment that can be diagnosed by an abdominal palpation exam. The abdominal simulator may also detect at least one abdominal palpation that is performed by a user on the (Continued)

abdominal simulator to diagnose the ailment that was simulated by the abdominal simulator. Moreover, the abdominal simulator may determine data for the at least one abdominal palpation that was detected.

20 Claims, 32 Drawing Sheets

(56) References Cited

U.S. PATENT DOCUMENTS

| | | |
|---|---|---|
| 8,108,190 B2 | 1/2012 | Riener et al. |
| 2005/0219205 A1 | 10/2005 | Bailey et al. |
| 2006/0122954 A1 | 6/2006 | Podlasek et al. |
| 2007/0117077 A1 | 5/2007 | Gordon et al. |
| 2008/0138779 A1 | 6/2008 | Eggert et al. |
| 2009/0011394 A1 | 1/2009 | Meglan et al. |
| 2009/0053683 A1 | 2/2009 | Brown et al. |
| 2010/0221689 A1 | 9/2010 | Gomo |
| 2014/0272878 A1* | 9/2014 | Shim .................. G09B 23/30 434/272 |

OTHER PUBLICATIONS

ISA/US, PCT International Search Report, Written Opinion, and Search History in PCT Application No. PCT/US2014/070417, dated Apr. 23, 2015, 18 pages, Alexandria, Virginia, USA.

IPEA/US, PCT International Preliminary Report on Patentability (including Article 34 Amendments) in PCT Application No. PCT/US2014/070417, dated Feb. 19, 2016, 26 pages, Alexandria, Virginia, USA.

* cited by examiner

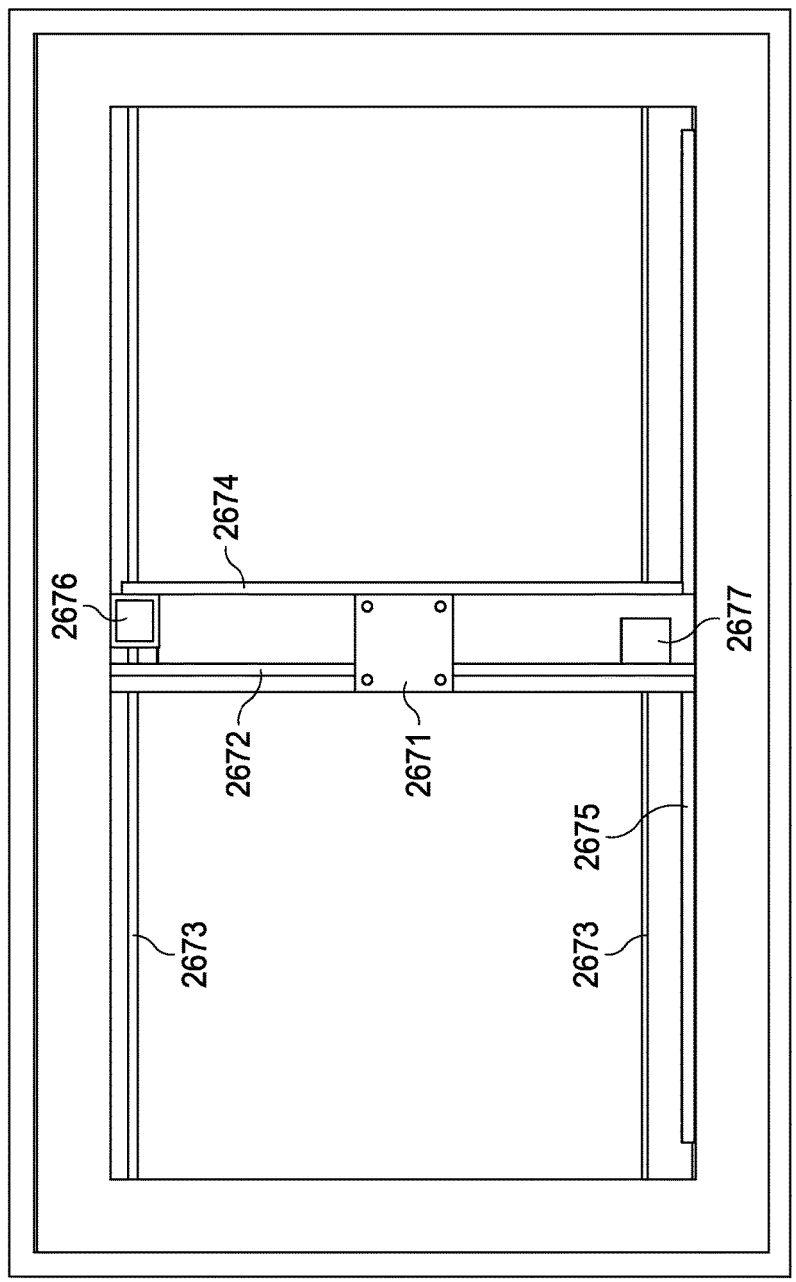
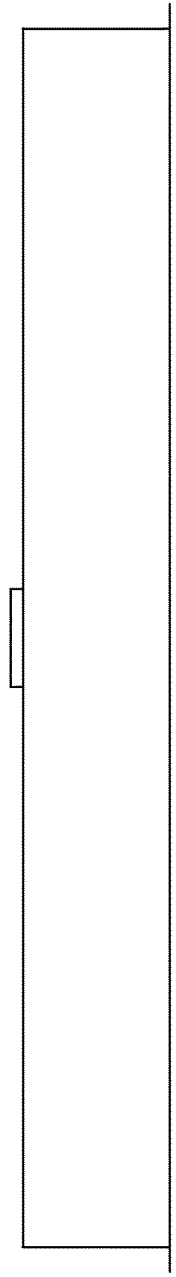
FIG. 26A
FIG. 26B

HX: A 33 year old female presents with abdominal pain for approximately 7 hours. The pain is gradual in onset, moderate, and constant. The patient locates the pain in the periumbilical region. There is no radiation of pain. The onset of the pain is not associated with any particular event. Associated findings: anorexia. Past medical history: unremarkable PE/GENERAL APPEARANCE is unremarkable except for occasional chilling. VITAL SIGNS: Temperature 98.6, Cardiac rate 119, Respiratory rate: 30, and BP: 117/79.

HEENT: normal. CARDIAC exam: normal. RESPIRATORY exam: normal. ABDOMINAL exam: decreased bowel sounds, abdominal distention, and a positive Rovsing's sign.

Unremarkable Abdomen

| No Abnormalities |

Organ Enlargement

| Hepatomegaly | Splenomegaly | Enlarged Urinary Bladder |

Tenderness

| Appendix | Appendix + Guarding | Appendix + Guarding + Pushback |
| Bladder | | Bladder + Pushback |
| Colon | Colon + Guarding | Colon + Guarding + Pushback |
| Gallbladder | Gallbladder + Guarding | Gallbladder + Guarding + Pushback |
| Gastric | | Gastric + Pushback |
| Ovary, Left | Ovary, Left + Guarding | Ovary, Left + Guarding + Pushback |
| Ovary, Right | Ovary, Right + Guarding | Ovary, Right + Guarding + Pushback |
| Pancreas | Pancreas + Guarding | Pancreas + Guarding + Pushback |

FIG. 29

SYSTEMS, APPARATUSES, AND METHODS FOR PATIENT SIMULATORS

CROSS-REFERENCE TO RELATED APPLICATION

This application claims priority to International Application No. PCT/US2014/070417, which application is incorporated herein by reference, which application was filed on Dec. 15, 2014 by the inventors of this application, and which application claims priority to U.S. Provisional Patent Application No. 61/915,844, which application is incorporated herein by reference, and which application was filed on Dec. 13, 2013, by two of the inventors of this application, and incorporated herein by reference.

STATEMENT REGARDING FEDERALLY SPONSORED RESEARCH

NONE.

TECHNICAL FIELD

The present disclosure relates generally to patient simulators, such as abdominal simulators. More particularly, this disclosure relates to patient simulators that are anatomically realistic, provide multi-sensory-modal response, and have functionality for training medical personnel.

BACKGROUND

Medical doctors and medical students oftentimes perform abdominal palpation exams on the abdomens of their patients to diagnose a variety of ailments. During an abdominal palpation exam, a particular medical student may use his hands to apply pressure to an abdomen and then formulate or confirm his diagnosis of the ailment based on what he felt during the abdominal palpation exam.

Typically, human volunteers are used to train and evaluate medical students to perform abdominal palpation exams. The human volunteers are given lab reports and instructions on simulating the ailments they are assigned. The medical students review the lab reports and perform abdominal palpation exams on the human volunteers to try to diagnose the ailments assigned to the human volunteers.

However, human volunteers generally do not have the voluntary muscle control to accurately simulate ailments of the abdomen, such as appendicitis or gall bladder stones. The human volunteers may try to simulate the ailments, but the "feel" of abdominal guarding is typically hard to duplicate. Abdominal guarding is an involuntary response in which abdominal muscles around an inflamed organ (or other inflammation) become tense or tighten, for example, to guard the inflamed organ from the pain of pressure. As an example, a human volunteer may not able to tighten the portion of his abdominal muscles that is directly above his appendix, and instead, the human volunteer may tighten his entire abdomen.

There are other disadvantages to using human volunteers. For example, some human volunteers may be better able to carry out instructions for their ailments than other human volunteers. Human volunteers also need to be found, paid, and trained on their assigned ailments. Legal disclaimers and other forms may also need to be signed by human volunteers.

Human dummies or partial human dummies do not remedy the shortcomings of using human volunteers. For example, in general, a partial human dummy merely illustrates the anatomy of the abdomen and may include a replica of the appendix. However, the partial human dummy will typically not simulate any ailments, such as appendicitis.

There is a need in the art for an improved manner of simulating ailments of the abdomen. Furthermore, there is a need in the art for an improved manner of training and evaluating medical students on how to perform abdominal palpation exams.

SUMMARY

In view of the aforementioned problems and trends, embodiments of the present invention provide systems, methods, and apparatuses pertaining to patient simulators. According to various aspects, there are provided systems comprising one or more of the following components: a simulation portion, a palpation portion, a detection portion, a response portion, a user interface portion, a calculation portion and a control portion. According to various aspects, there are provided systems comprising one or more of the following components: a skin portion, a bone portion, a sensor portion, a muscle portion, a tensing portion, and an organ simulation portion. According to various aspects, there are provided methods comprising one or more of the following steps: simulating an ailment or a state of normal health in a simulated body portion; detecting a palpation performed by a user on the simulated body portion; and responding to the palpation.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIGS. 26A and 26B illustrate a top plan view and a side elevational view, respectively, of an actuator transport device of an abdominal simulator, according to some additional embodiments;

FIG. 29 illustrates an exemplary screen shot of a trainee user interface device for an abdominal simulator.

NOTATION AND NOMENCLATURE

Figure 1:
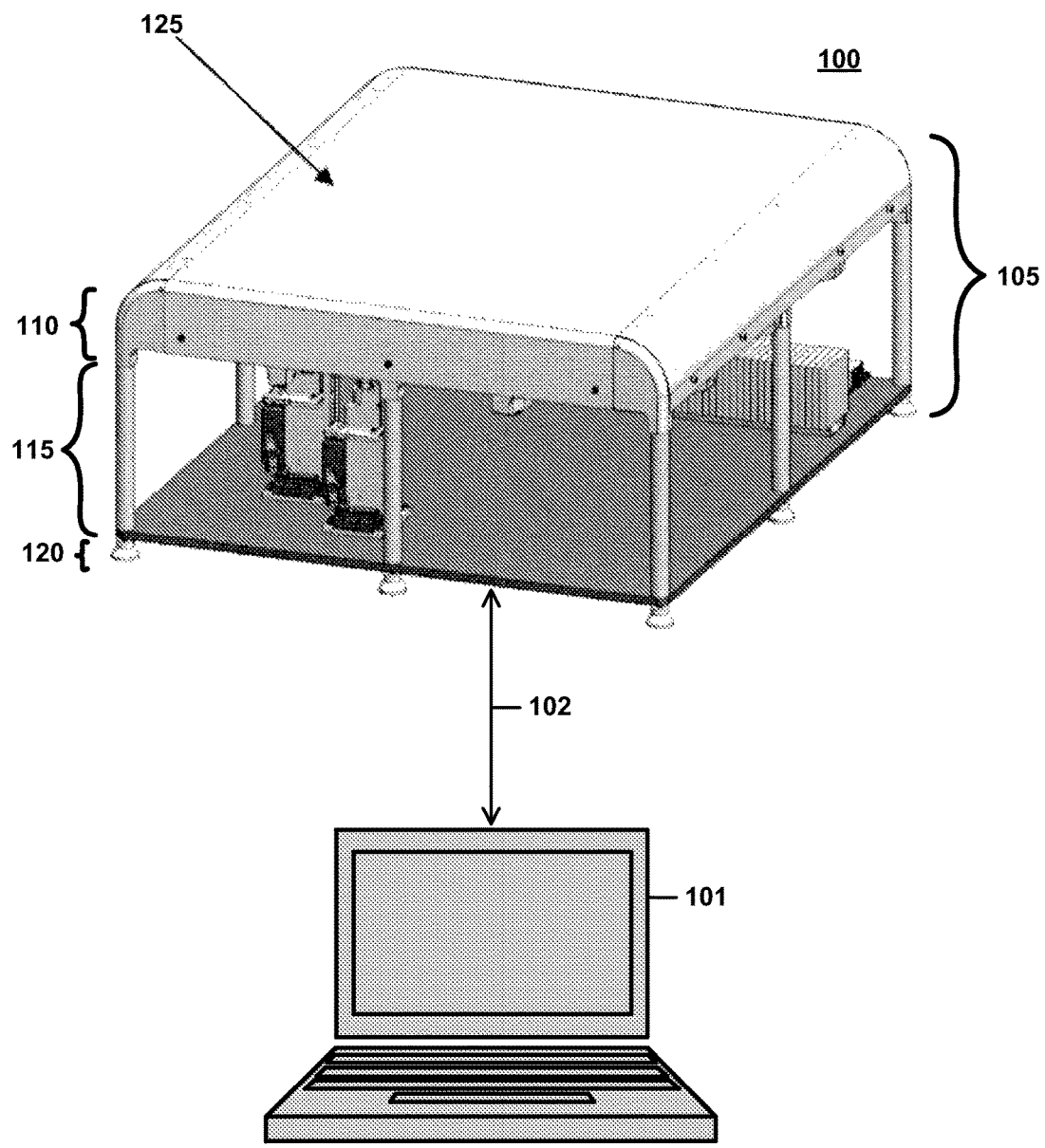
FIG. 1 illustrates a surface layer of a first embodiment of an abdominal simulator.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct (e.g., electrical) connection. Thus, if a first device couples to a second device, that connection may be through a direct (e.g., electrical) connection, or through an indirect (e.g., electrical) connection via other devices and connections.

Additionally, the term "ailment" is used herein for simplicity, but the term "ailment" may include a condition, a disease, an infection, a pain, an injury, a mass, an enlargement, a malady, pathology, or the like. Like the term "ailment," the term "abnormal" is also used as a catch-all for such conditions. The use of any term for such condition is not to be taken as excluding the other terms. The terms "normal," "healthy," "absence of abnormalities" and the like are used interchangeably as terms contrasting "abnormal" and "ailment" and their synonyms. Moreover, while the description herein may at times refer to "simulating an ailment" or the like, it should be understood that the disclosed embodiments are also capable of simulating the absence of an ailment. The terms "diagnosis," "diagnose," "diagnosed," or "diagnosing" are also used herein for simplicity, but the terms may include generating a diagnosis, confirming a diagnosis, or the like. Those of ordinary skill in the art will also appreciate that the terminology "location data" may include any data that may be determined regarding location, the terminology "intensity (or pressure) data" may include any data that may be determined regarding intensity or pressure, and the terminology "depth data" may include any data that may be determined regarding depth.

Directional terms (e.g., "left," "right," etc.) are used herein generally not in an absolute sense but for convenience with reference to the view shown in the figure under discussion and in accordance with the indications of the x, y, and z axes shown on many of the figures. Notably, unless indicated to the contrary, the terms "above," "below," "upper," "lower," "inward," "outward," and the like are used in the following sense. The skin is considered the uppermost or outermost layer of a patient or body portion; layers below the skin, more deeply within the body, are referred to as lower or more inner or inward. Relatedly, the z direction is referred to as the direction of "depth," and deeper is synonymous with "lower" and "more inward" as these terms are used here relative to the body. Moving from the skin downward toward the internal organs would be considered going deeper, or moving in a negative z direction, and moving from the internal organs toward the skin would be considered moving in a positive z direction. The term "portion" is a general term that includes, without limitation, the concept of a layer.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation for all embodiments are necessarily described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Embodiments of the present disclosure presents systems, apparatuses, and methods for patient simulators. A patient simulator may be understood as including a simulated body portion and a simulator. A patient simulator may also include or operate in conjunction with one or more user interface devices and additional control and computer (processor, memory, etc.) hardware and software.

A simulated body portion may be a mannequin or the like apparatus, or a portion of or partial version of such apparatus. As such, a simulated body portion may simulate an entire body or a portion of a body. A simulated body portion may simulate a shape and/or a size of a body, or a portion of a body. A simulated body portion may also simulate anatomical elements or features of a body or body portion, e.g., skin, bones, nerve tissue, muscle, internal organs, etc.

A simulator may include any one or more components described herein as functioning to simulate an abnormal or normal state of a body portion or of a part thereof, to permit a palpation, to detect a palpation, to provide a tactile response to a palpation, or to provide a patient auditory response to a palpation. An example of such functioning would be simulation of the feel of a tender or inflamed organ, or of the physiological response of a tender or inflamed organ, e.g., muscle guarding by the muscle adjacent the organ, or a resistive response to pressure applied to the organ.

While the present disclosure primarily discusses abdominal simulators, in which the simulated body portion simulates the abdomen and optionally parts of adjacent body portions (e.g., chest/torso/thorax, pelvis), the embodiments disclosed herein are generally also applicable, mutatis mutandis, to other body portions. Further, while the present disclosure primarily describes human patient simulators, the embodiments disclosed herein are generally also applicable, mutatis mutandis, to animal patient simulators.

According to embodiments of the present disclosure, a patient simulator (e.g., abdominal simulator) may include one or more of the following portions: a simulation portion for simulating an ailment and a state of normal health, a palpation portion for permitting palpation of the simulated body portion (e.g., for the purpose of diagnosing the ailment) and providing tactile response to palpation (e.g., muscle guarding), a user interface portion for receiving input from a user (e.g., an instruction to simulate a given ailment, or a diagnosis of an ailment) and presenting output to a user (e.g., data pertaining to palpations performed, or feedback on user performance), a detection portion (which may also be referred to as a detector) for detecting palpation of the simulated body portion, a response portion for responding to palpation of the simulated body portion and to user input and for outputting such response to the user interface portion, and a control portion for operating, managing and coordinating the previously mentioned portions. The detection portion may also detect and/or determine various characteristics of given palpations, e.g., location, force/pressure (intensity), depth, temporal duration, etc., and determine (e.g., measure) and record (or store) data pertaining to the detected characteristics. The detection portion may employ a calculation portion to perform some of these determinations. The responses provided by the response portion may include simulated auditory patient responses (e.g., a groan, cry of pain, etc.); data/feedback regarding the palpations (e.g., location, depth, pressure, or temporal duration data of the palpations); or data/feedback regarding the user's performance (e.g., evaluative content regarding the palpations (indications of whether the palpations are too forceful/deep, too gentle/shallow, or proper) or regarding the diagnosis determined by the user, etc.). Accordingly, the palpation portion may provide tactile responses, and the response portion may provide visual and auditory responses. Visual responses may include both textual and graphical (image or video) information. Graphical information may represent, e.g., palpation data. Textual information may represent, e.g., user performance feedback and palpation data.

Upon reading the present disclosure, it will be understood, in view of the description of the structure, functions and mode of operation of the various elements of the systems disclosed herein, which of those elements may be deemed to comprise the aforementioned simulation portion, palpation portion, detection portion, response portion, user interface portion, calculation portion and control portion.

According to embodiments of the present disclosure, a patient simulator (e.g., abdominal simulator) may include one or more of the following portions: a surface portion, which may include a skin portion and/or a bone portion, a sensor portion beneath the surface portion, a muscle portion, a tensing portion, an organ simulation portion. These portions may be disposed in an order of successive depth corresponding to the order in which they are here listed, or in a similar order of successive depth.

Thus, the disclosed patient simulator may not only simulate a normal or abnormal body portion but may also detect palpations and provide feedback to palpations/tactile physical examinations that is useful for training medical students in performing physical examinations including palpations and in diagnosing patients.

Before turning to the figures, a further introduction, pertaining to some embodiments disclosed herein, is provided. According to embodiments disclosed herein, an abdominal simulator approximates the anatomy of the human abdomen from surface to deep features, that is, from skin, to sensory (nerve) tissue, surrounding skeletal tissues (the chest and ribs above the abdomen and the pelvis below the abdomen), anterior abdominal muscles, peritoneal lining (the thin layer of tissue that lies just beneath the abdominal wall muscles and encapsulates the internal abdominal organs), and finally internal organs of the abdomen. The abdominal simulator may also include a user interface for a trainee (e.g., medical student) enabling entry of the trainee's abdominal examination (e.g., palpation) findings, and a user interface for an evaluator (e.g., doctor, professor) enabling the abdominal simulator to emulate selected desired normal or abnormal physical examination findings.

The abdominal simulator may have a skin that covers the skeletal elements of the chest, the abdomen wall cavity, and the skeletal elements of the pelvis and proximal thighs. The skin may be made of Dragon Skin®, which well emulates the texture and tactile qualities of human skin. Beneath the skin is a sensor pad capable of detecting palpation by the learner. The sensor pad may detect and display, in real time on an accompanying monitor (displayed, e.g., at the head of the abdominal simulator), a visual image (feedback) representing the physical examination efforts of the student in terms of, for example, 1) where the student is currently palpating, and has palpated, the abdomen, and 2) the depth to which palpation has penetrated the plane of the skin and anterior abdomen. Further, the sensor pad may report x:y location data digitally, and is responsive to pressure on an analog scale. Location and depth of palpation may be captured and displayed on a monitor in real-time. These two visually cued feedback mechanisms (surface area and depth) are designed to alert the student as to whether the student's palpatory examination efforts: 1) have adequately covered the surface area of the abdomen (with special emphasis on the surface overlying internal organs which when diseased, are more likely to cause life-threatening patient care situations—such as appendicitis, ectopic pregnancy, etc), and 2) have been of sufficient depth (i.e., too gentle/superficial, at the right depth to appreciate normal and abnormal internal physical examination findings, or are too deep and potentially discomforting or injurious to the patient). Control may be provided through an Arduino or a raspberry pi controller solution.

The abdominal simulator's chest/ribs above and pelvis below the abdomen, when covered with the previously described skin, simulate well the look and feel of a human trunk.

The abdominal simulator's anterior abdominal muscles have tactile qualities which approximate the natural qualities, namely, soft and yielding when not engaged, yet firm and modestly resistant when activated, so as to replicate certain states of abdominal organ pathology (e.g., anterior muscle wall guarding—a finding appearing in the mid cycle of certain abdominal pathologies such as acute appendicitis). The feel of normal and abnormal abdominal muscle states has been refined via the use of silicone sheets (of various thicknesses) fused together into 'bladders' designed to simulate muscle groupings of appropriate size and shape. The varying degrees of fullness and tension of the bladders are in turn controlled via an air pressure regulator and a series of manifolds that more precisely control and achieve the desired pressure and thereby 'feel' in any given single muscle or series of muscles, both in normal and abnormal states. In sum, the bladders produce a good approximation of a proper sensation of guarding, and of effecting "guarding" without visible distortion of the skin, etc.

The simulated peritoneal lining (the thin layer of tissue that lies just beneath the abdominal wall muscles and at the same time is above and thereby encapsulates the internal abdominal organs) plays a significant role in achieving a realistic feel of abdominal muscles during the normal state (i.e., the feel of this anatomical element in the absence of abdominal abnormalities). By virtue of the use of appropriate fabrics and tensioning mechanisms the abdominal simulator may provide a realistic feel to the peritoneal lining. Also, the current tensioning device permits individual users (e.g., faculty instructing medical students) to calibrate and thereby better approximate a baseline level of peritoneal tensioning such that it reflects their sense of 'the right feel' of the abdominal wall in the relaxed state. Notably, in part by virtue of the interaction of skin, muscle and peritoneal lining, the disclosed abdominal simulator provides a realistic feel of palpation of normal tissue as well as tissue demonstrating guarding.

As for internal organs of the abdomen, the disclosed abdominal simulator permits variations in the locations of various internal organs by use of tools that enable movement of an object along 'x', 'y' and 'z' coordinates. In addition, an 'organ actuator' is provided which rides on top of the 'z' arm/plane of the 'x/y/z' device and thereby simulates the presence, and the size, shape, and feel of a variety of inflamed/dysfunctional internal organs residing deep within the abdomen (i.e., appendix, ovaries, upper and lower intestines, gallbladder, pancreas, etc.). Finally, a device is provided that enables the simulation of normal and enlarged organs residing closer to the surface of the abdominal cavity (i.e., the urinary bladder, liver, spleen, etc).

The abdominal simulator has a control system, which may be an embedded central processing unit (CPU) which has integrated data input and output capabilities (Raspberry Pi; 3.14). This CPU interfaces with a graphical user interface (GUI) that enables student to enter the physical findings they detect during a session. The GUI also enables the faculty to select the specific physical findings they wish to create as the basis for a given student simulation session. The Raspberry Pi device may drive several Arduino devices which, in turn, may control the mechanical aspects of the abdominal simulator (e.g., inflation of the simulated anterior abdominal muscles (bladders), tensing of the peritoneal lining, placement of the various organs simulating abnormal internal findings) and the faculty and student interface. Different user interfaces for the faculty member and the student may but need not be employed.

The student interface may be a touch sensitive monitor residing above the head of the abdominal simulator enabling entry of the student's abdominal findings. These entries may include, for example, (1) absence of abnormalities, or (2) specific abdominal findings such as tenderness over the appendix, gallbladder, colon, etc., presence of overlying muscle guarding, and whether there is an associated feeling of deep organ pushback.

The faculty interface enables entry of the specific abdominal findings to be simulated such as (1) absence of abnormalities, or (2) specific abdominal findings such as tenderness in the area of the appendix, colon, gallbladder, etc.; overlying muscle guarding, and the feeling of pushback associated with deep palpation over an inflamed organ. The faculty interface also enables the faculty member to select from a number of case vignettes that can be presented to the student's monitor via a text-based case scenario describing the historical findings associated with the case scenario at hand.

Turning now to FIG. 1, this figure illustrates a first embodiment of an abdominal simulator 100 to simulate ailments that can be diagnosed with abdominal palpation exams and to analyze abdominal palpation exams. The abdominal simulator 100 may be coupled to a computer terminal 101 via a wired or a wireless connection 102. The terminal 101 may even be part of, and not external to, the abdominal simulator 100. The abdominal simulator 100 and the terminal 101 may be configured for bidirectional communications via the connection 102. For example, the terminal 101 may request ailments to be simulated by the abdominal simulator 100, and the abdominal simulator 100 may simulate ailments, detect (or sense) palpations, and determine data for the palpations in response to the requests from the terminal 101.

Each of the abdominal simulator 100 and the terminal 101 may include physical components, software, middleware, hardware, processing capabilities, memory or other storage, networking components, communication components, etc. In particular, the abdominal simulator 100 may include a muscle layer and a tensing layer to simulate abdominal guarding of abdominal muscles related to inflamed tissue, as discussed further herein. The abdominal simulator 100 may also include a sensor layer and an ailment module layer to detect palpations and determine data for the detected palpations, as discussed further herein. The terminal 101 may have a variety of input/output devices, such as a screen for display, a keyboard for input, a mouse, etc.

The abdominal simulator 100 and the terminal 101 may be utilized in a variety of environments, such as, but not limited to, schools, hospitals, continuing education courses, or other environments. Users may include, but are not limited to, medical students, medical doctors, physician assistants, nurses, veterinary students, veterinarians, or other users. The abdominal simulator 100 may simulate a variety of ailments that may be diagnosed with abdominal palpation exams. The ailments may include, but are not limited to, ailments of the appendix (e.g., appendicitis), ailments of the bladder (e.g., bladder infections), ailments of the gall bladder (e.g., gall bladder stones), ailments of the ovaries, ailments of the uterus, ailments of the pancreas, ailments of the aorta, ailments of the upper gastrointestinal tract (upper GI), ailments of the large intestines or colon (e.g., diverticulitis), or other ailments.

Those of ordinary skill in the art may appreciate that the abdominal simulator 100 may be able to simulate ailments more accurately than human volunteers, as it is "computer controlled." Furthermore, the abdominal simulator 100 simulates ailments in substantially the same manner for each user. The abdominal simulator 100 may also be able to determine qualitative and/or quantitative measurements that may not be possible with human volunteers. Additionally, the abdominal simulator 100 may provide a more accurate picture of how each user performs an abdominal palpation exam. In short, the abdominal simulator 100 and the terminal 101 may provide a repeatable and objective environment without the variability of using human volunteers, which in turn may lead to improvements in training and evaluating users on how to perform abdominal palpation exams.

Figure 16:
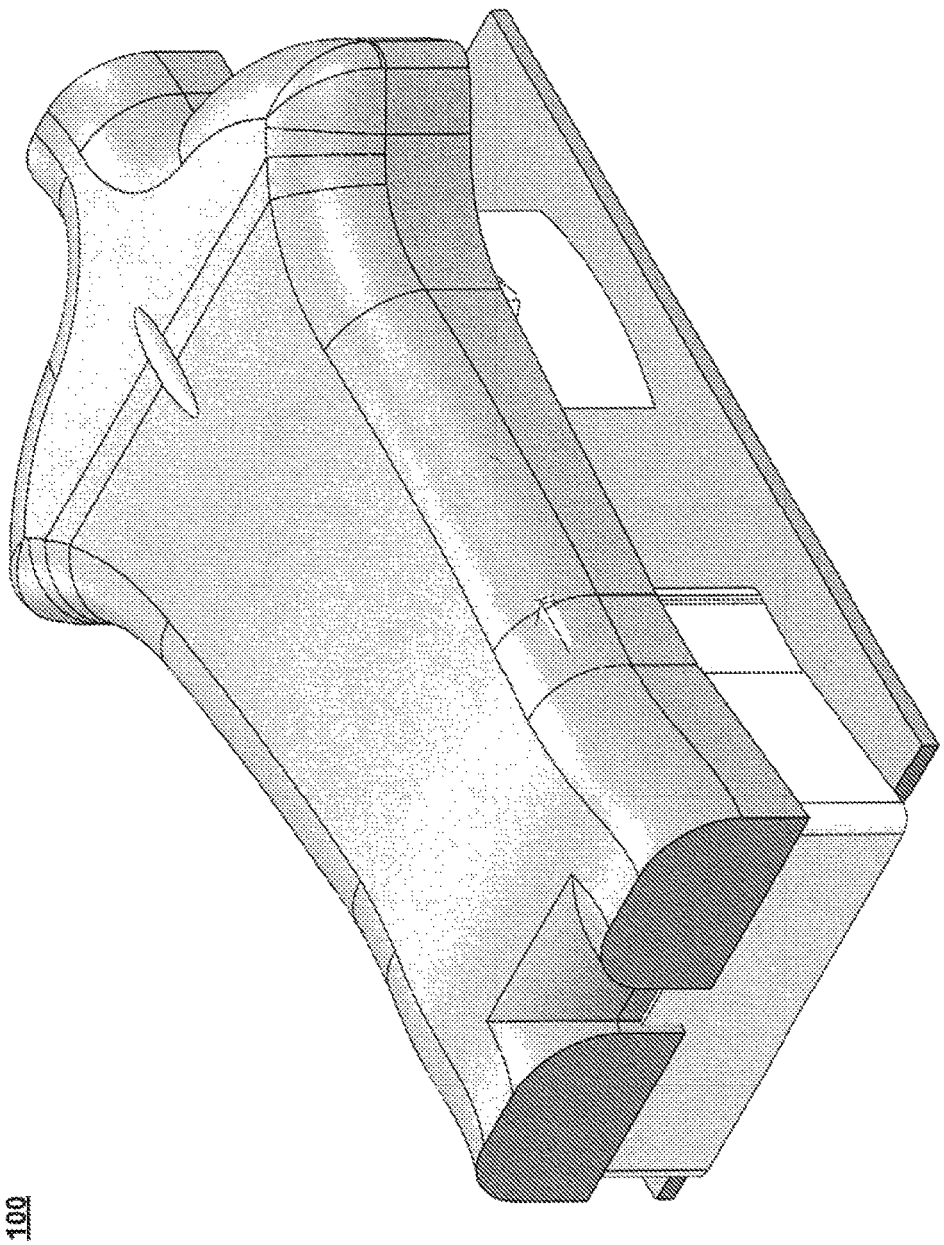
FIGS. 16, 17, and 18 illustrate the abdominal simulator of FIG. 1 with a more realistic human appearance.
Figure 17:
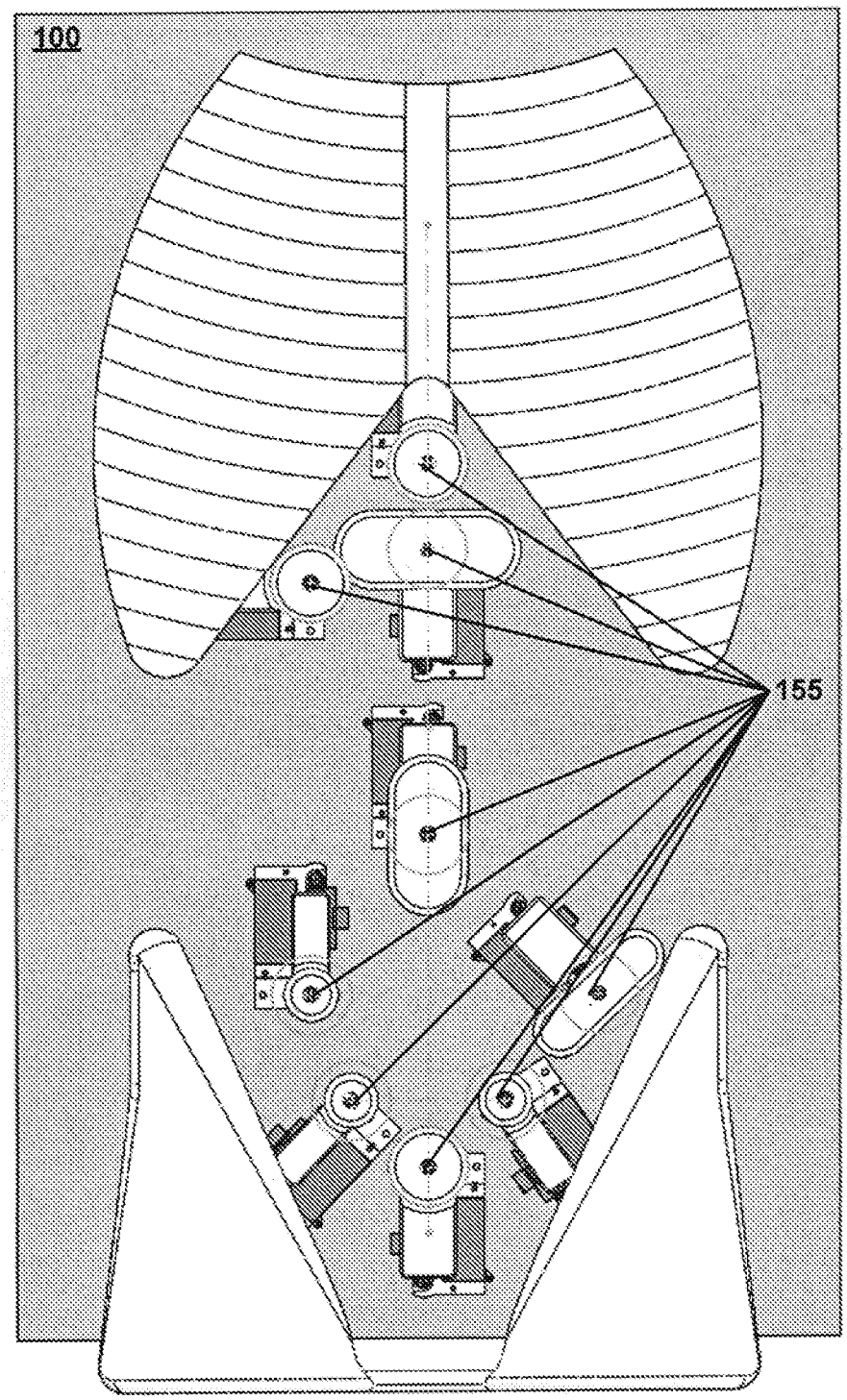
Figure 18:
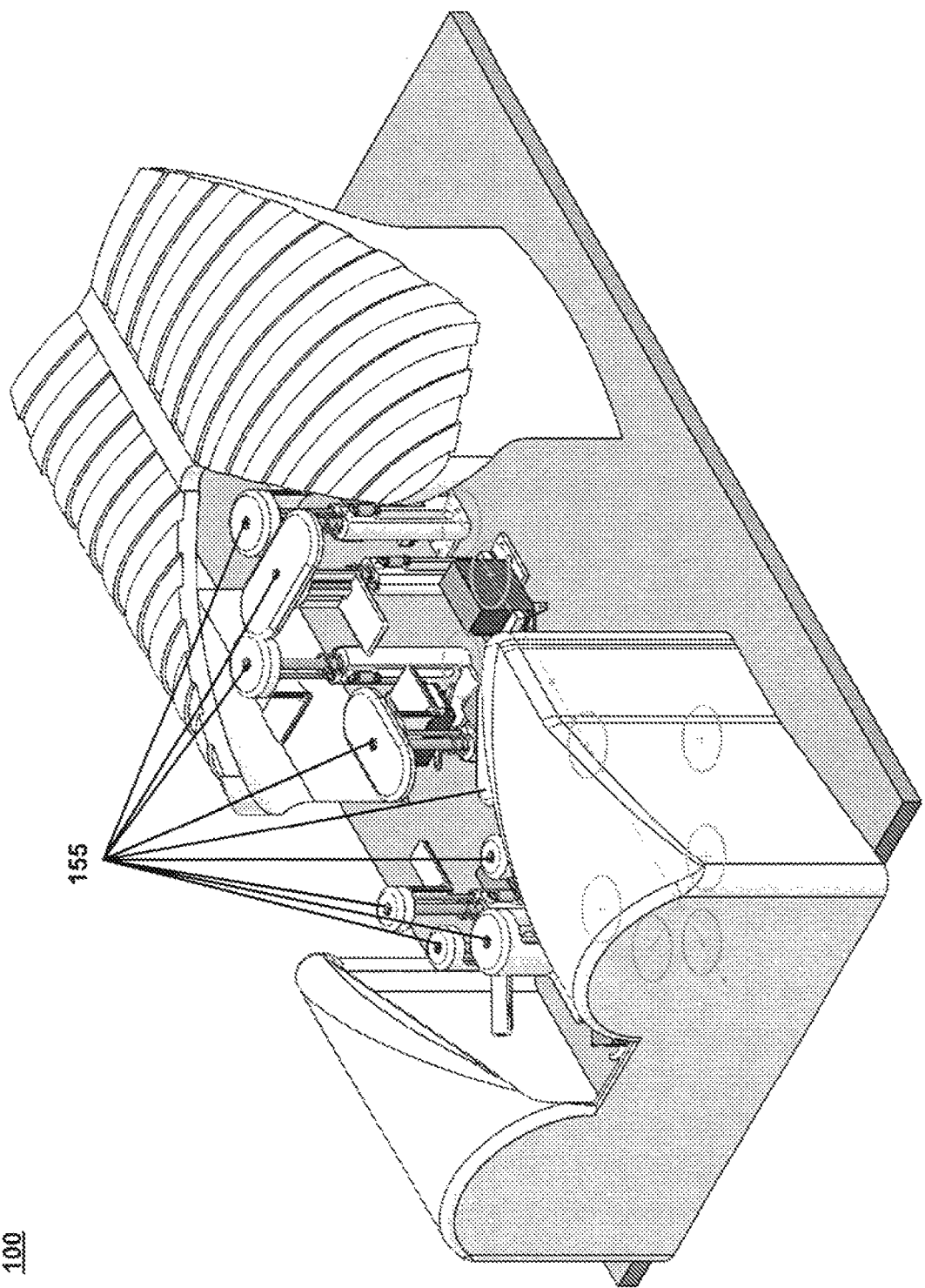

Turning more specifically to the physical components of the abdominal simulator 100, as illustrated in FIG. 1, the abdominal simulator 100 may include a housing 105 with a top portion 110, a middle portion 115, and a bottom portion 120. The abdominal simulator 100 may have a generally rectangular shape or a different shape. For example, the abdominal simulator 100 may be similar to a real abdomen, such as a human female abdomen, a human male abdomen, a human child abdomen, or other abdomen (e.g., dog's abdomen, cat's abdomen, etc.). The abdominal simulator 100 may also include other anatomical components, such as, but not limited to, the base of the neck, the base of the arms, the base of the pelvis, abdominal markers (e.g., belly button), etc. FIGS. 16, 17, and 18 illustrate the abdominal simulator 100 with a more realistic human appearance.

Starting with the top portion 110, the top portion 110 may include a surface layer, such as a surface 125, to simulate skin. A user of the abdominal simulator 100 may perform at least one abdominal palpation on the surface 125 to diagnose an ailment that is simulated by the abdominal simulator 100. The surface 125 may be formed of a material that is durable and easily cleaned or removed, as users will be interacting the most with the surface 125. For example, the surface 125 may be formed of latex rubber or some other material. The color, thickness, and texture of the material may be similar to real skin, and therefore, the surface 125 may have a flesh color, instead of being transparent or semi-transparent. In a particular embodiment, the surface 125 may be a Dragon Skin® silicone rubber used in special effects to allow for different durometers and pigmentation. The Dragon Skin® silicone rubber is available via https://www.smooth-on.com. Alternatively, other silicone rubbers may be utilized.

Figure 2:
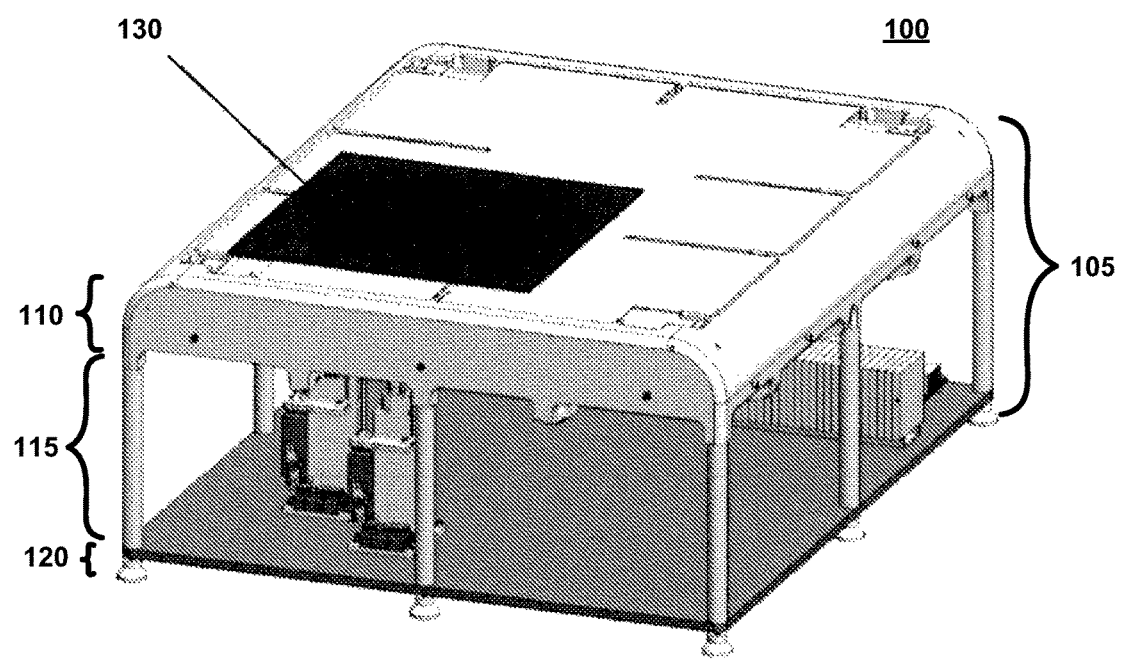
FIG. 2 illustrates a sensor layer of the first embodiment of the abdominal simulator.

Referring to FIGS. 1 and 2, the top portion 110 may also include a sensor layer, such as a sensor pad 130, which may be located beneath the surface layer. As illustrated in FIG. 2, the sensor pad 130 may be located beneath the surface 125 (that is, FIG. 2 shows abdominal simulator 100 with surface 125 removed). The sensor pad 130 may be used to detect at least one abdominal palpation that is performed by a user on the surface 125 of the abdominal simulator 100. Furthermore, the sensor pad 130 may determine data (e.g., location data and/or intensity data) for the at least one abdominal palpation that was detected. The functionality of detecting at least one abdominal palpation and determining data for the at least one abdominal palpation that was detected may occur together, may occur separately, may involve other components, etc. The sensor pad 130 may determine location data by capturing at least one point or position that a user presses. The sensor pad 130 may determine intensity data by capturing at least one measurement (e.g., a qualitative and/or a quantitative measurement) of an intensity (or a pressure or a force) of the user's press. The location data and/or the intensity data determined by the sensor pad 130 may be stored at the abdominal simulator 100, as well as sent to the terminal 101 for display and/or storage.

More specifically, the sensor pad 130 may be formed of a fabric material that includes a plurality of points, such as about sixty four points, that are touch sensitive. In a particular embodiment, the sensor pad 130 may use at least one Matrix Analog Pressure Sensor, product code PW088, that is available from Texe srl at Via Rocca Tedalda, 25, 50136, Frirenze Italia, PH 39 055 6503766, via www.plugandwear.com. Regarding location data, the sensor pad 130 may include strips that are setup in a grid formation for determining where the user presses. For example, the sensor pad 130 may be able to capture where the user pressed, including X and Y coordinates thereof. Substantially all positions that were pressed by the user may be determined. Alternatively, fewer than all positions that were pressed by the user may be determined. For example, maximum values may be determined, such as the positions that were pressed the most, the positions where the user spent most of his or her time, the position extremes that were pressed (e.g., leftmost position pressed and rightmost position pressed if looking down at abdominal simulator 100), etc.

Regarding intensity data, the sensor pad 130 may be conductive and voltage output may vary by the amount that the user presses down, providing at least one qualitative measurement of how hard the user pressed. For example, a qualitative measurement may be an intensity of 100%, an intensity of 50%, etc. Qualitative measurements may be displayed via a color scheme, such that each point that is pressed may have a color to illustrate intensity of the user's press. A qualitative measurement may be determined for substantially all points pressed or fewer than all points pressed. In some embodiments of the present disclosure, the sensor pad 130 may be calibrated for quantitative measurements, and therefore, the sensor pad 130 may capture at least one quantitative measurement of the intensity (or pressure or the force) of the user's press. A quantitative measurement may be an intensity of five or an intensity of seven or other values utilized, and the quantitative measurement may be in units, such as 1 lbf/N/kgf, etc. As another example, the qualitative measurement may simply provide a number, whereas the quantitative measurement may have a measurement unit attached to it (e.g., 1 lbf/N/kgf). Capturing the qualitative and/or the quantitative measurement of the intensity (or pressure or the force) of a press may include generating such a measurement.

In some embodiments of the present disclosure, the data to be determined by the sensor pad 130 may depend on the specific implementation, and may include only determining location data, only determining intensity data, or determining both location data and intensity data. Other data may also be determined by the abdominal simulator 100. For example, users may vary on the number of abdominal palpations that they may perform, and as such, the quantity of abdominal palpations may be determined for a user.

Additionally, in some embodiments of the present disclosure, the sensor pad 130 may be larger or smaller than illustrated in FIG. 2. For example, the sensor pad 130 may be beneath the entire surface 125, not just beneath a quadrant of the surface 125. If the appearance of the abdominal simulator 100 is similar to a real human abdomen, for example, the sensor pad 130 may be beneath the entire human abdomen and may even include locating pins or other mechanisms to keep the sensor pad 130 in place. Moreover, the sensor pad 130 may be about nineteen inches by about sixteen inches when the abdominal simulator 100 has the appearance of a real human abdomen. The size and dimensions of the sensor pad 130 may also depend on the ailments to be simulated, location of ailment modules (discussed in FIGS. 6, 7, 8*a*, and 8*b*), etc.

Figure 3:
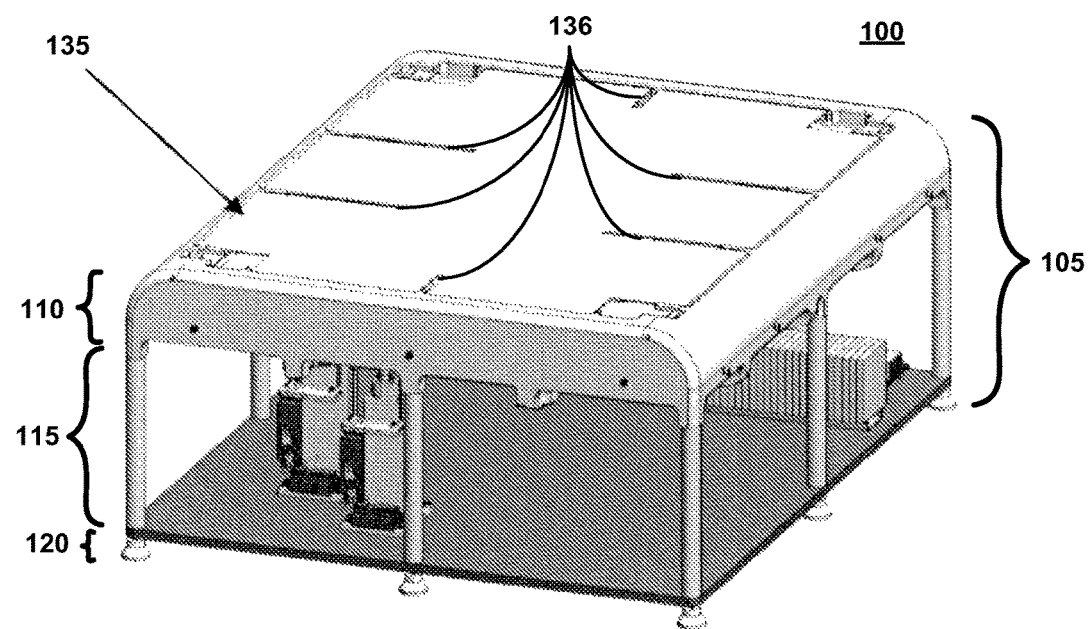
FIG. 3 illustrates a muscle layer of the first embodiment of the abdominal simulator.

Referring to FIGS. 1, 2, and 3, the top portion 110 may also include a muscle layer, such as a muscle layer 135, which may be located beneath the sensor layer. The muscle layer may simulate abdominal guarding (or tensing) of abdominal muscles that occurs when there is an inflammation nearby. As illustrated in FIG. 3, the muscle layer 135 may be located beneath the sensor pad 130 (that is, FIG. 3 shows abdominal simulator 100 with surface 125 and sensor pad 130 removed). The muscle layer 135 may be formed of a stretchable fabric that can stretch in multiple directions (e.g., two or more directions). The muscle layer 135 may have at least one slit 136.

More specifically, a plurality of slits 136 may divide the muscle layer 135 into about nine sections that may be individually tightened to simulate guarding. For example, abdominal guarding may be replicated in one section while the other sections of the muscle layer 135 remain fairly loose. A combination of the muscle layer 135, the at least one slit 136 in the muscle layer 135, and a tensing layer (discussed in connection with FIG. 4) may be used to simulate abdominal guarding.

Figure 4:
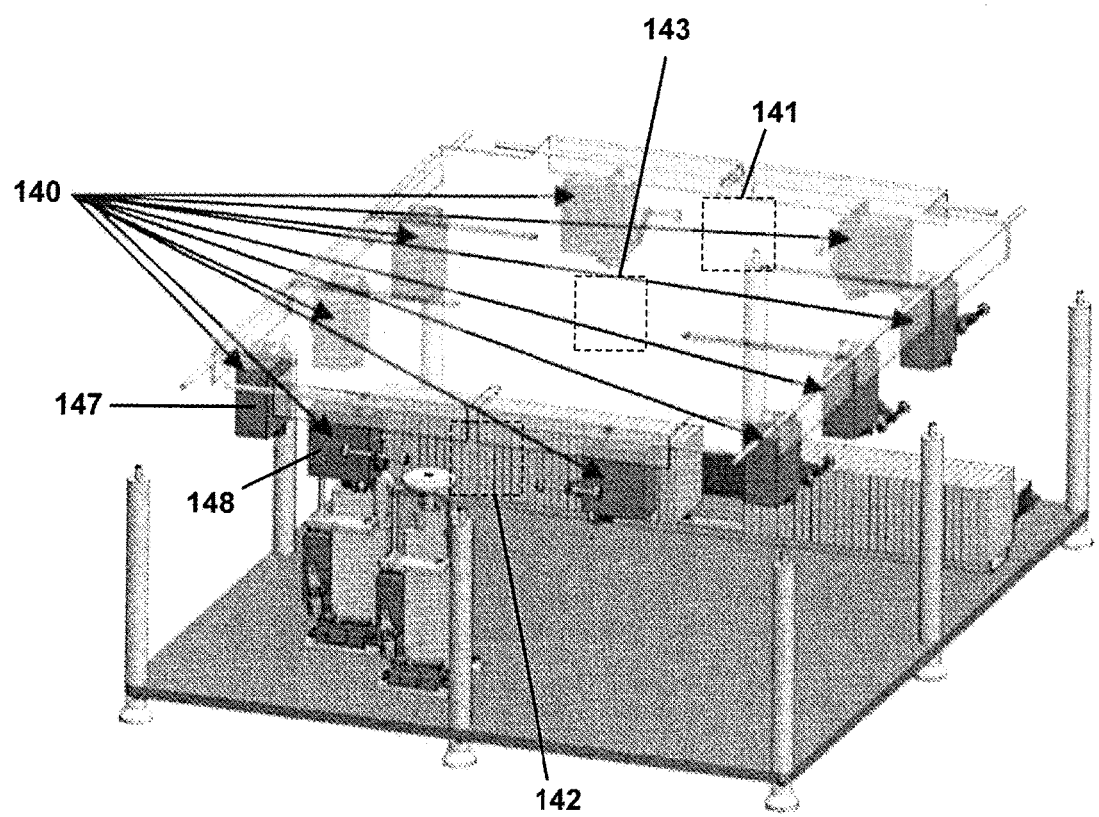
FIG. 4 illustrates a tensing layer of the first embodiment of the abdominal simulator.

Referring to FIGS. 1, 3, 4, and 5, the top portion 110 may also include a tensing layer, such as at least one muscle layer actuator 140, which may be located beneath the muscle layer. As illustrated in FIG. 4, the at least one muscle layer actuator 140 may be located beneath the muscle layer 135 (that is, FIG. 4 shows abdominal simulator 100 with surface 125, sensor pad 130, and muscle layer 135 removed). The at least one muscle layer actuator 140 may pull and tighten the muscle layer 135, as instructed, to simulate abdominal guarding in the muscle layer 135. More specifically, a plurality of muscle layer actuators 140 may pull and tighten the muscle layer 135, as instructed, to cause abdominal guarding. For example, in FIG. 4, ten muscle layer actuators 140 are positioned at various locations beneath the muscle layer 135. Embodiments of the present disclosure may have more or fewer than ten muscle layer actuators 140. For example, a muscle layer actuator 140 may be added at a location 141, a location 142, and/or a location 143 to allow for simulations along the midline. Each muscle layer actuator 140 may be a hobby servo or other device. Each muscle layer actuator 140 may work using pulse width modulation.

Figure 5:
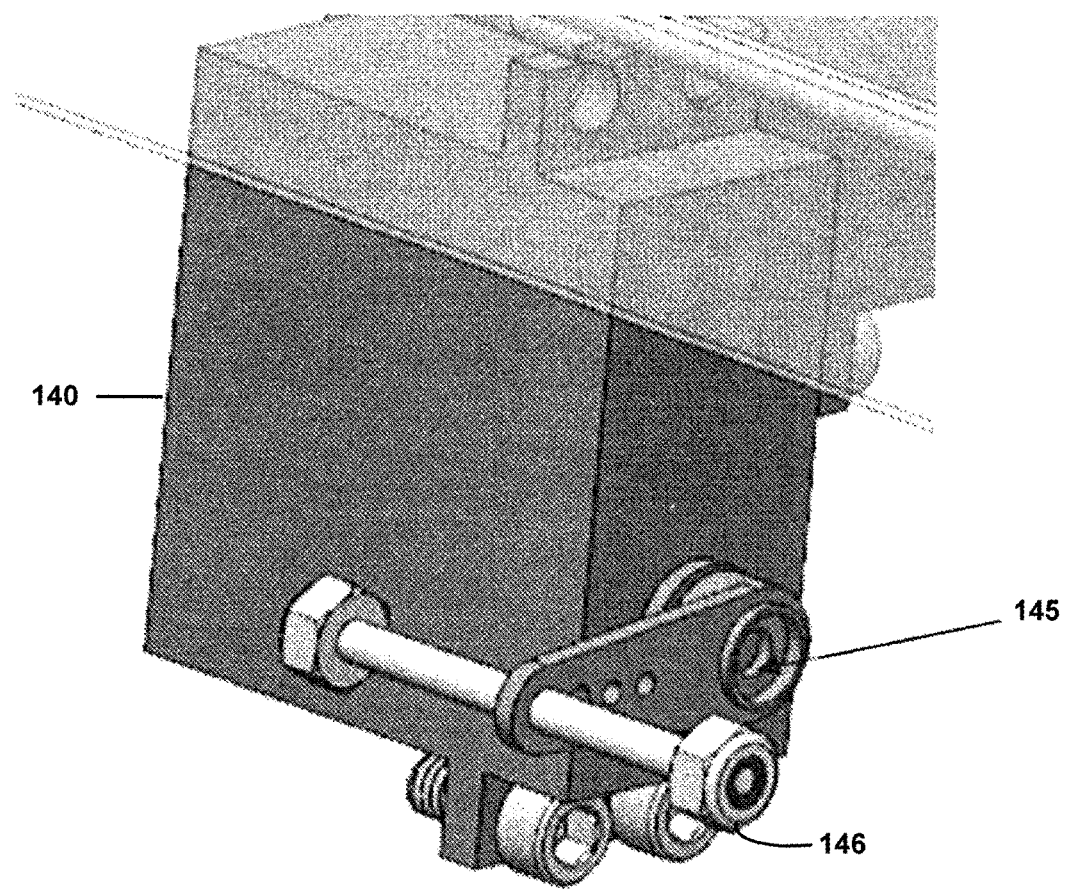
FIG. 5 illustrates a more detailed view of a muscle layer actuator of the tensing layer of FIG. 4.

As seen in FIG. 5, each muscle layer actuator 140 may include an actuator arm 145 and a dumbbell shaped post 146 coupled to the actuator arm 145. At least one zip-tie, or other mechanism, may be utilized to couple a portion of the muscle layer 135 (FIG. 3) and the dumbbell shaped post 146, for each muscle layer actuator 140. Alternatively, each muscle layer actuator 140 may connect to a portion of the muscle layer 135 via a feature (e.g., a built-in feature) of the material of the muscle layer 135, instead by zip ties. For example, the muscle layer 135 may include a plurality of hooks (not shown) that extend downward to hook around each dumbbell shape post 146 of each muscle layer actuator 140. As another alternative, the muscle layer 135 may include a plurality of apertures or other openings (not shown) and each muscle layer actuator 140 may include a hook (not shown) on the dumbbell shape post 146 that hooks into an aperture of the muscle layer 135. The hooks, for example, may facilitate quick removal of the muscle layer 135 to clean the muscle layer 135, as well as facilitate replacement or repair of any components beneath the muscle layer 135 (e.g., replacement of muscle layer actuators 140).

With respect to the coupling of the portions of the muscle layers 135 to the muscle layer actuators 140 as described above, at any given time each muscle layer actuator 140 may be active and pull, or inactive and not pull, the coupled portion of the muscle layer 135. As an example, for a particular ailment, the muscle layer actuators 140 at locations 147 and 148 (FIG. 4) may be active and pulling the portions of the muscle layer 135 that are coupled to these muscle layer actuators 140 to tighten the section of the muscle layer 135 located above locations 147 and 148, while at the same time the other muscle layer actuators 140 at the various other locations are inactive and do not pull the portions of the muscle layer 135 coupled thereto. Indeed, for each simulated ailment, one or more of the muscle layer actuators 140 may be active and pulling the portions of the muscle layer 135 coupled thereto, while the other muscle layer actuator(s) 140 are inactive and not pulling.

Referring to FIGS. 1, 2, 4, 6, and 7, turning to the middle portion 115, the middle portion 115 may be located beneath the top portion 110 as illustrated, e.g., in FIGS. 1 and 2. The middle portion 115 may include at least one leg 149 to support the top portion 110. More specifically, the middle portion 115 may include a plurality of legs 149, such as about eight legs.

The middle portion 115 may also include at least one control portion 150. The control portion 150 may include an input/output (I/O) portion 151 and a power supply portion 152. For example, regarding the power supply portion 152, the abdominal simulator 100 may be powered independently by an external power supply or powered by the terminal 101 (e.g. via a universal serial bus (USB)). The control portion 150 may load and execute program code (e.g., computer code of computer programs, applications, etc.) to simulate ailments, receive requests from the terminal 101, generate responses to the requests from the terminal 101, etc.

Figure 6:
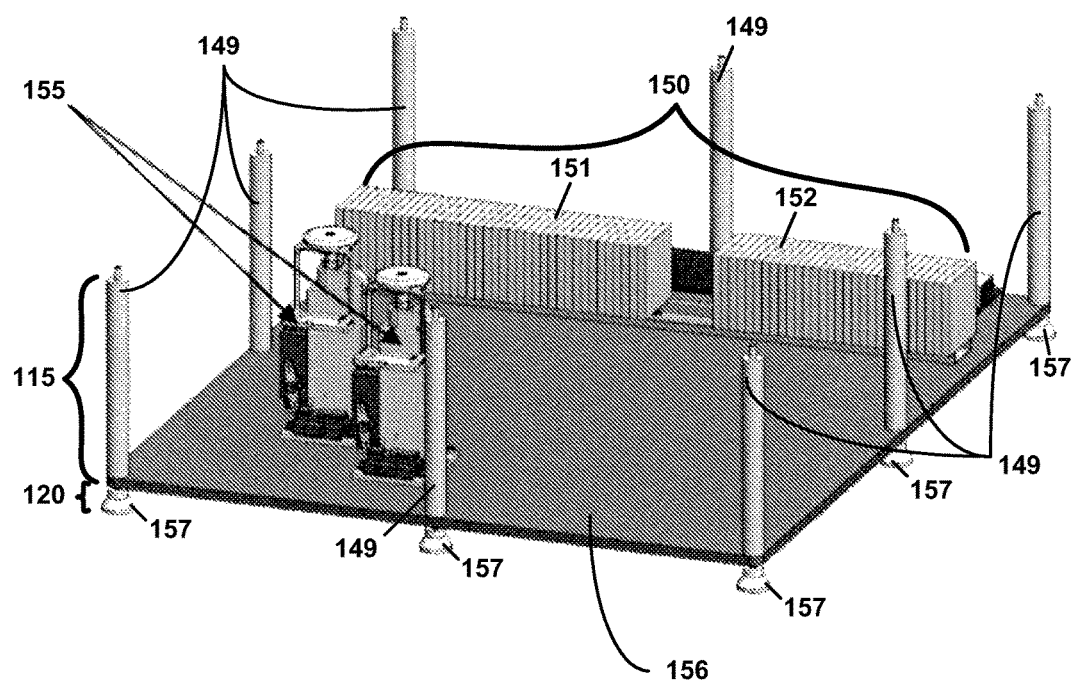
FIG. 6 illustrates an ailment module layer and a control portion of the first embodiment of the abdominal simulator.

The middle portion 115 may also include an ailment module layer, such as at least one ailment module 155, which may be beneath the tensing layer. As illustrated in FIG. 6, the at least one ailment module 155 may be located beneath the at least one muscle layer actuator 140 (that is, FIG. 6 shows abdominal simulator 100 with surface 125, sensor pad 130, muscle layer 135, and muscle layer actuator(s) 140 removed). More specifically, the abdominal simulator 100 may include a plurality of ailment modules 155 (e.g., in anatomically correct positions or fairly close thereto). Depending on the implementation, each ailment module 155 may be used to detect at least one abdominal palpation that is performed by a user on the abdominal simulator 100 and/or to determine data (e.g., depth data) for the at least one abdominal palpation that was detected. The functionality of detecting at least one abdominal palpation and determining data for the at least one abdominal palpation that was detected may occur together, may occur separately, may involve other components, etc. For example, each ailment module 155 may correspond to a different ailment and may determine depth data related to a user's press. In some embodiments of the present disclosure, there may be about ten ailment modules 155 in anatomically correct positions or fairly close thereto, which correspond to about ten ailments. FIGS. 16, 17, and 18 illustrate the abdominal simulator 100 with a more realistic human appearance and a plurality of the ailment modules 155.

The control portion 150 may include wiring, connections, inputs and outputs, positives and negatives, processing capability, memory or other storage, hardware, middleware, software, networking components, communication components, etc. to be able to support and communicate with the sensor pad 130, each muscle layer actuator 140, and components of each of ailment module 155 (e.g., each ailment module actuator 165 and each ailment module sensor 185, described below). The control portion 150 may be a microcontroller (e.g., Arduino Mega 2560 available via www.plugandwear.com or via a physical store, such as RadioShack), a printed circuit board, or practically any other control apparatus that can satisfy the power requirements (e.g., of the various actuators), has sufficient pins, and can provide the functionality described herein. For example, in some embodiments of the present disclosure, the control portion 150 may support and communicate with the sensor pad 130, twelve muscle layer actuators 140, two ailment module actuators 165, and two ailment module sensors 185. In some embodiments of the present disclosure, the control portion 150 may support and communicate with the sensor pad 130, twelve muscle layer actuators 140, ten ailment module actuators 165, and ten ailment module sensors 185.

Turning to FIG. 6, the bottom portion 120 may be located beneath the middle portion 115, as illustrated, e.g., in FIGS. 1, 2 and 6. The bottom portion 120 may include a base 156 that may be substantially flat and configured to support and couple with a variety of components. For example, the control portion 150 may be supported by and coupled to the base 156. Each ailment module 155 may also be supported by and coupled to the base 156 (e.g., by at least one screw 191, shown in FIG. 7). The bottom portion 120 may also include at least one shoe 157 corresponding with the at least one leg 149, e.g., a plurality of shoes 157 corresponding with a plurality of legs 149, respectively.

Figure 7:
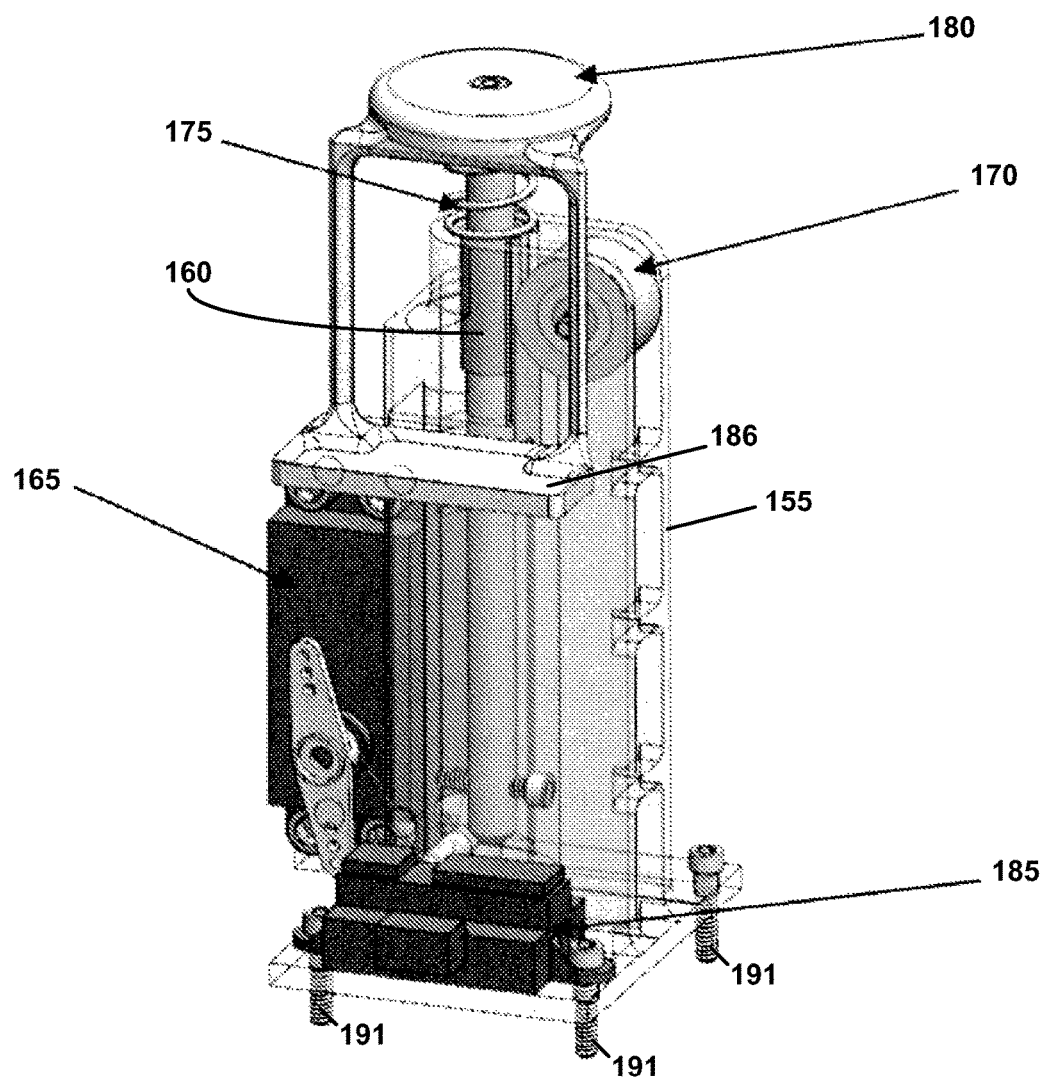
FIG. 7 illustrates a more detailed view of an ailment module of the ailment module layer of FIG. 6.
Figures 8A, 8B:
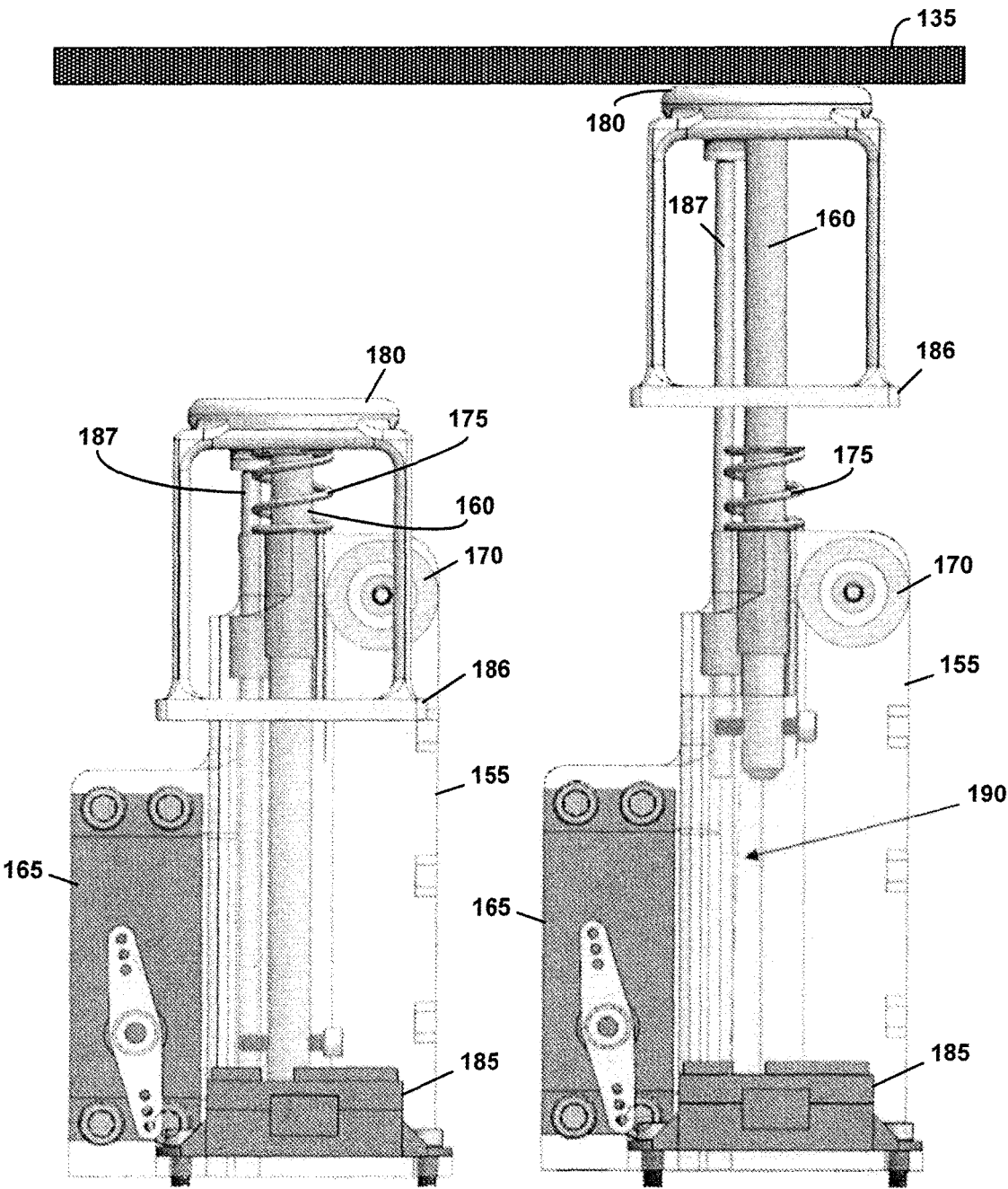
FIGS. 8*a* and 8*b* illustrate the ailment module of FIG. 7 in an inactive position at FIG. 8*a* and in an active position at FIG. 8*b*.

Referring to FIGS. 7, 8a, and 8b, these figures provide a more detailed view of an ailment module 155 of FIG. 6. Each ailment module 155 may include a plunger 160, an ailment module actuator 165, a constant force spring 170, a compression spring 175, a touch point 180, an ailment module sensor 185 (e.g., an infrared (IR) sensor), an ailment module sensor target 186, a rod 187, a string 190, and at least one screw 191. The constant force spring 170 may simulate inflamed tissue. For example, a high spring rate compression spring may be used to simulate the limit of the tissue compressibility, which may be desirable so that a user does not develop the mnemonic of pressing until a hard stop is reached. A patient would be in significant pain at the depth of the hard stop. The touch point 180 is the part of the ailment module 155 that the user presses (e.g., indirectly, via the layers above it, explained below). The touch point 180 may be coupled to the constant force spring 170 by the plunger 160 that is beneath the touch point 180.

The rod 187 may keep the touch point 180 from rotating. By doing so, the rod 187 may also keep the ailment module sensor target 186 in alignment with the ailment module sensor 185. The ailment module sensor target 186 may act as a reference point or moving target for the ailment module 185 for measurements. More specifically, the ailment module sensor target 186 may be a protruding ledge that is part of the touch point 180, and not too close to or too far from the ailment module sensor 185. The ailment module sensor 185 may be an IR sensor or other non-contact sensor that measures the displacement of the touch point 180 via at least one non-contact distance measurement. A non-contact distance measurement may be desirable because most contact methods may increase force by drag. For example, a contact sensor (e.g., a yo-yo sensor) may unfortunately cause a small offset in the force that is felt, as well as an impact on motion. Thus, a non-contact sensor may be preferable, and may also be cheaper and easier to utilize.

The string 190 may be attached to both the ailment module actuator 165 (e.g., the ailment module actuator 165's output) and to the plunger 160 (or cable of the plunger 160). When the ailment module actuator 165 rotates, the touch point 180 is either raised due to the constant force spring 170 to the active position of FIG. 8b or lowered due to the winding of the string 190 to the inactive position of FIG. 8a. For every simulated ailment, about one ailment module 155 should be in an active position with its ailment module sensor 185 determining depth data (e.g., how far down the user pressed, etc.). Each ailment module actuator 165 may be a hobby servo or other device, and may operate by pulse width modulation.

Of note, the string 190 may allow for slack when the touch point 180 is in the up or active position of FIG. 8b so that the ailment module actuator 165 does not create load and does not need to move. In turn, this allows for discrete testing of specific ailments. Moreover, this functionality may be useful (and in some instances needed) where the ailment module actuator 165 is an electric actuator without precise force feedback control. Indeed, in some embodiments of the present disclosure, the ailment module actuator 165 may be a more expensive, but simpler, fluid powered actuator. For example, pressure may be maintained within a narrow band via an electric pressure regulator, and as a user presses (e.g., indirectly) the touch point 180 of the ailment module 155, force may be held constant (i.e., the pressure and area are constant so the force stays constant). These embodiments may include a pressurized fluid source, a pneumatic cylinder, and/or an electric pressure regulator. Testing at a force of about −1.5 pound force (lbf) may be appropriate.

Referring to FIGS. 1, 2, 6, 7, 8a, and 8b, in operation, the control portion 150 may receive a request from the terminal 101 indicating the ailment to be simulated. The control portion 150 may send an indication, based on the request, to each muscle layer actuator 140 indicating what action these actuators should take based on the request. For example, each muscle layer actuator 140 may work using pulse width modulation, and as such, may wait for a signal from the control portion 150. Each signal from the control portion 150 may include a timing metric that indicates a position that a particular muscle layer actuator 140 should move to for the ailment to be simulated. Each muscle layer actuator 140 may know its location (e.g., not need to be informed of or moved to its initial specific location), wait for a signal from the control portion 150 indicating the position to move to, and execute the movement.

Similarly, the control portion 150 may send an indication, based on the request, to each ailment module actuator 165 indicating what action these actuators should take based on the request. For example, each ailment module 155 may also operate by pulse width modulation, and as such, may wait for a signal from the control portion 150. The control portion 150 may send a signal to the particular ailment module 155 corresponding to the particular ailment to be simulated that causes the particular ailment module 155 to become active and move to within close proximity of the muscle layer 135, as illustrated in FIG. 8b. The control portion 150 may also send signals to other ailment modules 155 to cause them to become inactive and move away from the muscle layer 135, as illustrated in FIG. 8a. The difference between the active position and the inactive position may be about two inches. Each ailment module 155 may know its location, wait for a signal from the control portion 150 indicating the position to move to, and execute the movement.

Moreover, in operation, the control portion 150 may receive location data, intensity data, depth data, and/or any other data that is determined by the sensor pad 130 and by the ailment module sensor 185 of the ailment module 155 that is active. In some embodiments of the present disclosure, the control portion 150 may even determine additional location data, intensity data, depth data, and/or other data. The determined data may be stored by the control portion 150 and/or may be provided to the terminal 101 in response to the request. In some embodiments of the present disclosure, the terminal 101 may even determine additional location data, intensity data, depth data, and/or other data. The terminal 101 may also store the determined data and/or may display the determine data to a user of the terminal 101. In short, those of ordinary skill in the art will appreciate that various data may be determined for detected abdominal palpations by the abdominal simulator 100, as well as by the terminal 101, and various actions may be taken with respect to the determined data.

Although the first embodiment has been explained above in much detail, those of ordinary skill in the art will appreciate that various modification may be made to the first embodiment. For example, the terminal 101 of FIG. 1 may be integral to, internal to, or part of the abdominal simulator 100 of FIG. 1, instead of being external to the abdominal simulator 100. The touch point 180 of FIGS. 7, 8a, and 8b may have an LED light that may be activated and visible beneath the surface 125 of FIG. 1, or some other indicator (e.g., an indicator on the surface 125), to indicate to the user the proper point (location on surface 125) to press to perform abdominal palpation examinations, so as to help train users in performing abdominal palpation examinations. Furthermore, the abdominal simulator 100 of FIG. 1 may simulate other items, such as a heartbeat, a blood pressure, respiration or breathing, etc. in addition to simulating an ailment.

Portions of the second and subsequent embodiments not specifically described may conform to the above description of the corresponding portions of the first embodiment, unless the description herein indicates to the contrary. While the terms "first embodiment," "second embodiment," etc. are used herein, these terms may be understood as shorthand for a first set of embodiments, second set of embodiments, etc., as each of these terms refers to various possible embodiments.

Figure 9A:
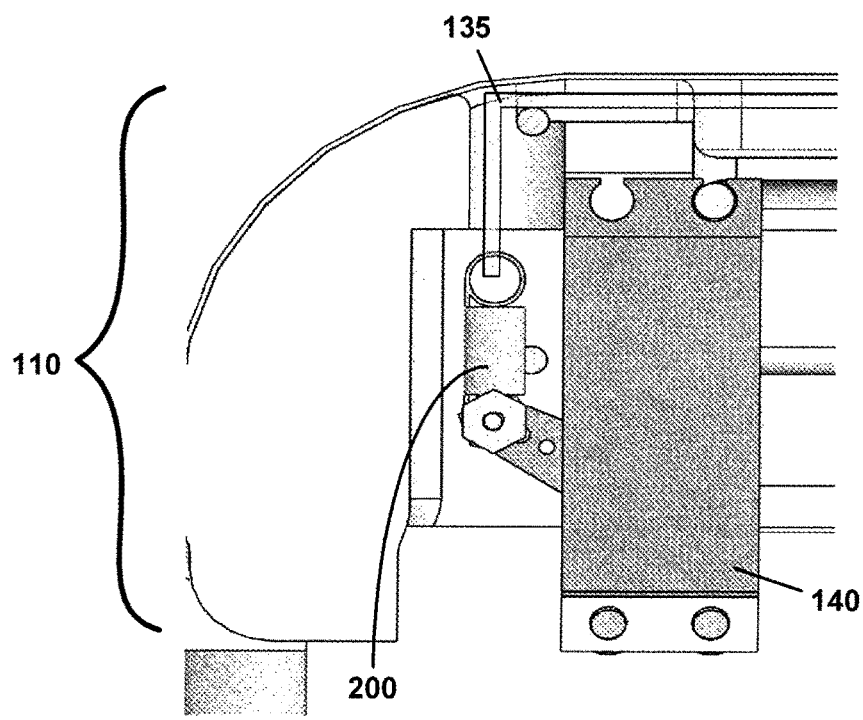
FIGS. 9a and 9b illustrate a more detailed view of a muscle layer and a tensing layer in a second embodiment of the abdominal simulator.
Figure 9B:
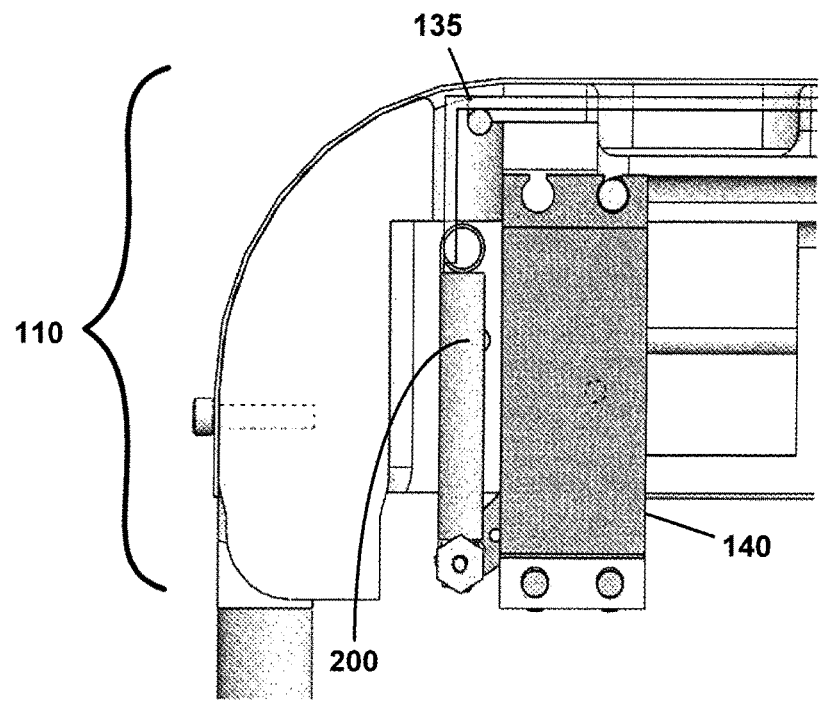

In a second embodiment illustrated in FIGS. 9a and 9b, the muscle layer 135 of FIG. 3 may be a fabric that does not stretch, such as a non-stretchy fabric or a "tarp" material. In this second embodiment, for each muscle layer actuator 140, at least one spring 200 may couple the muscle layer actuator 140 and a portion of the muscle layer 135, and the at least one spring 200 may be utilized to pull and tighten the coupled portion of the muscle layer 135. The at least one spring 200 may relax, with minimal spring force, when it is in a neutral or inactive position, as illustrated in FIG. 9a. In an active position, as illustrated in FIG. 9b, the at least one spring 200 may be preloaded and stretched, which may increase the force required to press the coupled portion of the muscle layer 135. Advantageously, in this second embodiment, the non-stretchy fabric of the muscle layer 135 is unlikely to relax or become overly stretched with time (as may potentially occur with a stretchy fabric). The at least one spring 200 is also unlikely to overly yield with time. Tuning or adjustments may also be easier with the at least one spring 200.

To elaborate further, the springs 200 of this second embodiment may work in combination with the muscle layer actuators 140, instead of the hooks working in combination with the muscle layer actuators 140 as discussed above in connection with FIGS. 1, 3, 4, and 5 of the first embodiment. In this second embodiment, the fabric of the muscle layer 135 does not stretch, and the tensing is achieved by stretching springs 200 at anchor points at the muscle layer actuators 140, instead of the fabric of the muscle layer 135 stretching based on the pull of the muscle layer actuators 140 in the first embodiment. Moreover, this second embodiment with the springs 200 may be thought of as a modified trampoline. A conventional trampoline typically has fixed rings, and when a user jumps on the trampoline, the fabric stays the same (e.g., same size, same shape, etc.) and the springs stretch according to the load. With this second embodiment, the muscle layer actuators 140 may cause the springs 200 to stretch, in essence preloading the springs 200, so when the user presses on the abdominal simulator 100, the load will feel different because of the preloaded springs 200 as compared to when the springs 200 are relaxed. As an example, assume spring force equals spring constant multiplied by distance, and the spring constant is ten. If the muscle layer actuator 140 is inactive and causes the corresponding spring 200 to not be stretched, then the distance equals zero and the spring force equals zero based on the calculation. However, if the muscle layer actuator 140 is active and causes the corresponding spring 200 to be stretched to, say, a distance of five, then the spring force equals fifty (a distance of five times a spring constant of ten) based on the calculation. Thus, a noticeable difference may result when the muscle layer actuator 140 is active.

Figure 10A:
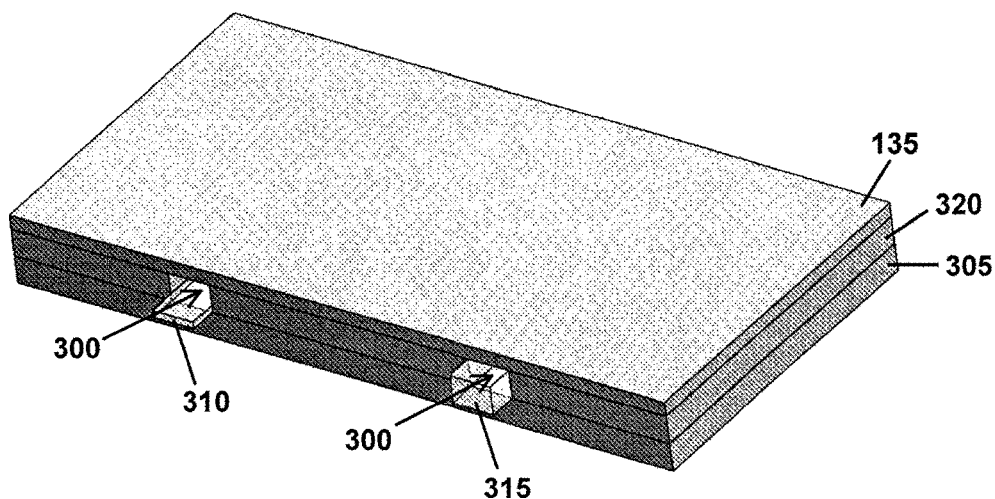
FIGS. 10a and 10b illustrate a more detailed view of a muscle layer and a tensing layer in a third embodiment of the abdominal simulator.
Figure 10B:
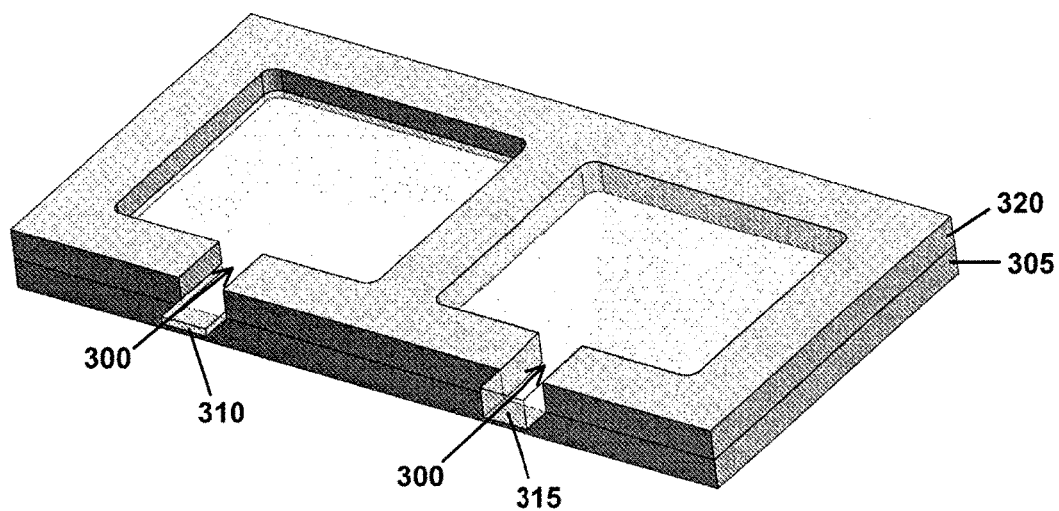

In a third embodiment illustrated in FIGS. 10a and 10b, at least one air bladder 300 may be located beneath the muscle layer 135 of FIG. 3, instead of the at least one muscle layer actuator 140 of FIG. 4. For example, the tensing layer may be at least one air bladder 300 as in FIGS. 10a and 10b, and not the at least one muscle layer actuator 140 of FIG. 4. In some embodiments of the present disclosure, the tensing layer may be a combination of the at least one air bladder 300 of FIGS. 10a and 10b and the at least one muscle layer actuator 140 of FIG. 4.

In this third embodiment, the muscle layer 135 may represent a plurality of layers, and the at least one air bladder 300 may be embedded within the muscle layers 135 (in this case, the tensing layer is below some but not all of the muscle layers 135). At least one gas cartridge may be utilized to inflate the at least one air bladder 300. For example, at least one cartridge containing carbon dioxide may be utilized in a compressor for a pressure driven mechanism that inflates and/or deflates the at least one air bladder 300. Low pressure and/or low volume may be used.

More specifically, a plurality of air bladders 300, such as an air bladder 310 and an air bladder 315 in an air bladder layer 320, may be embedded between the muscle layer 135 and a bottom muscle layer 305, as illustrated in FIGS. 10a and 10b. The muscle layer 135 is not illustrated in FIG. 10b to facilitate visualization of the air bladders 310 and 315. The air bladder 310 is illustrated an uninflated state with no intended force difference from its surroundings, while the air bladder 315 is illustrated in an inflated state with an intended force difference from its surroundings.

Each air bladder 300 should be contained (e.g., between the muscle layer 135 and the lower muscle layer 305 as illustrated in FIG. 10a or via a fabric underneath for support), but various modifications may be made. For example, this third embodiment may include a different quantity of air bladders 300 than illustrated and/or may be tunable through foam, inflation amount, shape, size, etc. As another example, the air bladders 310 and 315 are illustrated in a generally rectangular shape; however, this generally rectangular shape may leave edges that can be felt by a user. To avoid the edges, a different material may be chosen or adjustments may be made to the foam, inflation amount, shape, size, etc. Furthermore, each air bladder 300 may be completely separate (e.g., a separate pouch) or multiple air bladders 300 may be daisy chained or coupled together. Each air bladder 300 may have a corresponding gas cartridge, or a single gas cartridge may run multiple air bladders 300 when multiple air bladders 300 are daisy chained or coupled together. Moreover, the muscle layer 135 may be foam (e.g., like the foam used on high end mattresses), and at least one power supply and at least one manifold may also be included in this third embodiment.

In operation, a particular air bladder 300 may be inflated, such as the air bladder 315, or inflated more than other air bladders 300, to simulate guarding of the portion of the muscle layer 135 that is proximate to the particular air bladder 300. Even if two air bladders 300 are coupled together, one of the air bladders 300 may inflate a little stiffer than the other air bladder 300. Little sound (e.g., a very slight hiss) to no sound should be heard as the particular air bladder 300 transitions from an uninflated state to an inflated state (and vice versa). Preferably, the particular air bladder 300 should be silent while a user performs an abdominal palpation exam to avoid any mnemonics. The amount of inflation, or lack thereof, of the particular air bladder 300 may depend on the particular ailment to be simulated.

Advantageously, the at least one air bladder 300 may be more reliable than the at least one muscle layer actuator 140 of FIG. 4, and may even be cheaper or comparable in cost. Moreover, guarding may be caused when and where wanted and to as large or small an extent as wanted. Indeed, this precision may be easier to accomplish in a muscle layer 135 formed of foam than a muscle layer 135 formed of fabric. For example, tensing may be caused in the location 143 of FIG. 4 in an easier manner, and without using a muscle layer actuator 140 of FIG. 4 at the location 143, when the muscle layer 135 is formed of foam. Power requirements may also decrease because the number of the muscle layer actuators 140 of FIG. 4 in the abdominal simulator 100 of FIG. 1 will be lower. Manufacturing may also be easier, as plastic sheets and foam cut sheets may be used.

Figure 11A:
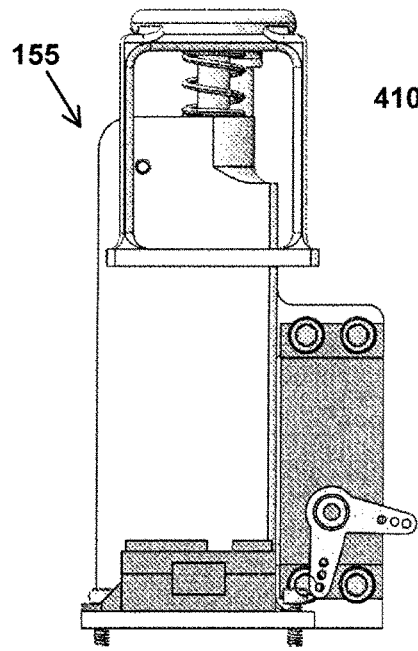
FIGS. 11a, 11b, 11c, and 11d illustrate a more detailed view of an ailment module of an ailment module layer in a fourth embodiment of the abdominal simulator, as compared to the ailment module of FIGS. 7, 8a, and 8b.
Figure 11B:
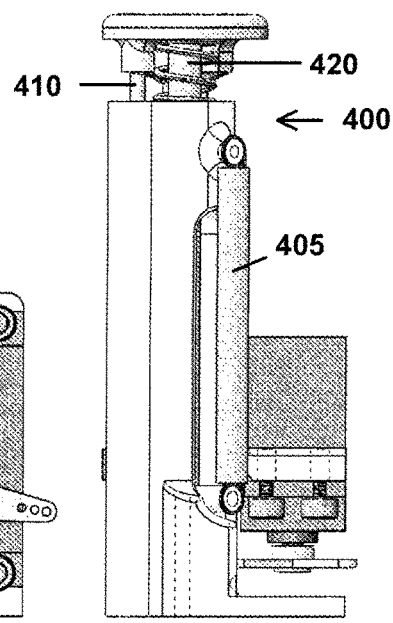
Figure 11C:
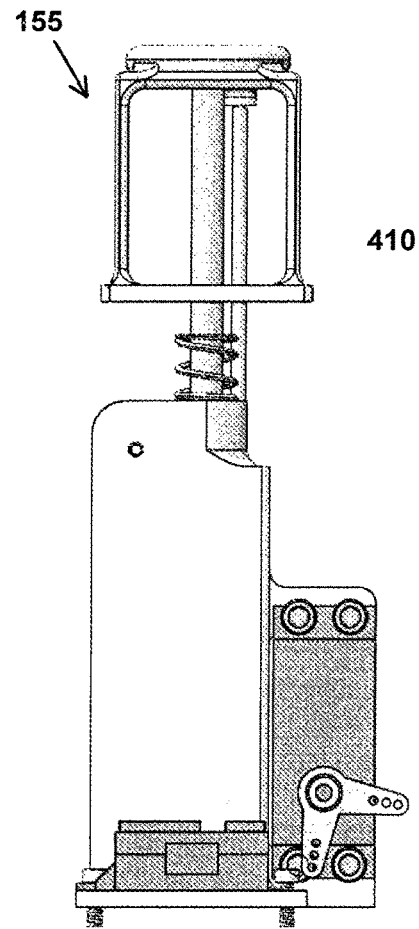
Figure 11D:
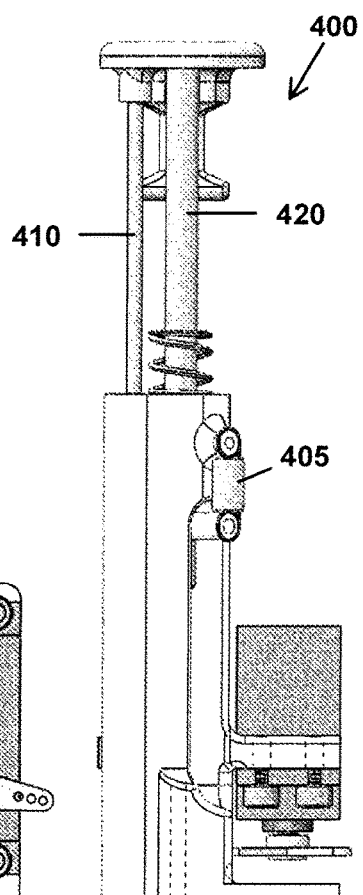

In a fourth embodiment illustrated in FIGS. 11b and 11d, at least one alternative ailment module 400 may be utilized, instead of the at least one ailment module 155 of FIGS. 7, 8a, 8b, 11a, and 11c. FIG. 11a is similar to FIG. 8a, while FIG. 11c is similar to FIG. 8b. The at least one ailment module 155 and the at least one alternative ailment module 400 are physically different and use different springs, but the functionality is similar.

In some instances, the at least one ailment module 155 may make noise (e.g., noise related to the constant force spring 170 of FIGS. 7, 8a, 8b (or rubbing by the constant force spring 170) and friction). Also, the motion of the at least one ailment module 155 may not be continuous and the plunger 160 of FIGS. 7, 8a, 8b may stick (e.g., related to the constant force spring 170 and unnecessary friction), and the size or form factor of ailment module 155 may be greater than desired (e.g., size and form factor related to the constant force spring 170, which are typically only in reel form). The constant force spring 170 may also have a limited life expectancy, between about 4,000 to about 25,000 cycles, with costs increasing with life expectancy.

In light of these considerations, those of ordinary skill in the art will appreciate that at least one non-constant force spring 405 (e.g., an extension spring) may be utilized in the at least one alternative ailment module 400 of this fourth embodiment. For example, the at least one alternative ailment module 400 of FIGS. 11b and 11d may generate less noise, may be easier to assemble, may have a more fluid motion, and may have a smaller size (e.g., reduced ~0.3 inches in both directions and may even be more compact than dimensions may suggest). The at least one non-constant force spring 405 may also have substantially infinite life and may be cheaper. Indeed, as long as the proper spring is utilized, constant force may not be needed. FIG. 11b illustrates the alternative ailment module 400 in an inactive position with the at least one non-constant force spring 405 in a stretched position. FIG. 11d illustrates the alternative ailment module 400 in an active position with the at least one non-constant force spring 405 in a contracted position.

This fourth embodiment may also include other modifications. The at least one alternative ailment module 400 may include different bushings, such as linear bearings, which may add cost, but may reduce friction. Depending on the implementation, the alternative ailment module 400's rod 410 that is coupled to a plunger 420 may be a ground, hardened steel rod, instead of an aluminum rod as may be the case for rod 187 in FIGS. 8a and 8b. If the rod 410 is a ground, hardened steel rod, then it may increase load (as steel weighs more than aluminum) and may affect the choice of spring used. For example, if a spring causes about 1.5 lbf resistance, then increasing the weight of the assembly suspended from the spring may warrant a slightly stiffer spring. The clearance around the spring may also be increased to reduce friction. Moreover, a combination of an ailment module 155 and an alternative ailment module 400 may be used.

In a fifth embodiment, the sensor layer may be in a different location in the abdominal simulator 100. In the first embodiment, the sensor layer, such as the sensor pad 130, may be located between the surface layer, such as the surface 125, and the muscle layer, such as the muscle layer 135. However, in this fifth embodiment, the sensor layer may be coupled to the base 156 of FIG. 6 to monitor whatever item is above the ailment modules 155 of FIG. 6 (e.g., the at least one air bladder 300 of FIGS. 10a and 10b, the muscle layer 135 of FIG. 3, the surface layer, such as the surface 125, of FIG. 1, etc.).

Moreover, the sensor layer of this fifth embodiment may be different from the sensor pad 130 of the first embodiment. For example, the sensor layer of this fifth embodiment may include at least one non-contact sensor and may determine the location data and/or the depth data, whereas the sensor pad 130 of the first embodiment may include at least one contact sensor and may determine the location data and/or the intensity data. More specifically, this fifth embodiment may include a plurality of non-contact sensors, such as about sixty-four non-contact sensors, or fewer or more than sixty-four non-contact sensors. The plurality of non-contact sensors may be in a grid pattern or placed in practically any manner that allows the location data and/or the depth data to be determined. The plurality of non-contact sensors may determine the location data and/or the depth data by monitoring whatever item is above the ailment modules 155 and analyzing changes to whatever item is above the ailment modules 155. In this fifth embodiment, the ailment modules 155 may still be present and function as described herein, but may not determine the depth data because the sensor layer of this fifth embodiment may determine the depth data.

Turning now to the computer related components, as illustrated in FIGS. 1, 2, 3, 4, 6, 7, 8a, 8b, 13, 14, and 15, the terminal 101 may communicate with the abdominal simulator 100 (e.g., the control portion 150) and vice versa. Methods of simulating an ailment that can be diagnosed by an abdominal palpation exam and analyzing an abdominal palpation exam will be described below (and later in this disclosure with reference to FIG. 12).

For setup or initialization of the simulator, "tuner" computer programs, of terminal 101 and of control portion 150, respectively, may be executed (e.g., in tandem). For example, program code of the "tuner" computer programs may be executed during initial assembly or during maintenance (e.g., replacement of the muscle layer 135 of FIG. 3, replacement of any muscle layer actuator 140 or any ailment module actuator 165, repair of any muscle layer actuator 140 or any ailment module actuator 165, etc.).

As for the terminal 101, both an interface (e.g., a graphical user interface (GUI) 600) (FIG. 13) and a "tuner" computer program of the terminal 101 may be utilized to setup the active and inactive positions of each actuator of the abdominal simulator 100. This "tuner" computer program may be written using the National Instruments® Labview language, as the Labview language may be the most readily capable of displaying data of the sensor pad 130 (e.g., location data and/or intensity data) in a graphical way. The "tuner" computer program may be written in another language. More specifically, a user (e.g., an evaluator) may enter a desired angle for each actuator (e.g., each muscle layer actuator 140 and each ailment module actuator 165) via the interface 600 of the terminal 101. Each desired angle may be converted to a string and sent to the control portion 150 of FIG. 6 of the abdominal simulator 100.

As for the control portion 150, a "tuner" computer program of the control portion 150 may also be utilized to setup the active and inactive positions of each actuator of the abdominal simulator 100. This "tuner" computer program may be written in a language that is compatible with the control portion 150, such as the Arduino programming language. More specifically, the control portion 150 may calculate an appropriate pulse width value corresponding to the desired angle for each actuator. The actuators may vary in angle based on a pulse-width ranging from about 900 microseconds to about 2100 microseconds, where about 900 microseconds is about zero degrees and about 2100 microseconds is about one hundred and eighty degrees. In some embodiments of the present disclosure, the actuators may have slightly different timings. Nonetheless, the control portion 150 may use the following calculation to determine a position, which is a linear interpolation of the pulse width and the corresponding angle:

$$PW@DA = PW@O - \frac{(DA - LDL)}{(UDL - LDL)} \times (PW@O - PW@180)$$

where:
1) PW@DA is the (P)ulse (W)idth at the (D)esired (A)ngle, as well as output to the terminal 101
2) DA is the (D)esired (A)ngle
3) PW@O is the (Pulse (W)idth at zero degrees, which is specified by an actuator's manufacturer
4) PW@180 is the (P)ulse (W)idth at one hundred and eighty degrees, which is specified by an actuator's manufacturer
5) LDL is the (L)ower (D)egree (L)imit, which may be zero degrees for the calculation to work
6) UDI is the (U)pper (D)egree (L)imit, which may be one hundred and eighty degrees for the calculation to work The control portion 150 of the abdominal simulator 100 may be configured to perform this calculations internally (i.e., the user sends a desired angle and the control portion 150 calculates the appropriate pulse width). Indeed, the control portion 150 may calculate pulse width for each actuator, for any desired angle. A pulse width may be calculated using microseconds for the vast majority of actuators.

Each calculated pulse width for each actuator may be sent back to the terminal 101 to display to the user. For example, by doing so, the calculated pulse width of a particular actuator may be reused in case the particular actuator experiences a failure. Each calculated pulse width may also be entered into a separate program of the control portion 150, such as the control portion 150's "command and control" computer program (discussed further hereinbelow). The control portion 150's "command and control" computer program may be written in practically any language, such as the Arduino programming language. When an ailment is to be simulated, the appropriate pulse width value that was calculated by the control portion 150 may be sent to the appropriate actuator via the control portion 150's main program. Each actuator executes the appropriate movement (e.g., to an inactive position or to an active position) in response to the calculated pulse width received from the control portion 150.

Figure 14:
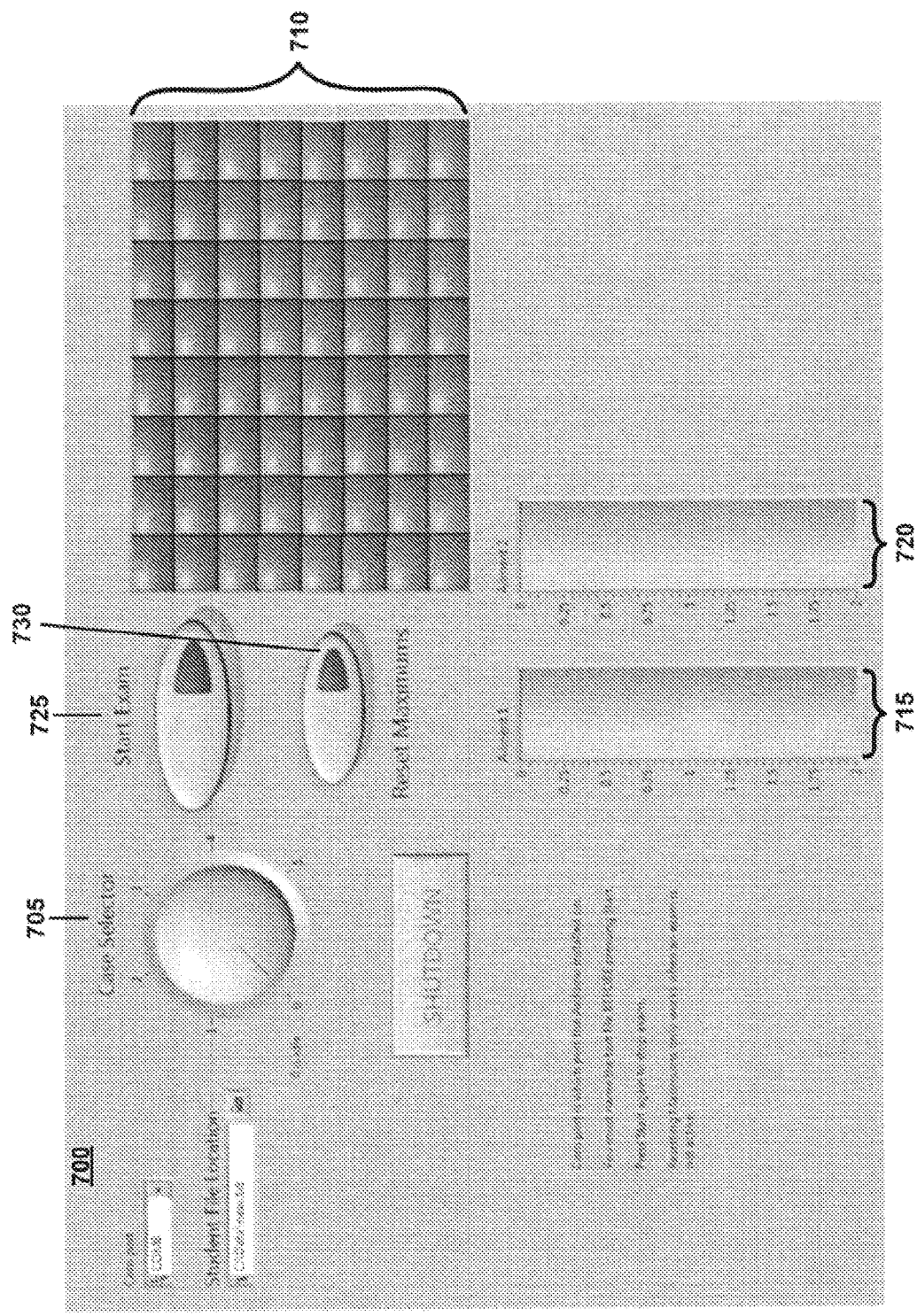
FIG. 14 illustrates another exemplary graphical user interface of a terminal that is coupled to the first embodiment abdominal simulator of FIG. 1.

"Command and control" computer programs of terminal 101 and of control portion 150, respectively, may be executed (e.g., in tandem) for simulating an ailment that can be diagnosed by an abdominal palpation exam and analyzing an abdominal palpation exam. Both an interface (e.g., a GUI 700 as illustrated in FIG. 14) and a "command and control" computer program of the terminal 101 may be utilized for simulating ailments and analyzing abdominal palpation exams. A "command and control" computer program of the control portion 150 may also be utilized for simulating an ailment that can be diagnosed by an abdominal palpation exam and analyzing an abdominal palpation exam.

More specifically, a user (e.g., an evaluator) of the terminal 101 may indicate via the GUI 700 which ailment is to be simulated. As illustrated in FIG. 14, the user may select the particular ailment he or she wants to simulate via the "Case Selector" button 705 of GUI 700. The GUI 700 may also be utilized to name files, indicate where files are to be saved, indicate when to start or stop, reset data (e.g., reset depth data that was determined at and received from the abdominal simulator 100), and display data (e.g., displaying location data, intensity data, and/or depth data that was determined at and received from the abdominal simulator 100). For example, image 710 is a digital representation of the entire sensor pad 130, and the location data and/or the intensity data determined by the sensor pad 130 may be illustrated at the image 710. The depth data determined by a first ailment module 155 may be illustrated at image 715, the depth data determined by a second ailment module 155 may be illustrated at image 720, and so on.

An integer corresponding to the selected case (see case selector button 705) may be sent by the terminal 101 to control portion 150 of the abdominal simulator 100. The integer may indicate to the control portion 150 which ailment module 155 to make active, which muscle layer actuators 140 to make active (to cause guarding or tensing in the coupled portion of the muscle layer 135), which ailment module to make inactive, which muscle layer actuators 140 to make inactive, etc.

As an example, an evaluator may select appendicitis via the case selector button 705 of GUI 700 and press a "start exam" button 725 of GUI 700 out of a medical student's sight, for example, to avoid mnemonics. The integer corresponding to appendicitis may be sent from the terminal 101 to the control portion 150 of the abdominal simulator 100. The medical student may also be given a lab report and patient information, both of which may include test results, symptoms, etc. suggesting appendicitis. The medical student is not told that appendicitis is the diagnosis in question. The order and specifics of these events may depend on implementation.

The control portion 150 may receive and read the integer from the terminal 101, and will set the various actuators of the abdominal simulator 100 to the appropriate positions to simulate the ailment corresponding to the integer. More specifically, each integer may be associated with a scenario. Each actuator will be either active or inactive for that scenario and the microseconds may be written accordingly. The control portion 150 may send a signal to each actuator indicating the movement via pulse width modulation. If the abdominal simulator 100 uses air bladders 300 as in FIGS. 10a and 10b, the control portion 150 may cause the various air bladders 300 to be positioned accordingly.

Continuing with the appendicitis example, any muscle layer actuator 140 that is related to appendicitis will receive a signal indicating a movement towards the active position and will move towards the active position (to tighten the coupled portion of the muscle layer 135 in the location where the appendix is generally found). Any muscle layer actuator 140 that is not related to appendicitis will receive a signal indicating a movement towards an inactive position and will move towards the inactive position (to loosen the coupled portion of the muscle layer 135). If already in the correct position, an actuator may not cause any movement. Furthermore, the ailment module actuator 165 of the particular ailment module 155 that is related to appendicitis will receive a signal indicating a movement towards the active position and will cause movement towards the active position (close to the muscle layer 135 in the location where the appendix is generally found). Ailment module actuators 165 of ailment modules 155 that are not related to appendicitis will receive signals indicating a movement towards an inactive position and will cause movement towards the inactive position. If already in the correct position, an ailment module actuator 165 may not cause any movement.

By virtue of these adjustments, guarding may be felt by the medical student when he or she presses down on the surface 125 in the area where the appendix is generally found, which may in turn indicate to the medical student that he or she is on the right track. Furthermore, lack of guarding in the other areas of the surface 125 when the medical student presses the other areas also may indicate to the medical student that he or she is on the right track.

The control portion 150 may detect at least one abdominal palpation that is performed by a user, determine data for the at least one abdominal palpation that was detected, and provide the data that was determined. For example, the control portion 150 may "scan" the sensor pad 130 by enabling a digital output pin and reading eight analog in channels. Once all eight analog in channels have been read, the digital output may be turned off, and the next digital output may be turned on, and the process continues until about all sixty four data points are captured. Additional data points, which are associated with the ailment modules 155, and specifically the ailment module sensors 185 that are measuring the distance the plunger 160 moves down in response to the medical student's press, may also be captured. For example, if there are two ailment module sensors 185, as illustrated in FIG. 6, then data points for both may be captured, if there are ten ailment module sensors 185 then data points for the ten may be captured, etc. In some embodiments of the present disclosure, however, data may only be captured from the ailment module sensor 185 of the ailment module 155 corresponding to the simulated ailment. Nonetheless, the data that is captured may be the determined location data, intensity data, and/or determined depth data, and this determined data may be sent to the terminal 101 to be displayed and/or stored.

Continuing with the appendicitis example, the medical student may proceed to conduct an abdominal palpation exam on the abdominal simulator 100. The sensor pad 130 and the ailment module sensor 185 of the ailment module 155 corresponding to appendicitis may determine data (e.g., location data, intensity data, depth data, and/or other data) for at least one palpation performed by the medical student. The control portion 150 may store the determined data and/or provide the determined data to the terminal 101 for display and/or storage.

The determined data that is received at the terminal 101 may be displayed and/or stored (e.g., a text file). Continuing with the example, the determined data from the sensor pad 130 may be displayed via the image 710 of GUI 700. For instance, a particular square may light up due to the location data that was determined and the particular color that the square is lit may indicate the intensity data that was determined (e.g., change color based on measurements). Assuming that image 715 corresponds to the ailment module 155 related to appendicitis, the image 715 may display the depth data that was determined by the ailment module sensor 185 thereof. If the medical student pressed one and half inches, then the area of zero inch to one and half inches (i.e., 0 inch to 1.5 inches) of the image 715 may be lit up. The image 715 should be consistent with the image 710. The image 720 may not display any data because it corresponds to an ailment module 155 that is inactive and out of the way, and therefore, unlikely to have been pressed by the medical student.

The evaluator may be the only one that views the determined data that is displayed, or both the medical student and the evaluator may view the determined data that is displayed. The text file may also store substantially all of the data that is determined, almost like a recording. The text file may be played back or viewed later, as appropriate, via GUI 800 (FIG. 15) or via an appropriately modified version of GUI 700. The evaluator may make manual conclusions and provide guidance to the medical student based on the determined data that is displayed at the terminal 101 and/or upon viewing the text file later on, as appropriate.

In some embodiments of the present disclosure, determining data and providing data (at 525) and displaying the determined data (at 530) may occur in near real time or real time, but such need not be necessary. How quickly the control portion 150 may be able to scan the sensor pad 130, capture the various data that is determined, and provide the determined data, which in turn affects how quickly the determined data may be displayed on the terminal 101, may depend on the particular control portion 150 that is utilized.

As previously indicated, the data that is determined may focus on maximum values. For example, instead of capturing all positions and all depths pressed by the medical student, the furthest depth pressed by the medical student at a particular position may be captured by the sensor pad 130. Similarly, instead of capturing all depths pressed by the medical student via the ailment module 155 corresponding to appendicitis, the furthest depth pressed by the medical student may be captured by the ailment module sensor 185. As an example, if the medical student pressed way down two inches, but then went back and pressed down one and half inches, the images 710 and 715 may reflect two inches.

By determining maximum values, such as the furthest depth, the evaluator may manually come to the conclusion that the medical student was in the right area of the abdomen (and correctly understood that the ailment in question was appendicitis), but simply pressed too far down. The medical student may respond by explaining why he or she pressed so far down, the medical student may ask the evaluator for guidance, and/or the evaluator may provide guidance to the medical student. The evaluator may also manually generate his or her conclusions at a later time, such as when reviewing the text file via the GUI 800. The evaluator may press the reset maximums button 730 before starting the next evaluation.

Of note, in some embodiments of the present disclosure, conclusions based on the determined location data that is received from the abdominal simulator 100 may be automatically generated at the terminal 101, displayed via the terminal 101, and stored via the terminal 101. For example, the following conclusions may be automatically generated via the terminal 101: (a) whether the medical student pressed in the wrong area for the simulated ailment during the entire abdominal palpation exam, (b) whether the medical student pressed in the wrong area and then pressed in the correct area for the simulated ailment during the abdominal palpation exam, (c) whether the medical student pressed in the correct area for the simulated ailment during the entire abdominal palpation exam, etc. Likewise, in some embodiments of the present disclosure, conclusions based on the determined location data may be automatically generated at the abdominal simulator 100 (e.g., by the control portion 150) based on the determined location data, stored at the abdominal simulator 100, provided to the terminal 101, displayed via the terminal 101, and/or stored via the terminal 101.

Moreover, in some embodiments of the present disclosure, conclusions based on the determined depth data that is received from the abdominal simulator 100 may be automatically generated at the terminal 101, displayed via the terminal 101, and stored via the terminal 101. For example, the following conclusions may be automatically generated via the terminal 101: (a) whether the user pressed down too far, (b) whether the user did not press down far enough, etc. Likewise, in some embodiments of the present disclosure, conclusions based on the determined depth data may be automatically generated at the abdominal simulator 100 (e.g., by the control portion 150) based on the determined depth data, stored at the abdominal simulator 100, provided to the terminal 101, displayed via the terminal 101, and/or stored via the terminal 101.

Similarly, conclusions based on the determined intensity data that is received from the abdominal simulator 100 may be automatically generated at the terminal 101, displayed via the terminal 101, and stored via the terminal 101. Likewise, in some embodiments of the present disclosure, conclusions based on the determined intensity data may be automatically generated at the abdominal simulator 100 (e.g., by the control portion 150) based on the determined intensity data, stored at the abdominal simulator 100, provided to the terminal 101, displayed via the terminal 101, and/or stored via the terminal 101.

Other conclusions may also be automatically generated at the terminal 101 and/or the abdominal simulator 100, displayed via the terminal 101, and/or stored at the abdominal simulator 100 or via the terminal 101. For example, the following exemplary conclusions may be automatically generated at the terminal 101 and/or the abdominal simulator 100: (a) whether too many abdominal palpations were performed, (b) whether too few abdominal palpations were performed, (c) progression of a medical student over time, (d) comparisons between a plurality of medical students, (e) patterns using historical data, etc.

In short, data may be determined, displayed, and/or stored in the abdominal simulator 100 and/or the terminal 101 depending on the exact implementation (e.g., whether or not the terminal 101 is external to the abdominal simulator 100). By automatically generating conclusions, feedback may be more objective and more meaningful conclusions may be generated (e.g., based on historical data), which may also lead to faster and more effective training and evaluation of users on performing abdominal palpation exams.

Figure 15:
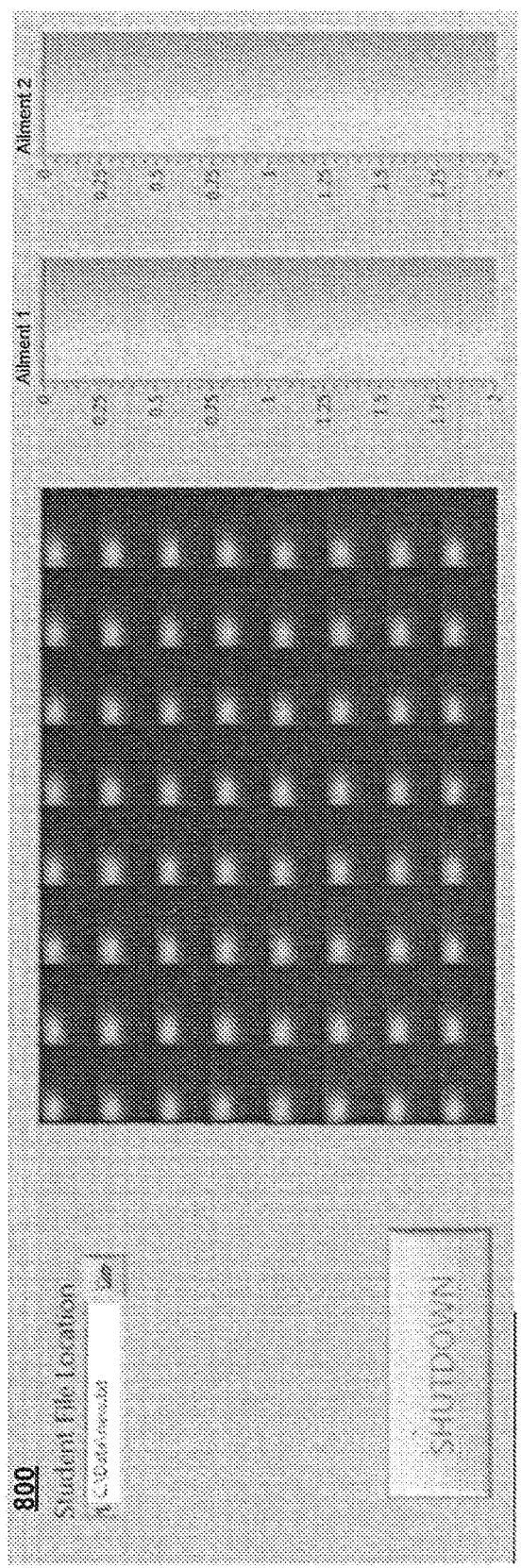
FIG. 15 illustrates yet another exemplary graphical user interface of a terminal that is coupled to the first embodiment abdominal simulator of FIG. 1.

Lastly, as illustrated in FIG. 15, both an interface (e.g., the GUI 800 or an appropriately modified version of GUI 700) and a "post process" computer program of the terminal 101 may be utilized to display the data recorded in the text file on the terminal 101. The text file may be received from the abdominal simulator 100 or generated at terminal 101. The "post process" computer program may read the text file, parse the data, and display the data in the corresponding graphical features (e.g., via the GUI 800 or an appropriately modified version of GUI 700). In short, the abdominal simulator 100 and the terminal 101 may utilize about two or three computer interfaces, as well as the "tuner" computer programs, the "command and control" computer programs, and the "post processing" computer program. The order and specifics of each may vary based on the implementation.

Those of ordinary skill in the art may appreciate that the abdominal simulator 100 and the terminal 101 may lead to improvements in training and evaluating users on performing abdominal palpation exams. For example, the medical student in the appendicitis example may read a lab report, think that it indicates appendicitis, and confirm a diagnosis of appendicitis by performing the abdominal palpation exam on the abdominal simulator 100. As another example, the medical student may not realize that the lab report suggests appendicitis and may spend a lot of time in other sections of the abdomen, or not spend as much time on the appendix area. As another example, the medical student may not know the apparent diagnosis and may spend about the same amount of time over each section of the abdomen.

Regardless of the medical student's actions, though, the evaluator will be able to get a better picture of how the medical student performed the abdominal palpation exam in real-time and/or at a later time via the embodiments described herein. The evaluator will be better able to understand what the medical student did right or wrong. Furthermore, the evaluator may be able to discuss the medical student's performance with the medical student in real time or at a later time. The evaluator may also be able to ask the medical students questions to understand why the medical student did what he or she did, as well as confirm that the medical student's thinking was on track and not a guess. The evaluator may also be able to generate better manual conclusions (e.g., that the medical student pressed too hard or not hard enough) and may provide more constructive feedback. Conclusions may also be automatically generated, as discussed herein, and lead to further improvements. For instance, new medical students may make similar errors and conclusions may be automatically generated to provide faster and consistent feedback to the new medical students. Medical students may even be able to quiz themselves or practice on the abdominal simulator 100, without an evaluator, and use the conclusions that may be automatically generated. Moreover, the abdominal simulator 100 may simulate abdominal guarding (e.g., tightening of the muscle area above the problem organ), and in turn, simulate ailments in a realistic manner. Thus, the medical students may build muscle memory of what guarding feels like, and be able to verify an ailment suspected from the lab report.

Additional embodiments of the present disclosure will now be described with reference to FIGS. 12 and 19-30. (References made herein to a group of numerically consecutive figures, e.g., FIGS. "19-30," are intended to refer to all the figures within the indicated numerical range, including those figures that also include a letter designation, e.g., FIGS. 23A, 23B, and so on.) These embodiments represent variations of elements and features of the embodiments described heretofore. Aspects of these embodiments not specifically described below may conform to the description of the corresponding aspects of embodiments described above, unless the description herein indicates to the contrary. The following embodiments are described without reference to the descriptive terms "top portion 110," "middle portion 115" and "bottom portion 120" used with reference to the embodiments described heretofore, as those descriptive terms are for narrative convenience and may be omitted.

Figure 19:
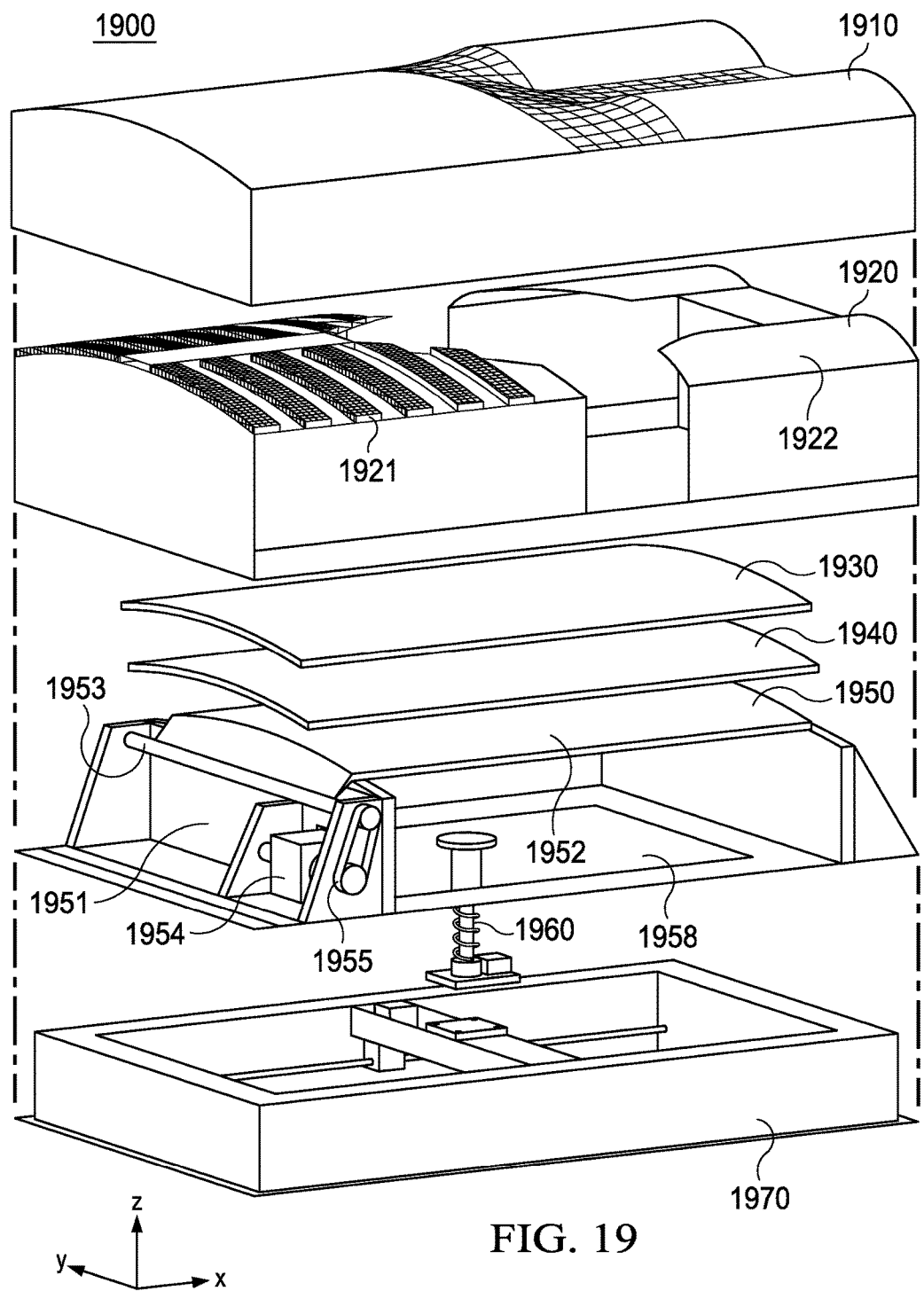
FIG. 19 illustrates an abdominal simulator, according to some additional embodiments.

FIG. 19 is an exploded perspective view illustrating an abdominal simulator, according to some embodiments. As FIG. 19 illustrates the overall apparatus, not all details are shown therein. At least some of the details omitted from FIG. 19 are included in FIGS. 20-27. As seen in FIG. 19, an abdominal simulator 1900 includes a skin portion (or layer) 1910; a bone portion (or layer) 1920, which may also be referred to as a structural housing 1920; a sensor portion (or layer) 1930; a muscle portion (or layer) 1940; a tensing portion (or layer) 1950; an actuator portion 1960 including one or more actuators (one illustrated) which, for convenience, may also be referred to by reference number 1960; and an actuator transport portion (or device) 1970. The term "surface portion" may be used to refer to skin portion 1910, to bone portion 1920, or to both skin portion 1910 and bone portion 1920 collectively (the last usage notably in embodiments where skin portion 1910 and bone portion 1920 are formed as a single integrated element, and in embodiments where one of skin portion 1910 and bone portion 1920, for example, the latter, is omitted from the abdominal simulator 1900.) Although not illustrated in FIG. 19, abdominal simulator 1900 may also include a control portion, computer software, a user interface portion including one or more user interface devices, and additional computer hardware. According to some embodiments, abdominal simulator 1900 may include a single user interface device for all users. According to some embodiments, abdominal simulator 1900 may include different kinds of user interface devices for different kinds of users, respectively. For example, abdominal simulator 1900 may include one kind of user interface device for users who is are evaluators, e.g., doctors or professors who evaluate medical students, and another kind of user interface device for users who are being evaluated, e.g., medical students. According to some embodiments, abdominal simulator 1900 may include a plurality of user interface devices for a plurality of different users, respectively (where the different users may include users of the same kind and/or of different kinds). As will be clear from the description of FIGS. 19-27, there is not necessarily a one-to-one correspondence between elements of abdominal simulator 1900 and elements of abdominal simulator 100 described above with reference to FIGS. 1-18, and not all of the above-mentioned elements of abdominal simulator 1900 necessarily correspond in content or function to correspondingly named elements of abdominal simulator 100 described above with reference to FIGS. 1-18. While the term "layer" is used herein for simplicity, and while various embodiments are disclosed in which simulated anatomical elements are formed with anatomical similitude, the term "layer" is not to be understood as limiting the shape or configuration of the so-named element.

While FIG. 19 illustrates abdominal simulator 1900 in a rectangular shape which to some extent simulates the anatomy of a human torso and abdomen (e.g., the configuration of the skin and bones, the curvature of the torso and abdomen), abdominal simulator 1900 may be formed in another shape, as described above with reference to FIGS. 1 and 16-18, e.g., a shape that more closely or less closely simulates a human (or animal) abdomen, torso and adjoining regions.

Skin layer 1910 may serve to simulate human skin, both in appearance and feel, and may be referred to as a synthetic skin portion. Skin layer 1910 serves as a surface that may be touched and as a surface of an abdomen on which palpations may be performed, e.g. to diagnose abdominal ailments simulated by abdominal simulator 1900. Skin layer 1910 may be formed of Dragon Skin® silicone rubber by Smooth-On, Inc. (https://www.smooth-on.com), another Smooth-On product, another silicone rubber, urethane, foam rubber, or another suitable material. Skin layer 1910 may be formed by creating a cast in the desired configuration (shape, size) of abdominal simulator 1900, mixing and pouring the liquid synthetic skin onto the cast, curing (drying), and removing the skin mold from the cast. The skin mold (skin layer 1900) may then be fastened to the bone layer/structural housing 1920, by any suitable means. Preferably, skin layer 1910 may be formed to have a uniform thickness over its entire extent. Appropriate formation of the cast may facilitate achievement of this uniformity. Skin layer 1910 may be made to fit the configuration of bones of bone layer 1920, or may be loose-fitting. Skin layer 1920 may be made to extend over the entire abdominal region and any portion or all of the remaining x-y extent (extent in the x and y directions as defined by the x-y-z axis in FIG. 19) of bone layer/structural housing 1920. In this regard, it will be recalled that the x-y extent of abdominal simulator 1900 may differ from, e.g., exceed, that illustrated in FIG. 19, for example, in the case in which abdominal simulator 1900 simulates more extensively a human form, such as shown in FIG. 16. In accordance with the method of forming skin layer 1910 described here, skin layer 1910 may be removably fastened to the bone layer/structural housing 1920. According to some embodiments, skin layer 1910 may be formed integrally, e.g., non-removably, with bone layer/structural housing 1920 or more generally with abdominal simulator 1900. For example, skin layer 1910 and bone layer/structural housing 1920 may be formed as a single integrated layer.

Bone layer 1920 may serve to simulate a pertinent portion of a human skeleton (e.g., the ribs 1921, or a lower portion thereof, and the pelvis 1922, or an upper portion thereof, e.g., the iliac crests), both in appearance and feel, and may be referred to as a synthetic bone portion. For example, bone layer 1920 may provide a realistic shape of bones projecting under skin layer 1910 and a realistic feel of bones under skin layer 1910 to a user who touches or presses on skin layer 1910. While bone layer 1920 supports skin layer 1910, it is not necessarily required as structural support for abdominal simulator 1900. Bone layer 1920 may be formed of a suitably rigid material to achieve the simulation here described. One example of such material is acrylonitrile butadiene styrene (ABS). Bone layer 1920 may be formed from an ABS plastic sheet having a thickness of 3/16.″ Other possible materials include other plastics, metals, resins, woods, etc. According to some embodiments, bone layer 1920 may be formed by creating a mold of the ribcage and pelvis/upper legs, thermoforming or vacuum forming bone layer 1920 using the ABS plastic sheet and the mold, and then removing the formed bone layer 1920 from the mold. Formed bone layer 1920 may then be fastened (removably or irremovably) to the periphery of actuator transport portion 1970 by any suitable means, e.g., fasteners, hinges, etc. According to some embodiments, bone layer 1920 may be formed in an integrated manner with actuator transport portion 1970. According to some embodiments, bone layer 1920 may be formed by 3-D printing or additive manufacturing. As manner.

Figure 20:
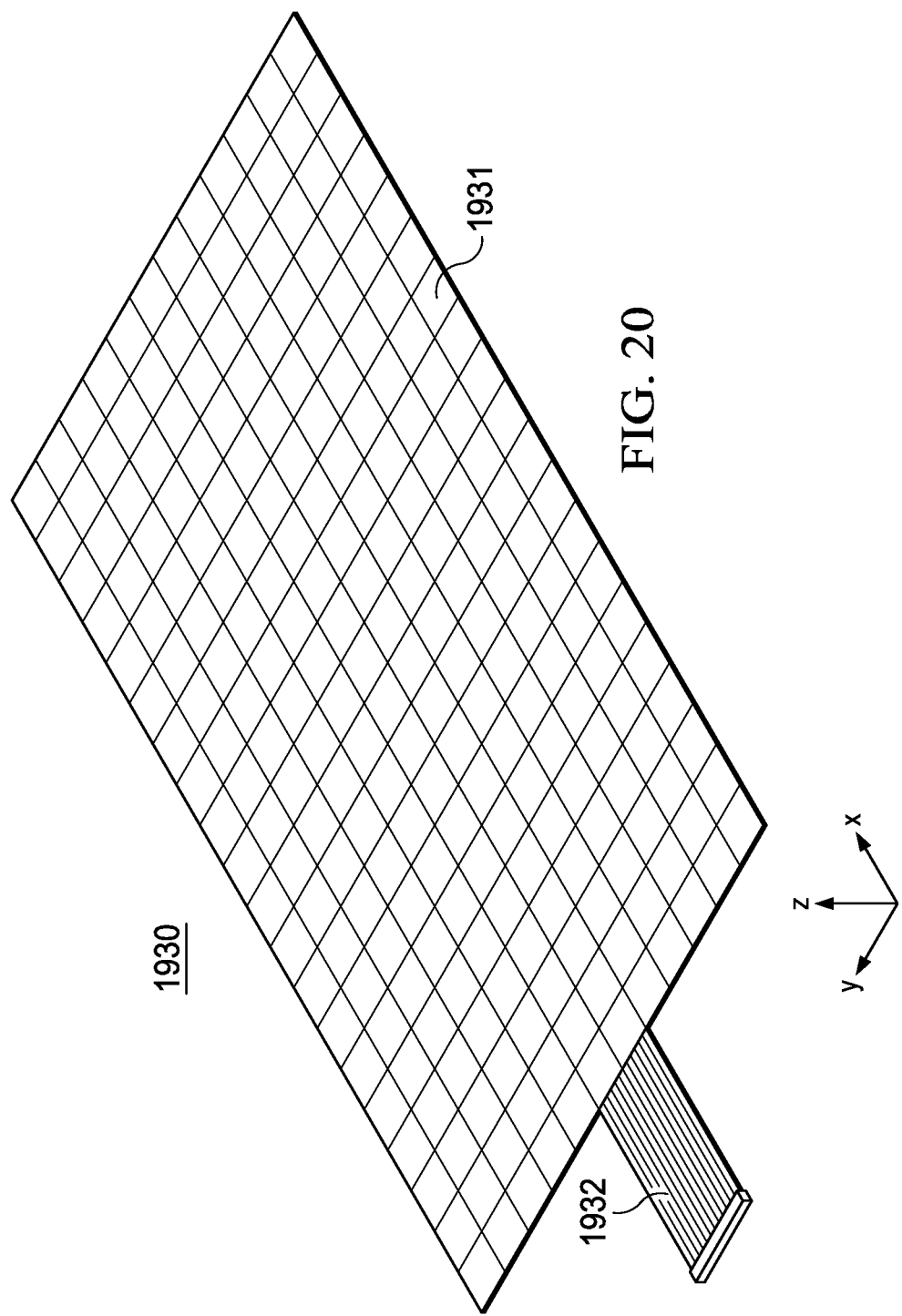
FIG. 20 illustrates a sensor portion of an abdominal simulator, according to some additional embodiments.

Sensor layer 1930 will now be described with reference to FIG. 20, which is a perspective view of sensor layer 1930, according to some embodiments. Sensor layer 1930 may be disposed within or on the abdominal simulator and may be configured for detecting contact (e.g., a physical stimulus) made with sensor layer 1930 directly or indirectly. The term "indirectly" is used here to mean that the contact, so to speak, is via one or more intervening media, e.g., skin layer 1910 and/or bone layer 1920. Correspondingly, "directly" means without any intervening media. Sensor pad 1930 may by suitable means be affixed to or embedded within adjacent layer(s), e.g., skin layer 1910, bone layer 1920, or muscle layer 1940.

Sensor layer 1930 may comprise a sensor pad, which may be referred to by the same reference number for convenience. Sensor pad 1930 may include a piezoelectric sensor, which outputs electric voltage in an amount that varies according to the amount of pressure applied to it. In this way, sensor pad 1930 detects and measures pressure. Accordingly, sensor pad 1930 includes an electroconductive grid 1931 embedded within a fabric material as shown, and a data ribbon cable 1932 for transmission of electric signals (indicating detected and measured pressure) to a control portion such as control portion 150 described above with reference to, e.g., FIG. 6. The electroconductive grid 1931 may be thought of as an x-y Cartesian coordinate system, and it permits the locations of contact therewith (e.g., contact made during palpations), as defined by such x-y coordinate system, to be detected. The control portion may also be configured to determine temporal duration of the contact with the sensor pad 1930 and depth of the corresponding palpation, from the electric signals indicating the detected and measured pressure.

The control portion may record the electric signals (indicating, e.g., detected and measured pressure, location, temporal duration, and/or depth), cause them to be stored in a storage medium, and/or send them or data pertaining to them to a user interface portion (e.g., terminal 101 as described above with reference to, e.g., FIG. 1). As described, the electric signal data may pertain to the location, pressure (intensity), depth, and/or temporal duration of one or more palpations performed on the abdominal simulator by, e.g., a user who is a trainee (e.g., a medical student being trained to perform abdominal palpations). Such data may be provided as feedback to the trainee user and/or to a user who is an evaluator (e.g., an instructor of the medical student), and it may be used to assess the performance of the trainee user in performing the palpation(s), performing a medical examination, determining a diagnosis, etc. The data may also be used by the control portion, in association with the applicable other components of abdominal simulator 1900, to trigger appropriate tactile responses from other portions of the abdominal simulator 1900 (e.g., guarding by the muscle layer 1940, organ inflammation by second (organomegaly) air bladders of muscle layer 1940, tenderness and/or pushback by actuator(s) 1960) and/or to trigger an auditory simulated patient response (e.g., groans, cries of pain, etc.), as described elsewhere herein. The auditory simulated patient response may be controlled so as to vary based on the palpation, e.g., to change in content, intensity, volume, frequency, etc. as the palpations get closer to the location of the pain (i.e., location of the simulated ailment—tenderness, etc.), as the palpations become more forceful, or as the palpations change in another way.

The description of sensor layer 130 given above with reference to, e.g., FIG. 2 is applicable to sensor layer 1930. According to some embodiments, alternative piezoelectric sensors or even other types of sensors, e.g., infrared sensors, may be used to detect the location, pressure, depth, and/or temporal duration of contact or of a palpation, as applicable. (The operation of infrared sensors in this regard has been discussed above.) According to some embodiments, sensor layer 1930 may be disposed between skin layer 1910 and bone layer 1920, instead of between bone layer 1920 and muscle layer 1940 (FIG. 19 illustrates the latter arrangement). According to some embodiments, a second sensor layer 1930 may be disposed between skin layer 1910 and bone layer 1920, in addition to the sensor layer 1930 between bone layer 1920 and muscle layer 1940.

Muscle layer 1940 will now be described with reference to FIG. 21, which is an exploded view of muscle layer 1940, according to some embodiments. Muscle layer 1940 may be disposed between sensor layer 1930 and tensing portion 1950, as illustrated in FIG. 19, between bone layer 1920 and tensing portion 1950 (in a case where sensor layer 1930 is disposed only between bone layer 1920 and skin layer 1910), or within tensing portion 1950 (as illustrated in FIG. 22 and described below).

Muscle layer 1940 contains bladders, which serve to simulate muscle guarding and the presence of inflamed organs. The assembly, structure and functioning of muscle layer 1940 will be described.

Figure 21:
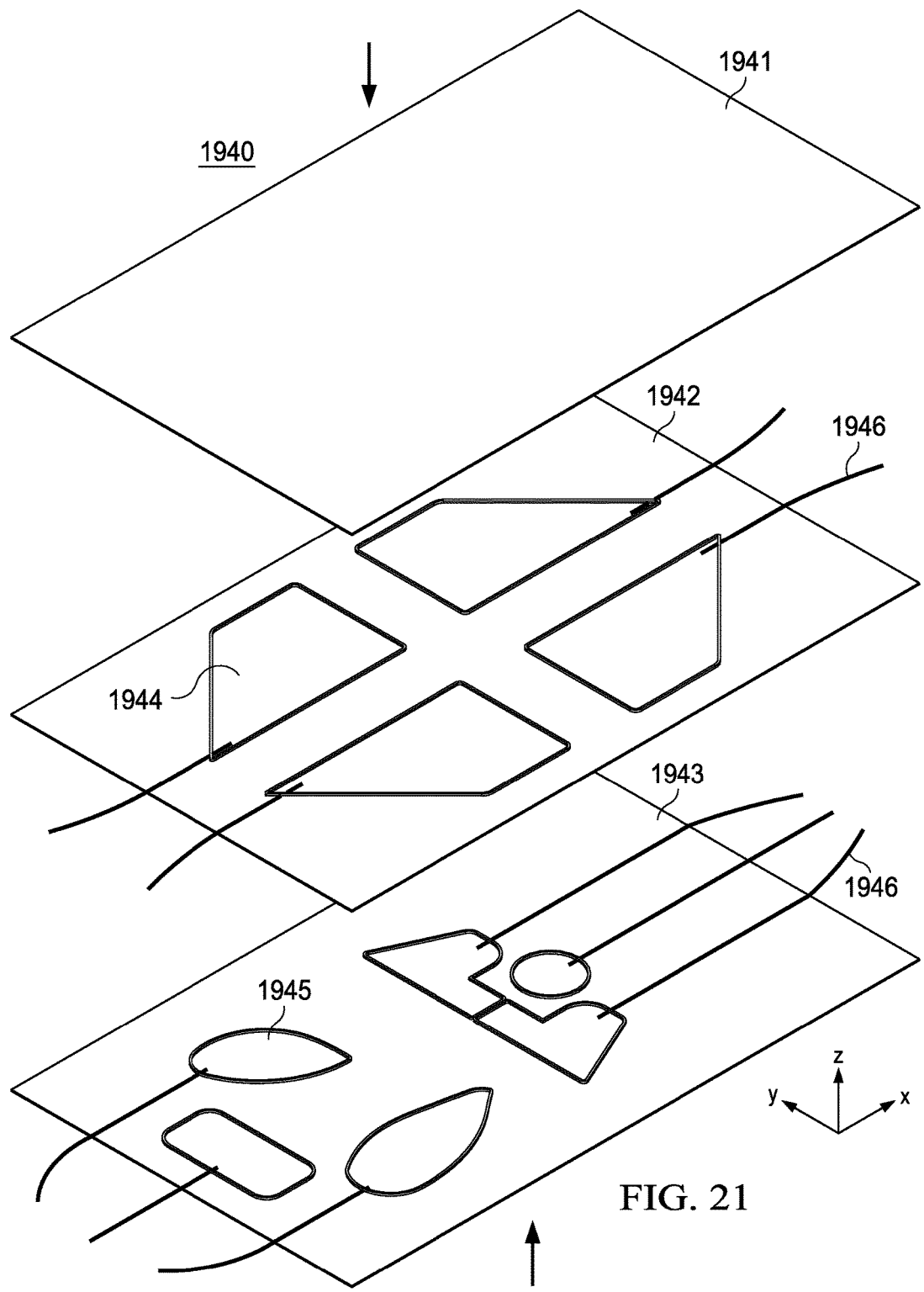
FIG. 21 illustrates a muscle portion of an abdominal simulator, according to some additional embodiments.
Figure 22:
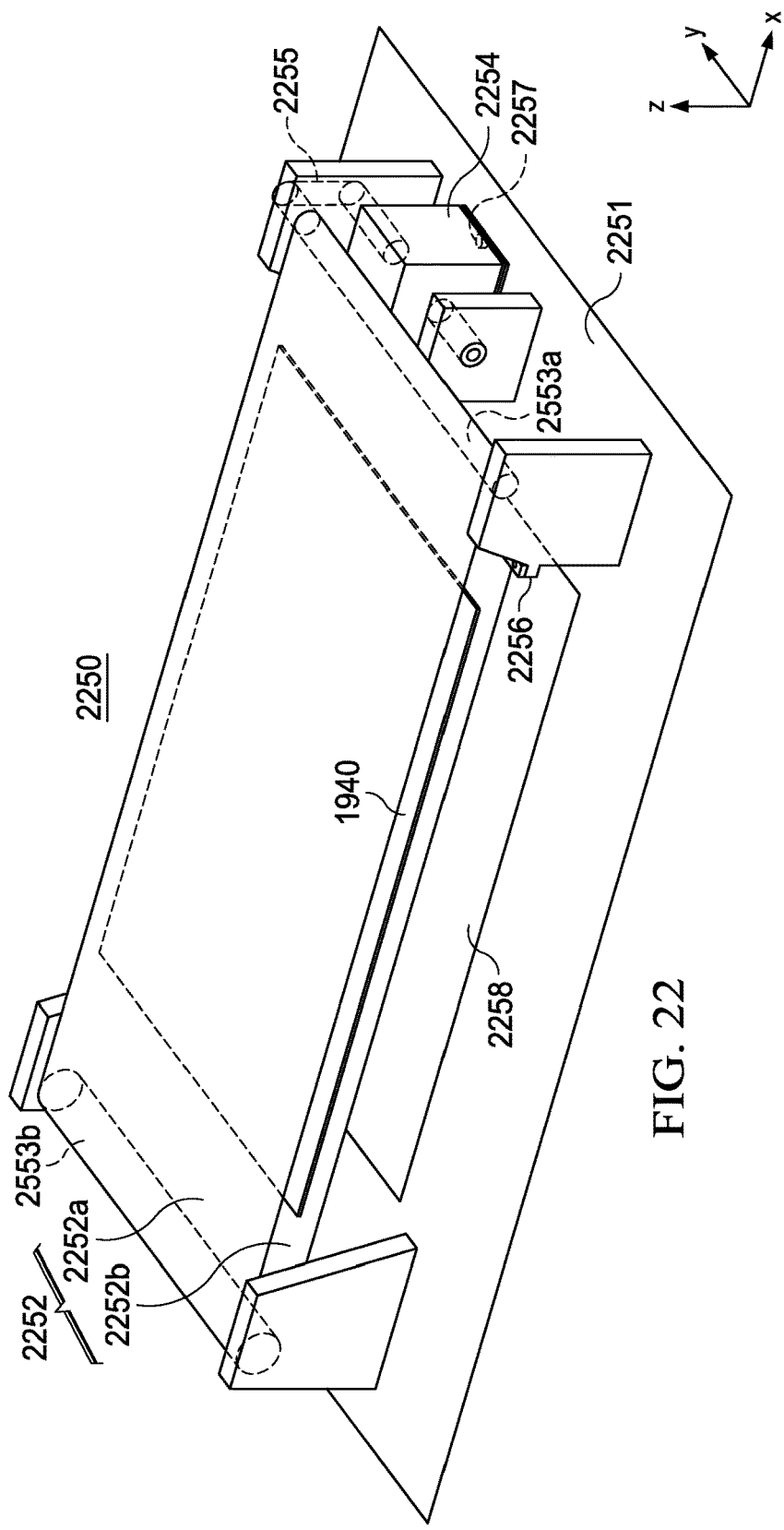
FIG. 22 illustrates a tensing portion of an abdominal simulator, according to some additional embodiments.

As seen in FIG. 21, muscle layer 1940 may be understood as comprising three portions (or layers): an upper layer 1941, a middle layer 1942, and a lower layer 1943. The layers 1941, 1942 and 1943 may be of the same or substantially the same extent in the x and y directions, as shown. As indicated by the x-y-z axes, the terms "upper," "middle," and "lower" refer to the depth direction. That is, upper layer 1941 is located closest to the skin (layer 1910) of the simulated body portion (abdominal simulator 1900), and lower layer 1943 is located farthest from, or most deeply beneath, the skin (layer 1910), or in other words, farthest or most deeply inside the simulated body portion (abdominal simulator 1900). (It will be noted that the x-y-z axes are oriented the same way in FIGS. 19 and 21.)

As FIG. 21 is an exploded view, it shows the layers 1941, 1942 and 1943 of muscle layer 1940 in an 'unassembled' state. In middle layer 1942, outlines of muscle shapes 1944 are visible (four muscle shapes 1944 shown), while in lower layer 1943, outlines of organ shapes 1945 are visible (six organ shapes 1945 shown). In fact, these apparent outlines are actually walls, that is, they extend in the z direction. Also, visible in middle layer 1942 and lower layer 1943 are tubes 1946, one tube 1946 going into each muscle shape 1944 and one tube 1946 going into each organ shape 1945. To form or 'assemble' muscle layer 1940, an adhesive or bonding agent is applied to the tops of the walls forming the outlines of muscle shapes 1944 and the organ shapes 1945. Then the upper layer 1941 is bonded to the middle layer 1942, and the middle layer 1942 is bonded to the lower layer 1943, as represented by the arrows. According to some embodiments, the outlines are not initially walls, but the application of the adhesive or bonding agent over the outlines serves to form the walls. Upon bonding together of the layers 1941, 1942, 1943, in the manner stated, the resultant single muscle layer 1940 is formed, as shown in FIG. 19. Further, by the bonding together of the layers 1941, 1942, 1943, in the manner stated, bladders have been formed in the shapes of muscle shapes 1944 and organ shapes 1945. That is, inside muscle layer 1940, between upper layer 1941 and middle layer 1942 there are first, muscle bladders, and between middle layer 1942 and lower layer 1943 there are second, organomegaly bladders. (The term "organomegaly" refers to the abnormal enlargement of organs.) For convenience, the first, muscle bladders may be referred to by reference number 1944, and the second, organomegaly bladders may be referred to by reference number 1945—it being understood that the walled muscle shapes and the walled organ shapes may be thought of as bladders not yet fully assembled.

According to some embodiments, layers 1941, 1942 and 1943 may be formed of silicone rubber. Other materials, including Mylar, latex, rubber, polypropylene or another plastic, or another suitable material may also be used. According to some embodiments, layers 1941, 1942 and 1943 need not start out as three separate layers, but may be three sections of a single layer that is folded twice to form the three sections (such a folding structure may be likened to a free-standing Chinese folding screen, such as are used as room dividers or for aesthetic purposes). According to some embodiments, the tubing 1946 may be microtubing (e.g., a very fine plastic tubing such as is used in drip irrigation). According to some embodiments, the bladders 1944, 1945 may be formed in a manner as to be integrated with another portion, e.g., skin layer 1910 or tensing portion 1950. According to some embodiments, the bladders 1944, 1945 may be formed in shapes other than those illustrated in FIGS. 10b and 21.

Bladders 1944, 1945 may be inflated and deflated via their respective tubes 1946 using a pneumatic (pressurized gas) or hydraulic (pressurized liquid) system to supply and withdraw fluid. Such system may include pressure regulators or the like devices that may be used to adjust the pressure or degree of inflation in bladders 1944, 1945 so as to achieve different degrees of fullness and resistance to the application of pressure, and to impart different tactile sensations to a user performing a palpation or otherwise applying contact or pressure to muscle layer 1940, e.g., indirectly via other layers above muscle layer 1940. As specific non-limiting examples, first, muscle bladders 1944 may simulate the feel (impart the tactile sensation) of muscle guarding upon palpation (tactile examination) by a user via skin portion 1910, and second, organomegaly bladders 1945 may simulate (impart the tactile sensation of) the presence of abnormally enlarged (inflamed) organs, upon palpation (tactile examination) by a user via skin portion 1910. In human physiology/pathology, such inflamed organs expand beyond the regions they normally occupy in the abdominal cavity, and muscle guarding (tensing) may occur adjacent an organ that is in an abnormal state. As described, first, muscle bladders 1944 may be deemed to simulate muscle, although other components of abdominal simulator 1900 may enhance the similitude of this simulation of muscle.

As an example of a pressurization/inflation/fluid delivery system, one or more gas cartridges containing, e.g., carbon dioxide or another gas, may be used in a compressor for a pressure driven mechanism to inflate and deflate, as appropriate, one or more of bladders 1944 or 1945, via tubes 1946. Low pressure and/or low volume may be used. The pressurization/inflation/fluid delivery system may include at least one power supply and at least one manifold. This system may also include a (micro)controller, air regulator, and moisture filter.

Each of bladders 1944, 1945 may but need not be individually controllable, that is, separate from the other bladders 1944, 1945. Each of bladders 1944, 1945 may be served by its own gas cartridge(s), or a single gas cartridge (or more than one collectively) may run multiple bladders 1944, 1945 in an arrangement in which multiple bladders 1944, 1945 are daisy-chained or otherwise coupled together (in which case, bladders 1944, 1945 would be connected and not the separate chambers such as are shown in FIG. 21).

According to some embodiments, muscle layer 1940 may operate on a different principal than inflating and deflating bladders and may comprise an accordingly different structure. Specifically, muscle layer 1940 may use an electroconductive material that substantially changes shape and/or size upon application of an electric current thereto to achieve the different degrees of fullness and resistance to the application of pressure, and to impart the different tactile sensations (e.g., muscle guarding and presence of inflamed organs) to a user performing a palpation, described above as being simulated by the bladders 1944, 1945. Such electroconductive material may be an electroactive polymer. According to these embodiments, the electroconductive material may be formed as a wire. Such a wire may be made to, e.g., bend or shorten, upon application of electrical current thereto. A grid of such wires encompassing a length and a width of the simulated body portion (e.g., abdominal region) may be employed. The grid of wires may form an x-y Cartesian coordinate system (similar to the grid shown in FIG. 20), such that specific locations defined on the coordinate system may be identified and activated to simulate a desired physical condition (e.g., muscle guarding). According to some embodiments, muscle layer 1940 may operate using nitinol to achieve the different degrees of fullness and resistance to the application of pressure, and to impart the different tactile sensations (e.g., muscle guarding and presence of inflamed organs) to a user performing a palpation, described above as being simulated by the bladders 1944, 1945.

According to some embodiments, muscle layer 1940 may operate using actuators that are movable in at least the z (depth) direction, such as muscle layer actuators 140 described hereinabove, instead of bladders 1944, 1945.

Tensing portion 1950 will now be described with reference to FIG. 19. Subsequently, tensing portion 2250, which represents a variation of tensing portion 1950, will be described with reference to FIG. 22.

Before turning to FIGS. 19 and 22, an initial description of the tensing portion will be given, which applies to both tensing portions 1950 and 2250 (accordingly, this initial description will refer to the tensing portion omitting the reference numbers). The tensing portion may include a tensing device and a tensing medium. The tensing device may be configured to impart tension to the tensing medium in such a manner as to provide limited resistance to application of pressure on the tensing medium. The tensing device may be further configured to adjust the degree of tension imparted to the tensing medium by tightening or loosening the tensing medium. Such adjustment may be referred to as calibration. By virtue of one or more of the above aspects, the tensing portion may simulate an anatomical feature of a simulated body portion. For example, the tensing portion may simulate a peritoneal lining of an abdomen of an abdominal simulator. The tensing portion may also impart a sensation of the degree of tension of a normal (healthy) abdomen upon palpation by a user via the surface portion of the simulated body portion (abdominal simulator). By virtue of the calibration feature, individual users (e.g., medical doctors training medical students on abdominal simulator 1900) may adjust the degree of tension of the tensing medium to achieve a degree of tension that they find simulates a normal abdomen, it being understood that different such users may calibrate the tensing portion differently according to their sense of 'normal', which may vary across different users. Such variation may also reflect actual physiological variation across actual different people.

Turning now to FIG. 19, certain directional terms used in the description of this figure will be explained. The length of tensing portion 1950 refers to its extent in the x direction, the width of tensing portion refers to its extent in the y direction, and, as noted above, the terms "right" and "left" are used not in an absolute sense but for convenience with reference to the view shown in FIG. 19. As illustrated in FIG. 19, tensing portion 1950 may be disposed depthwise (z direction) between muscle layer 1940, on the one hand, and actuator portion 1960 and actuator transport portion 1970, on the other hand.

Tensing portion 1950 includes tensing device 1951 and tensing medium 1952. Tensing device may be formed as a framelike structure as shown, made of metal (e.g., aluminum) or another material. Reference numeral 1958 indicates a cut-out or opening in the framelike structure, through which actuator(s) 1960 may extend upward, as illustrated. Desirably, this framelike structure may not be felt by a user training on abdominal simulator 1900, as the lengthwise sides (the sides extending in the y direction) of tensing device 1951 rest under bone layer 1920. Tensing medium 1952 may be an elastic or inelastic fabric material such as Kevlar, Nomex, or another material. Tensing medium 1952 extends lengthwise across the top of tensing portion 1950/tensing device 1951. The lengthwise sides of tensing device 1951 may be arched upward as shown, and the tensing medium 1952 may be arched in matching fashion. This arching gives the tensing medium 1952 a shape that may be thought of as similar to an upside down hammock. This arched shape also matches the arched shape of skin layer 1910 and bone layer 1920, as shown. This arching simulates the arched shape of the abdomen of an actual human being.

Tensing medium 1952 is held in place on tensing device 1951 by being fixed to the lengthwise sides of tending device 1951. At the right side of tensing device 1951 tensing medium 1952 is fixed to tensing device 1951, and at the left side of tensing device 1951 tensing medium 1952 is fixed to or caught by a roller 1953.

Tensing device 1951 includes a (e.g., stepper or other) motor 1954 for driving a belt 1955 for rotating roller 1953 for rolling or pulling (leftward in FIG. 19) tensing medium 1952. Tensing medium 1952 can be made tighter or looser by rotating roller 1953. The tightening or loosening of tensing medium 1952 serves to impart more or less tension to tensing medium 1952. In this way, the degree of tension of tensing medium 1952 is adjusted or calibrated to achieve a desired degree of tension that is deemed anatomically accurate. Calibration may be performed either electrically using suitable controls to operate motor 1954. According to some embodiments, calibration may be performed manually, e.g., bypassing motor 1954 or where motor 1954 is omitted. In addition, tensing device 1951 may be provided with a (e.g., electrical) pressure sensor (not shown) that may be used to calibrate the tension and/or to determine the pressure and/or depth of a palpation.

As described here, tensing portion 1950 may also provide support to the portions above it. According to some embodiments, other manual, automatic or fixed devices may be employed to impart tension to tensing medium 1952, e.g., springs, cables and pulleys, etc. For example, tensing medium 1952 could be a rigid or inelastic material held by springs to the frame of tensing device 1951 (similar to the manner of a trampoline). In this arrangement, pressure sensors at the springs could be used to detect pressure or depth of a palpation. In general, the use of a rigid or inelastic material rather than a flexible or elastic material for tensing medium 1952 facilitates the use of tensing device 1951 to detect pressure or depth by measuring change in the mechanism used for tensing the tensing medium 1952. According to some embodiments sensors may be employed other than the above-mentioned pressure sensors, e.g., infrared sensors, which may be used to determine depth of a palpation.

Turning to FIG. 22, tensing portion 2250, which represents a variation of tensing portion 1950, will be described. For convenience, the differences of tensing portion 2250 relative to tensing portion 1950 will be described. Initially, it should be noted that tensing portion 2250 is shown right-to-left reversed relative to tensing portion 1950. Tensing portion 2250 as shown in FIG. 22 would have to be right-to-left reversed to fit in the arrangement shown in FIG. 19.

As an initial description, in tensing portion 2250 the tensing medium 2252 comprises two layers 2252a, 2252b of material held in tension at respective different depths in the simulated body portion (abdominal simulator 1900), and the muscle layer 1940 (comprising the first, muscle bladders 1944 and the second, organomegaly bladders 1945) is disposed between the two layers 2252a, 2252b of material depthwise, such that the two layers 2252a, 2252b of material limit expansion of the first, muscle bladders 1944 and/or the second, organomegaly bladders 1945 in a positive or negative direction of depth (i.e., in the z direction, upward or downward). As will be recalled, in the embodiments including tensing portion 1950, muscle layer 1940 was disposed above tensing portion 1950, not within it.

In the illustrated embodiment, although tensing medium 2252 comprises two layers 2252a, 2252b of material, tensing medium 2252 is a single sheet of material, held around two rollers 2253a and 2253b, one at either lengthwise side of tensing device 2251. The right lengthwise side of lower layer 2252b of tensing medium 2252 is fixed to tensing device 2251 by fabric clamp 2256, and the right lengthwise side of upper layer 2252a of tensing medium 2252 is fixed to or caught by powered roller 2253a. At its left lengthwise side, tensing medium 2252 wraps around unpowered roller 2253b. Similar to operation of tensing portion 1950, motor 2254 drives belt/pulley 2255 for rotating powered roller 2253a for rolling or pulling tensing medium 2252 (in FIG. 22, upper layer 2252a of tensing medium is rolled or pulled to the right, and lower layer 2252b of tensing medium is rolled or pulled to the left). Again, a pressure sensor 2257 may be provided for calibration of tension and/or measurement of palpation pressure. As noted, by virtue of disposing muscle layer 1940 in between the two layers 2252a, 2252b of tensing medium 2252, expansion (due to inflation) of bladders 1944 and 1954 may be directed in the x and y directions and prevented or reduced in the z direction (upward and downward). This may contribute greater similitude of the anatomical feel of the peritoneal lining of the abdomen and of the abdomen generally.

According to some embodiments, tensing portion 2250 may be arched in the manner of tensing portion 1950. According to some embodiments, tensing medium 2252 may be formed so as to have two layers 2252a, 2252b in other ways. For example, tensing medium 2252 need not be a single sheet of material, but could be two separate sheets, where each sheet is one of the layers 2252a, 2252b. Both of such separate layers 2252a, 2252b could be affixed to tensing device 2251 in the manner in which tensing medium 1952 is affixed to tensing device 1951, the necessary changes being made to tensing device 2251. In FIG. 22, reference numeral 2258 indicates a cut-out or opening in the framelike structure of tensing device 2250 (like cut-out 1958 in tensing device 1950), through which actuator(s) 1960 may extend upward.

Figure 23A:
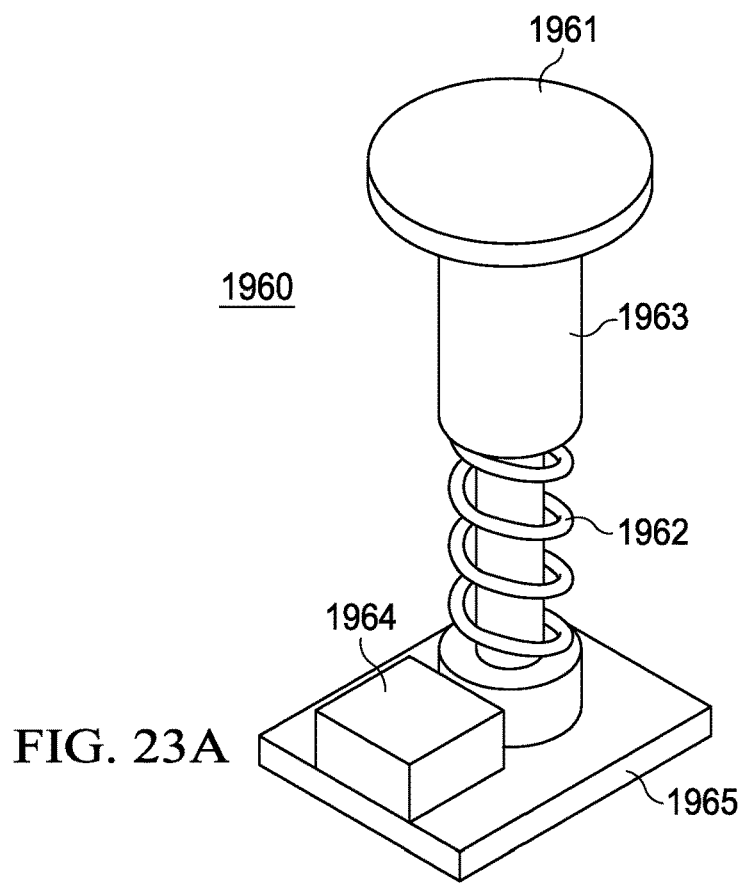
FIGS. 23A and 23B illustrate, in different orientations, an actuator for simulating an organ, of an abdominal simulator, according to some additional embodiments.
Figure 23B:
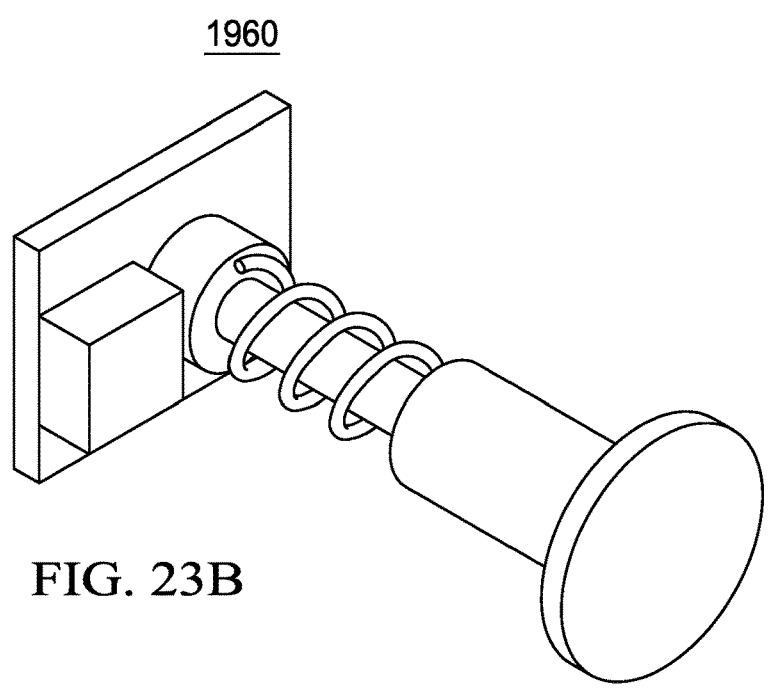

Turning to FIGS. 23A and 23B, actuator portion 1960 will be described. It will be recalled that in the embodiments described above with reference to, e.g., FIGS. 4-9 and 11, abdominal simulator 1900 employed a plurality of ailment module actuators 165, the positions of which in the x-y plane may be fixed. Instead of that arrangement, according to the embodiment described here, a single actuator 1960 that is movable in the x-y plane may be employed. Such a movable actuator 1960 may be referred to as a free floating actuator 1960.

Actuator 1960 may serve to simulate an internal organ, including simulating an ailment thereof by providing appropriate resistance to the application of pressure thereto (described below), and may also include one or more sensors to determine depth or pressure of a palpation. Simulation of an ailment may include simulation of organ tenderness and simulation of pushback. Organ tenderness may be simulated by providing resistance that increases with increasing application of pressure. Pushback (or a pushback reaction) is a physiological phenomenon whereby, when pressure exceeding a given threshold is applied to a severely inflamed organ, the organ resists not merely in a passive manner but with an active force that pushes upward/outward against the applied force.

One advantage of using a free-floating actuator rather than a set of actuators that are not movable in the x-y plane is as follows. When the latter arrangement is used a trainee may over time memorize or even unintentionally come to remember the locations of the actuators (simulated organs) in the x-y plane. This limits the effectiveness and value of the training, as the trainee has advance knowledge of the simulated organs' location when approaching the hypothetical patient to perform palpations. In real life scenarios, the clinician treating the patient would not have such advance knowledge. Indeed, the location of the organs may vary across different patients. With the free floating actuator arrangement the evaluator may instruct the simulator to position the organs (the actuator) in slightly different positions (e.g., representing different patients) in different training sessions so as to preclude the trainee's having this illegitimate advance knowledge and thereby provide more effective and valuable training.

As seen in FIGS. 23A and 23B, actuator 1960 has a head 1961, a spring 1962, a linear shaft or bearing 1963, a sensor 1964, and a mounting bracket 1965. Head 1961 may be formed in a shape to simulate the shape of (the upper/outward portion of) an internal organ of the abdomen. Actuator 1960 may provide resistance to the application of pressure thereto, by means of spring 1962 and bearing 1963, e.g., in ways identical or similar to those described above with respect to actuator 165. Such spring-based provision of resistance may simulate organ tenderness, with spring 1962 providing resistance that increases with increasing application of pressure. Actuator 1960 may be mounted on actuator transport device 1970 (described below) by mounting bracket 1965. Sensor 1964 may be an infrared sensor for determining depth of a palpation, as described above with reference to actuator 165.

According to some embodiments, actuator 1960 may employ a mechanism for providing resistance other than spring 1962. For example, actuator 1960 may employ a (e.g., electric) hydraulic or pneumatic mechanism (e.g., air piston), a piezoelectric mechanism (e.g., piezo linear actuator), an electric motor (e.g., with gear train) or servomechanism, nitinol, or an electroactive polymer. Such mechanism may be automatically controlled using appropriate control hardware and/or software. According to some embodiments, sensor 1964 may be a kind of sensor other than an infrared sensor, examples of which, for detecting pressure or depth, are described elsewhere herein.

As will be understood from the description here, actuator 1960 is a movable element movable within a simulated body portion (e.g., abdominal simulator) and providing resistance to the application of pressure to the movable element, such that the movable element simulates an anatomical feature (e.g., an internal organ) of the simulated body portion. Such movable element is movable in directions of a length and a width of the simulated body portion. Further, actuator 1960 may be a spring-loaded or pressure-actuated actuator that imparts a sensation of organ tenderness upon palpation by a user via the surface portion.

Actuator 1960 may also include a solenoid (not shown), e.g., in addition to a spring, for simulating the above-mentioned pushback reaction. When a palpation reaches a certain threshold pressure or depth, this triggers a microcontroller to send a certain voltage to the solenoid, which, e.g., together with the spring, causes the actuator 1960 to push back against the application of force, as described. Thus, actuator 1960 may have a solenoid and a spring and may impart a sensation of pushback upon palpation by a user via the surface portion if the palpation exceeds a given threshold of pressure. It will be understood that actuators 165 described above may also include this solenoid mechanism for simulating pushback. According to some embodiments, actuator 1960 may employ a hydraulic or pneumatic mechanism to simulate the pushback reaction. For example, such actuator 1960 may include an air accumulator that operates together with an air piston to cause the actuator 1960 to push back against the application of force exceeding a given threshold, thereby imparting the pushback sensation, as described above. The air piston may be connected to an air pressure system and manifold(s) used for bladders 1944, 1945 and provides adequate resistance to produce the sensation of tenderness. To achieve the pushback reaction, the air piston may be charged with additional pressure from the air accumulator, a device that may store additional pressurized air to be released. It should also be noted that actuator portion 1960 may include more than one free floating actuator 1960, or may include a combination of free floating actuator(s) 1960 and actuators that are not movable in the x-y plane.

According to some embodiments, abdominal simulator may employ one or more movable elements that are movable to and stowable in a position beyond the simulated body portion (e.g., abdomen). Such a movable element may be substantially rigid and substantially resistant to movement in a depth direction of the simulated body portion in response to tactile pressure applied during a medical palpation of the simulated body portion. As an example, such a movable element may simulate an organ in the upper abdominal cavity and may be moved to a position below the ribs, outside of (or beyond) the abdominal region. When it is desired to simulate inflammation of such an organ, the movable element may be moved into the abdominal region. In this arrangement, it is also possible to employ actuators 1960 rather than movable elements that are substantially rigid and substantially resistant to movement in a depth direction.

Figure 24A:
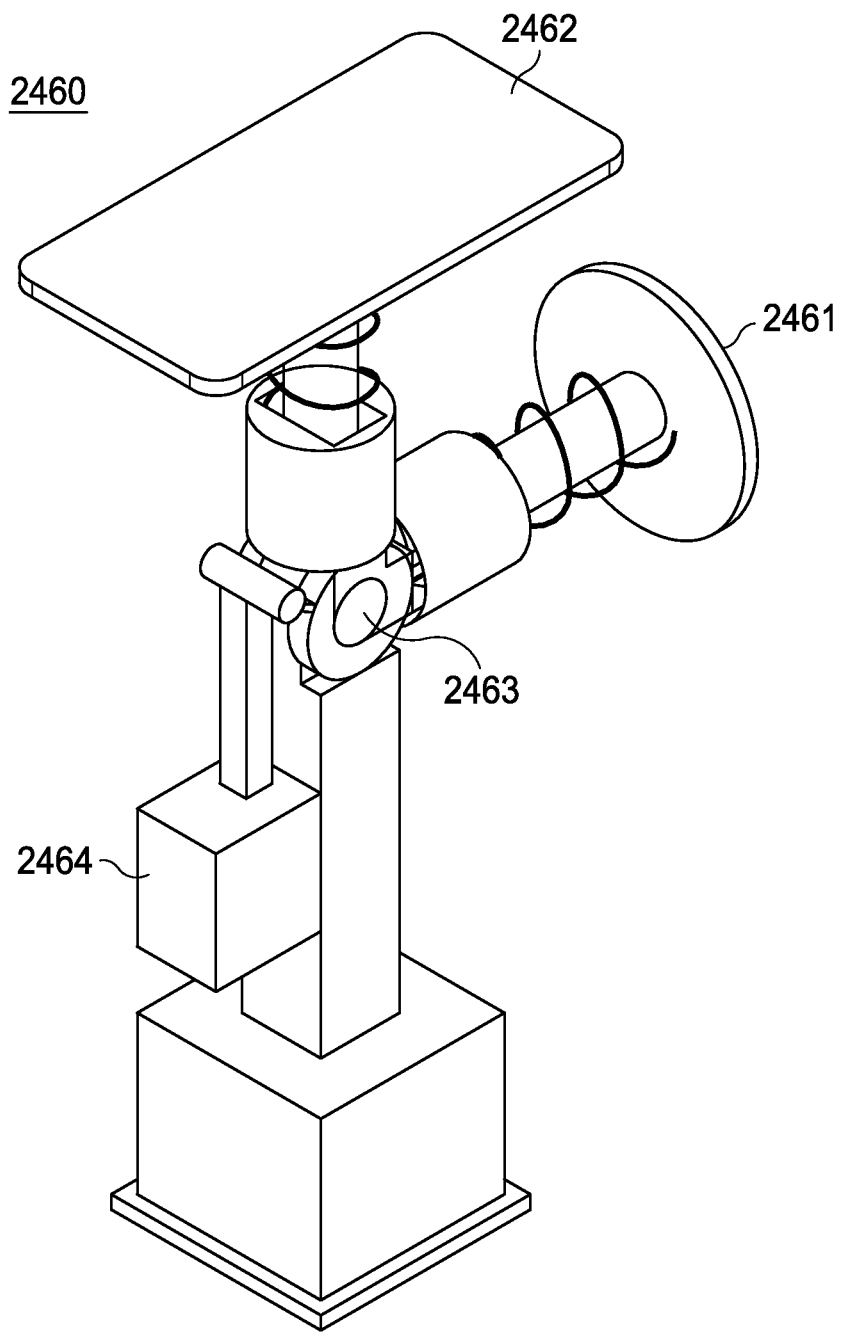
FIGS. 24A and 24B illustrate, in different orientations, a pivoting multiple head actuator for simulating an organ, of an abdominal simulator, according to some additional embodiments.
Figure 24B:
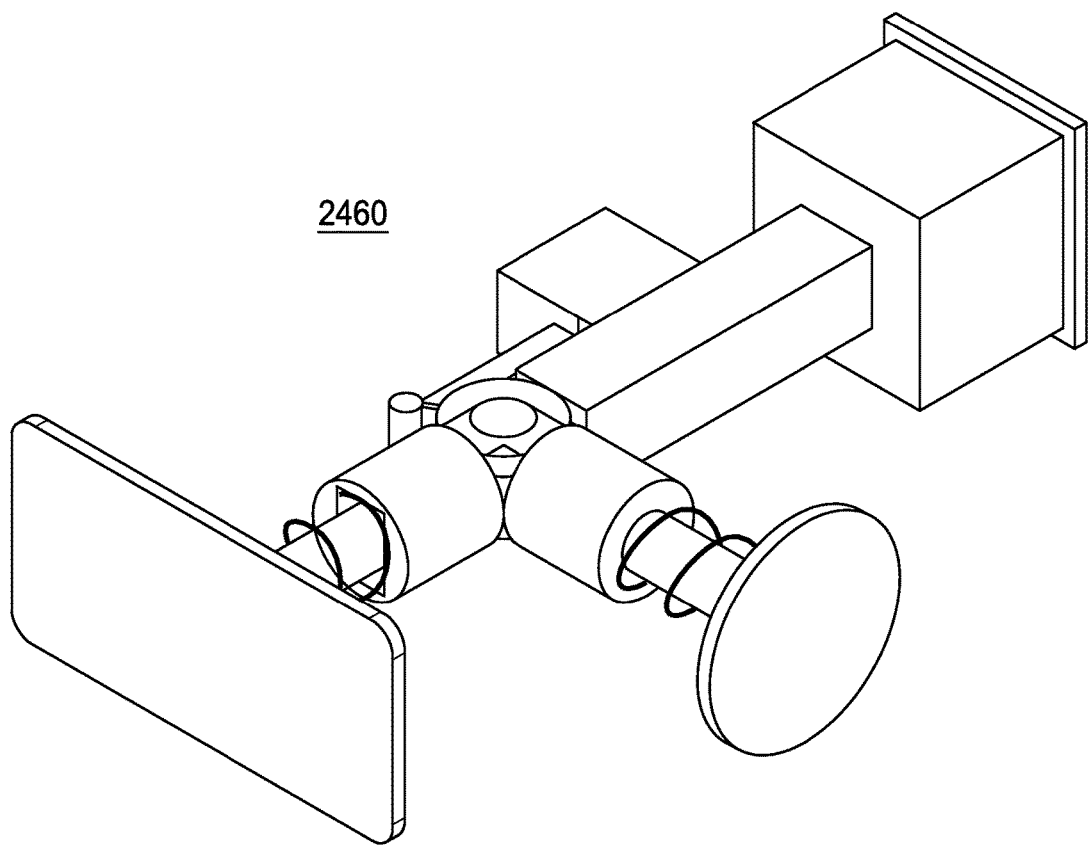
Figure 25A:
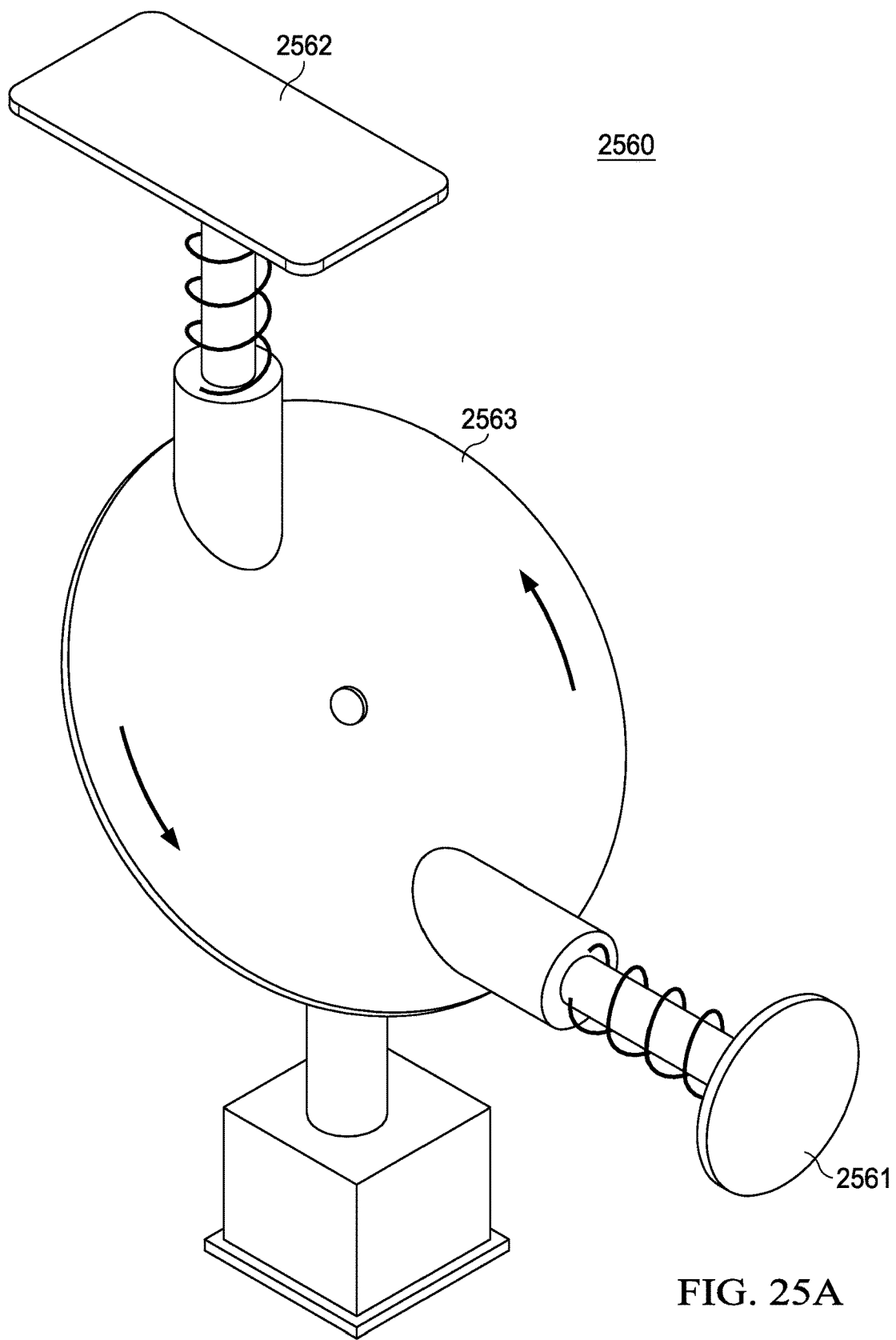
FIGS. 25A and 25B illustrate, in different orientations, a swiveling multiple head actuator for simulating an organ, of an abdominal simulator, according to some additional embodiments.
Figure 25B:
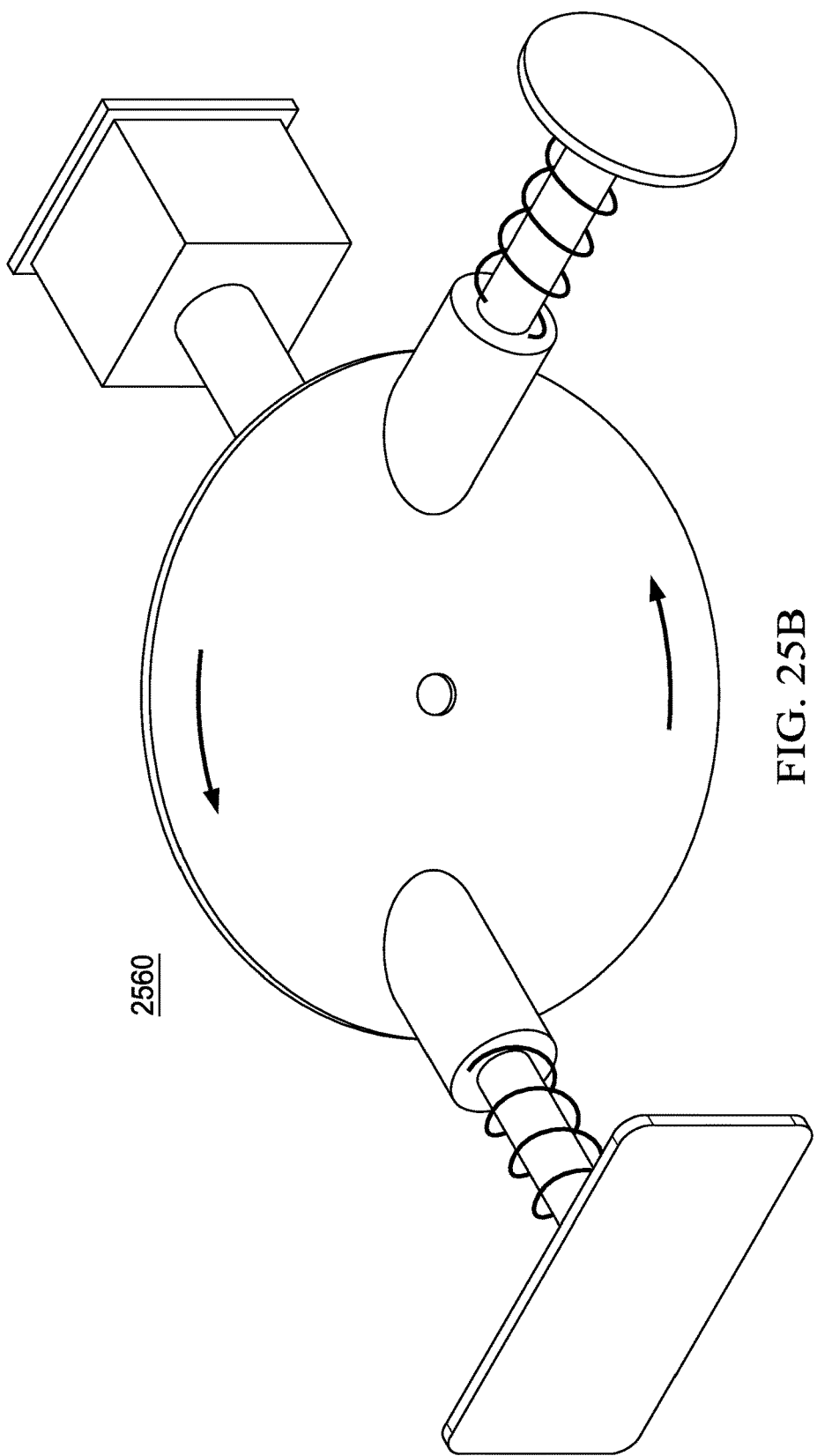

According to some embodiments, abdominal simulator may employ one or more actuators that are made to lie down (stowed out of the way) when not in use. This may be performed in a manner similar to the pivoting or rotation of the multiple heads of actuator 2460 (described immediately below), except that in this case the entire or most of the actuator may be rotated to a lying down position when not in use and rotated back to a standing up position for active use.

Where only one or a limited number of (e.g., free floating) actuators are employed (e.g., fewer actuators than the number of organs to be simulated), the actuator may be provided with multiple, different heads, any of which may be selected to simulate a different organ. For example, the different heads may have different shapes respectively resembling the shapes of (the upper/outward portions of) different organs. According to some embodiments, different heads may be employed to simulate healthy organs and unhealthy organs. FIGS. 24A, 24B, 25A and 25B illustrate examples of such in multiple head actuators 2460 and 2560. (Aside from the multiple head feature, actuators 2460 and 2560 may resemble actuator 1960 in structure and operation; accordingly, for simplicity only the multiple head feature of actuators 2460 and 2560 is described here.) In such multiple head actuators, various principles of operation may be employed to select an individual head and to move from its storage position to its in-use position. Such selection and movement may be performed automatically by suitable control hardware and software. As seen in FIGS. 24A and 24B, actuator 2460 has a circular head 2461 and a rectangular head 2462, and a pivot 2463 operated by a pivot actuator 2464. Rectangular head 2462 is shown in the in-use position and a circular head 2461 is shown in the storage position. Pivot 2463 may be rotated in the counterclockwise direction of FIG. 24A by pivot actuator 2464 in order to move rectangular head 2462 to the storage position and circular head 2461 to the in-use position. As seen in FIGS. 25A and 25B, actuator 2560 has a circular head 2561 and a rectangular head 2562, both mounted on a swivel plate or rotary disk 2563, which may be operated by a swivel actuator (not shown). Rectangular head 2562 is shown in the in-use position and a circular head 2561 is shown in the storage position. Swivel plate 2563 may be rotated in the counterclockwise direction, as illustrated by the arrows in FIG. 25A, by the swivel actuator in order to move rectangular head 2562 to the storage position and circular head 2561 to the in-use position. Other mechanisms of selecting and moving multiple heads will be readily appreciated by those of ordinary skill in the art. A multiple head actuator may have more heads than the two heads illustrated for actuators 2460 and 2560, and it will readily be appreciated by those of ordinary skill in the art how additional heads may be accommodated in actuators 2460 and 2560.

Turning to FIGS. 26A, 26B, 27A and 27B, actuator transport portion 1970, and a variation thereon, actuator transport portion 2770, will be described. Where a free-floating actuator 1960 is employed, an actuator transport portion such as actuator transport portion 1970 or 2770 or another actuator transport portion may be employed for the purpose of moving actuator 1960, in the x-y plane, into any desired position in the simulated body portion (e.g., abdominal simulator 1900).

With reference to FIGS. 26A and 26B, actuator transport portion 1970 includes a rectangular frame, which may be made of metal (e.g., aluminum) or another material. Actuator transport portion 1970 includes an actuator mount 2671 on which actuator 1960 is mounted via mounting bracket 1965 of actuator 1960. Actuator transport portion 1970 further includes a Y slide 2672 slidably mounted on two X slides 2673, a Y belt/pulley 2674 and an X belt/pulley 2675, and a Y motor 2676 and an X motor 2677. Y motor 2676 drives Y belt/pulley 2674, which moves actuator mount 2671 (with actuator 1960 mounted thereon, not shown) along Y slide 2672 in the y direction. Similarly, X motor 2677 drives X belt/pulley 2675, which moves Y slide 2672, on which actuator mount 2671 is mounted (with actuator 1960 mounted on actuator mount 2671, not shown), along X slides 2673 in the x direction. In this way, actuator 1960 can be moved to any desired location within the simulated body portion (e.g., abdominal region). Movement of actuator 1960 by actuator transport device 1970 may be performed automatically by suitable control hardware and/or software. Electric, magnetic, pneumatic, hydraulic or other types of mechanisms may be used to drive actuator transport device 1970. Actuator transport device 1970 operates similarly to transport mechanisms found in plotters, 3D printers, computer numerical control (CNC), plasma cutting, $CO_2$ laser cutting, and other machines, and such or similar mechanisms could be employed for actuator transport device 1970.

Figure 27A:
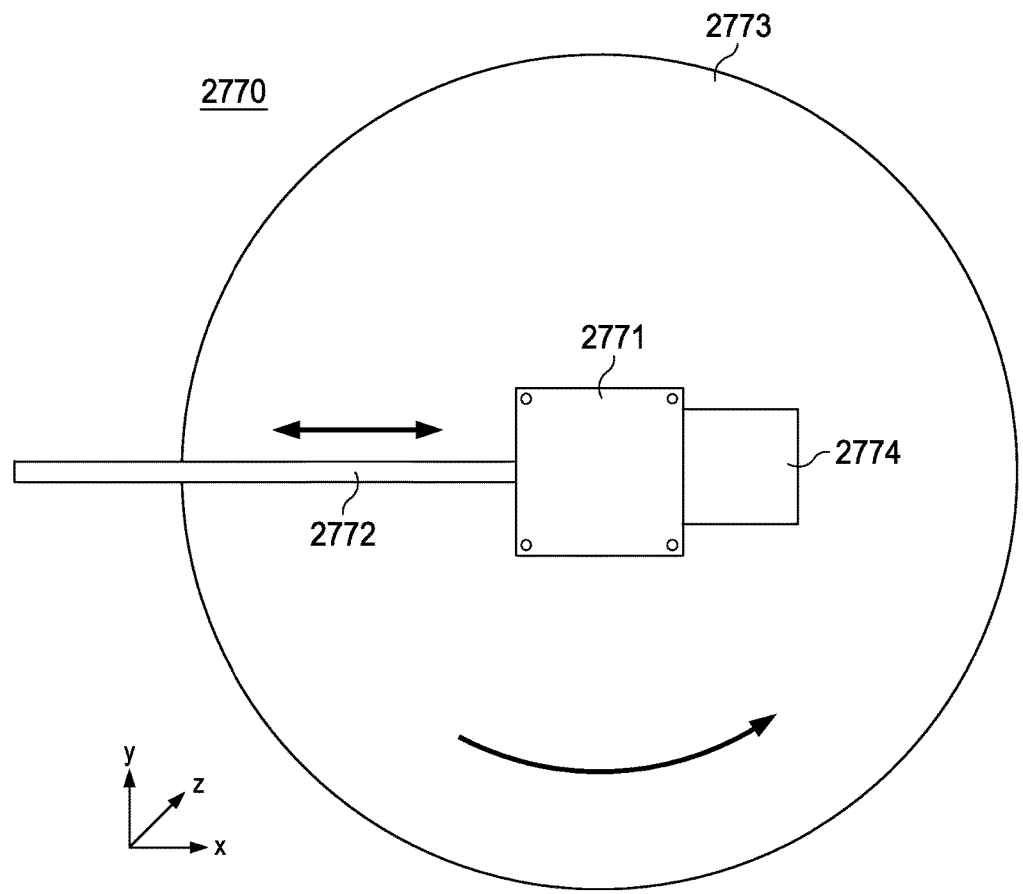
FIGS. 27A and 27B illustrate a top plan view and a side elevational view, respectively, of another actuator transport device of an abdominal simulator, according to some additional embodiments.
Figure 27B:
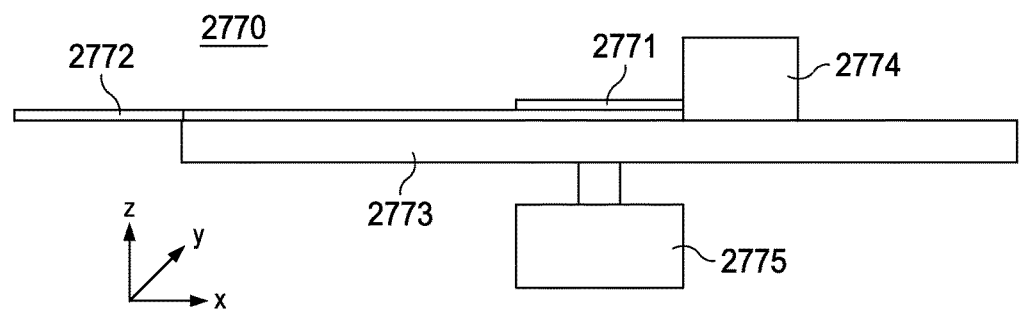

With reference to FIGS. 27A and 27B, actuator transport device 2770 represents an alternative way of transporting actuator 1960 in the x-y plane. Actuator transport device 2770 may be thought of as a 'lazy susan' and a sliding track.

Actuator transport device 2770 includes an actuator mount 2771 slidably mounted on a track 2772, the track 2772 being mounted on a turntable 2773 in a radial direction thereof as shown. Turntable 2773 may be rotated by turntable motor 2775, and actuator mount 2771 (with actuator 1960 mounted thereon, not shown) may be moved along track 2772 by track motor 2774. Accordingly, actuator 1960 may be moved along track 2772 between the center of turntable 2773 and a point at or radially beyond the circumference of turntable 2773. By appropriately rotating turntable 2773 and moving actuator mount 2771 along track 2772, actuator 1960 may be moved, in the x-y plane, to any desired position within the simulated body portion (e.g., abdominal region).

Again, movement of actuator 1960 by actuator transport device 2770 may be performed automatically by suitable control hardware and/or software. Electric, magnetic, pneumatic, hydraulic or other types of mechanisms may be used to drive actuator transport device 2770. One of ordinary skill in the art will readily appreciate that actuator transport device 1970 or 2770 may be modified to accommodate more than one actuator 1960 for transport thereof in the x-y plane. Of course, multiple head actuators may be employed with actuator transport device 1970 or 2770.

Figure 12:
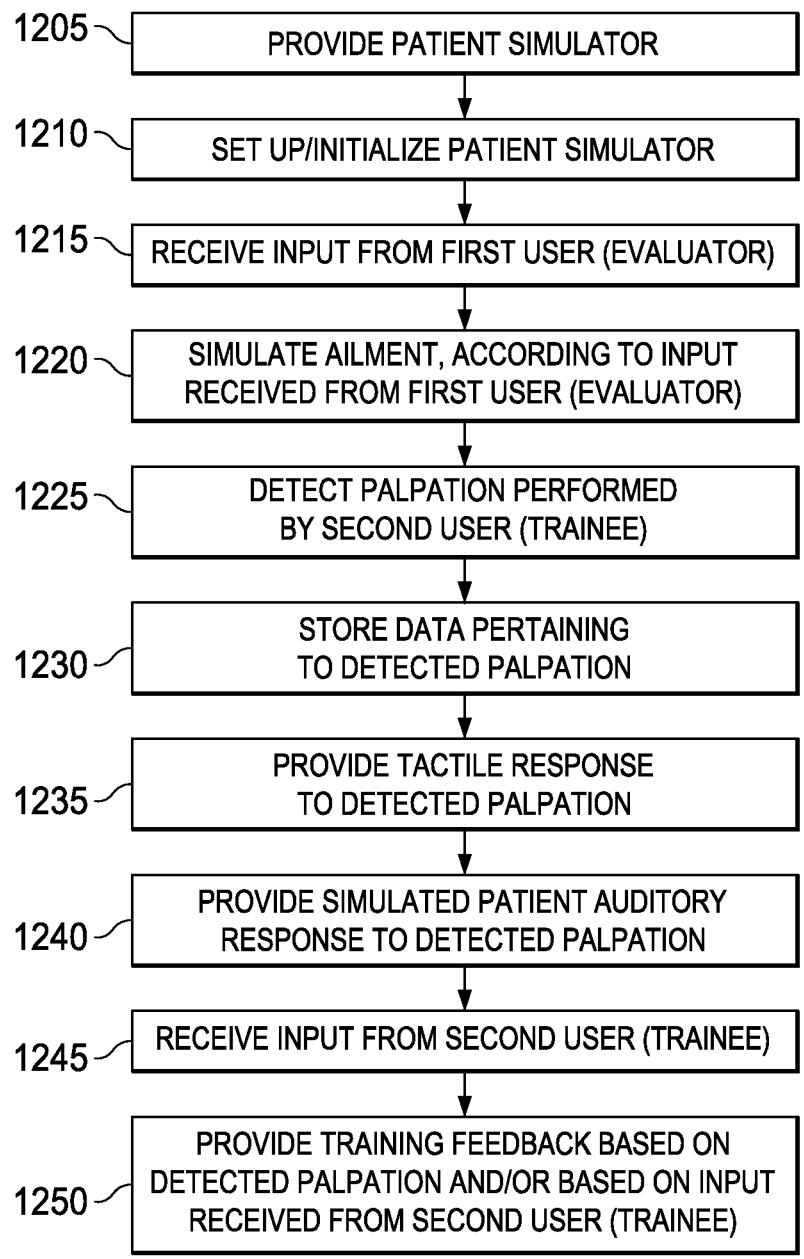
FIG. 12 illustrates an exemplary flowchart of a method of operation of a patient simulator.

FIG. 12 is a flow chart illustrating a method 1200 pertaining to a patient simulator.

At step 1205, a patient simulator is provided. At step 1210, set up/initialization of the patient simulator is performed. This set up/initialization has been described above with reference to, e.g., FIG. 13. At step 1215, the patient simulator receives input from a first user, who is an evaluator evaluating performance of a trainee who will use the patient simulator. The input may comprise a specific medical case or scenario including (a) a specific abnormality (e.g., identifying a specific organ and specific pathology), (b) specific physical symptoms (e.g., physiological presentation associated with the specific abnormality (or such physical symptoms could be generated automatically upon input of the specific abnormality, and/or (c) a case vignette (e.g., historical findings such as patient medical history and/or patient self-reported medical information, data other than the physical/physiological manifestations to be simulated by the simulated body portion). At step 1220, the patient simulator simulates an ailment in the simulated body portion, according to the input received from first user (evaluator). To be sure, at this step, the patient simulator may instead simulate a state of good health. At step 1225, the patient simulator detects a palpation performed on the simulated body portion by a second user, who is the aforementioned trainee. In this regard, the patient simulator may also measure or determine characteristics of the palpation (e.g., location, depth, pressure, temporal duration). At step 1230, the patient simulator stores date pertaining to the detected palpation or characteristics thereof. At step 1235, the patient simulator provides a tactile response to the detected palpation (e.g., a particular tactile sensation of resistance simulating a physiological phenomenon such as muscle guarding, organ tenderness, etc.). At step 1240, the patient simulator provides a simulated patient auditory response, in response to the detected palpation (e.g., a groan, etc.). (Step 1240 may be omitted where a state of good health was simulated in step 1220, among other situations.) At step 1245, the patient simulator receives input from the second user (trainee) (e.g., palpation findings, diagnosis). At step 1250, the patient simulator provides training feedback based on the palpation(s) performed and/or on input from the second user (e.g., data regarding the palpations, evaluation of the second user's performance or diagnosis).

Further details of method 1200 are provided elsewhere in this disclosure, e.g., in the description of the operation of a patient simulator, according to the various embodiments disclosed herein. Variations on method 1200 will be readily appreciated by one of ordinary skill in the art.

Figure 28:
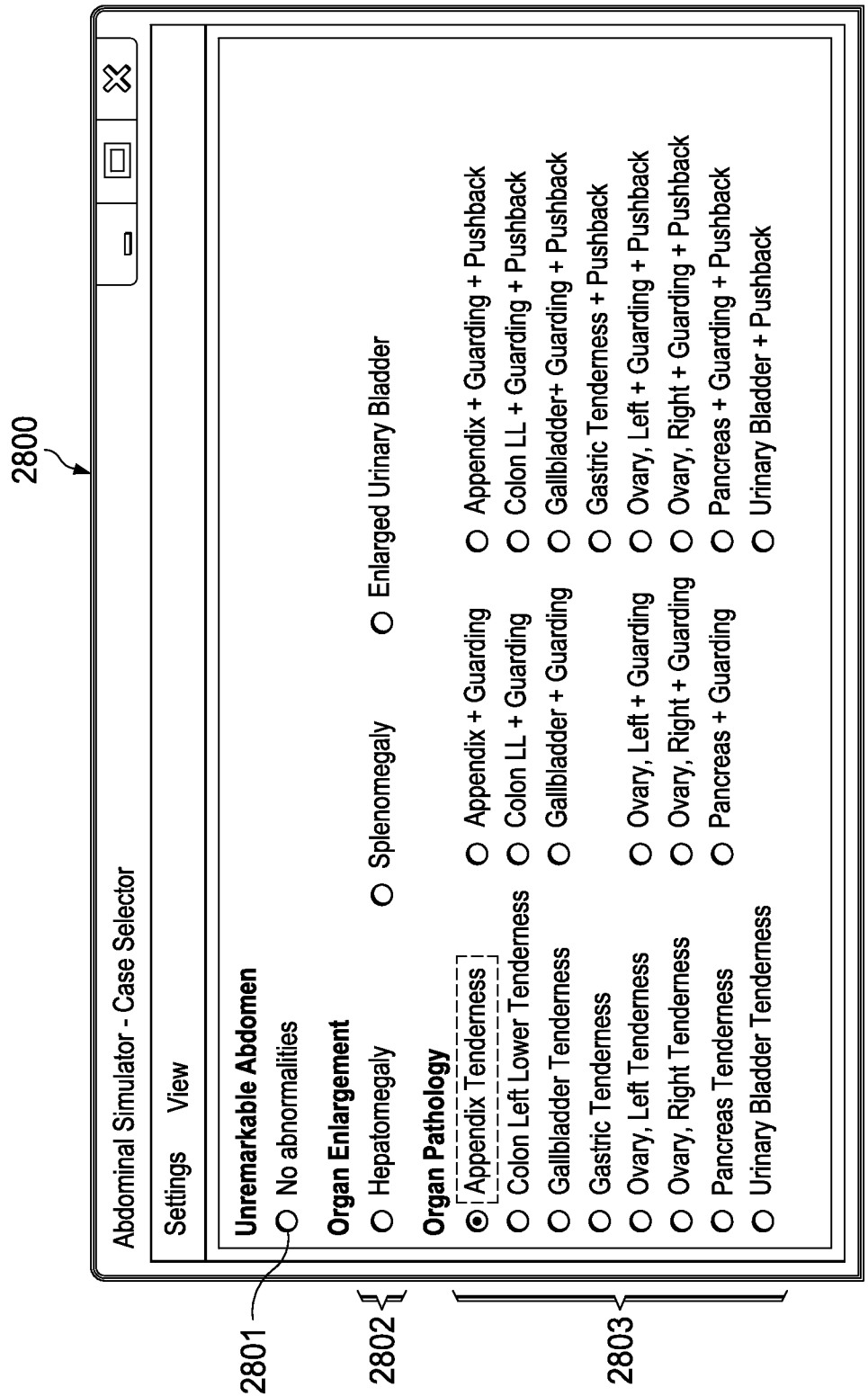
FIG. 28 illustrates an exemplary screen shot of a evaluator user interface device for an abdominal simulator.

As mentioned, a patient simulator such as described herein may include or be used with one or more user interface devices. Such user interface devices may be used in methods described herein. Exemplary screenshots from such user interface devices will be described with reference to FIGS. 28-30. FIG. 28 illustrates screen shot 2800 for use by a first user (evaluator) to input information such as described above for step 1215 of method 1200. As seen, the first user may input an instruction to simulate a normal state of health at radio button 2801, an ailment comprising organ enlargement at radio buttons 2802, and an organ pathology (e.g., physical/physiological symptoms/manifestations, such as guarding, tenderness, and/or pushback, of one or more specified organs) at radio buttons 2803. In FIG. 28, the first user has inputted an instruction to the patient simulator to simulate appendix tenderness, as indicated by the selected radio button. Additions to and variations on the screen shot 2800 will readily be appreciated by one of ordinary skill in the art. For example, the user interface device may provide in screen shot 2800 a field for inputting a case vignette such as described above for step 1215 of method 1200 (e.g., patient medical history, results of previous physical examination, etc.).

FIG. 29 illustrates screen shot 2900 for use by a second user (trainee) to input information such as described above for step 1245 of method 1200. As seen, screen shot 2900 provides buttons 2901, 2902 and 2903 for the trainee to input his or her palpatory findings. The choice of palpatory findings from which the trainee may select may correspond to the range of conditions (normal state of health, enlargement of specific organ, specific organ pathology) that the evaluator may select in screen shot 2800. Based on the palpations s/he performed, the trainee selects the condition(s) that s/he believes best describe the simulated patient's condition(s). For the trainee's reference, screen shot 2900 also provides, at field 2904, the case vignette of the simulated patient, the case vignette having been selected by the evaluator, as described above.

Figure 30:
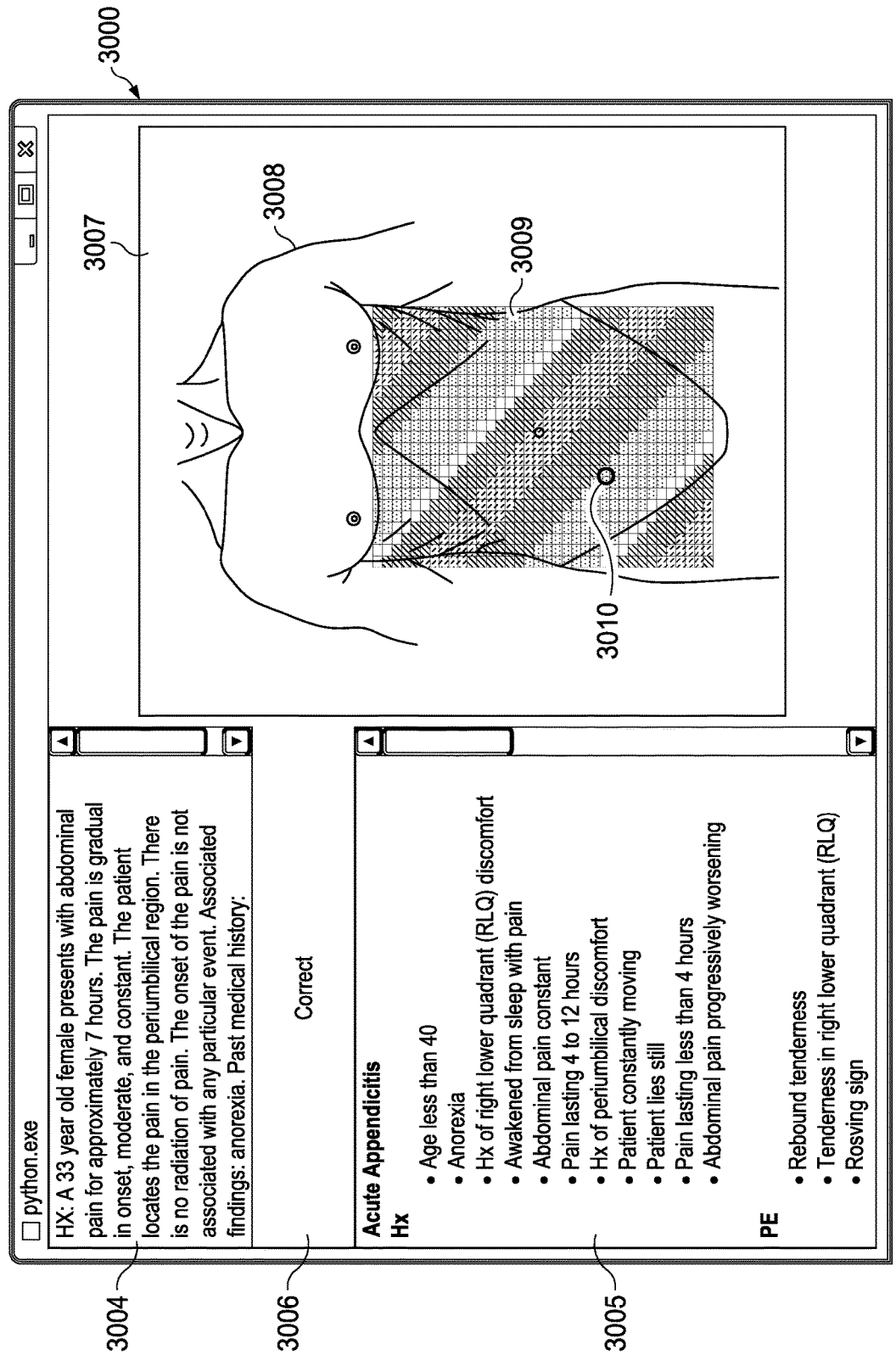
FIG. 30 illustrates an exemplary screen shot of a feedback user interface device for an abdominal simulator.

FIG. 30 illustrates screen shot 3000 for providing training feedback on the trainee's performance such as described in step 1250 of method 1200. Such training feedback may be used by either the trainee and/or the evaluator. For reference, screen shot 3000 provides, at fields 3004, the case vignette. Screen shot also shows, at field 3005, the trainee's diagnosis (here, acute appendicitis), together with, e.g., results of a hypothetical physical examination, including the hypothetical patient's self-reported symptoms. At field 3006, screen shot 3000 shows a medical conclusion/evaluation of the trainee's diagnosis, e.g., as being correct (as illustrated) or incorrect, which may be generated by the training software based on the evaluator's case selection. Screen shot also shows, at field 3007, data pertaining to the palpations performed on the simulated patient by the trainee. For example, field 3007 shows an image of the patient 3008 overlaid by a representation of the region 3009 of the patient's body that was available to the trainee for palpation, e.g., the area of the surface layer of abdominal simulator 1900. The region 3009 available for palpation may be, e.g., color-coded or otherwise-coded to indicate, e.g., the locations that the trainee palpated, the locations that the trainee did not palpate, the locations that the trainee palpated too forcefully/too deeply, the locations that the trainee palpated too gently/too superficially, the locations that the trainee palpated properly, etc. (In FIG. 30, the different colors are represented by different kinds of shading, hatching or the like.) Alternate ways of presenting this information either graphically or textually may be used. Screen shot 3000 may also provide a marker 3010 within region 3009 to indicate the location of the pathological organ, symptom, etc. that was selected by the evaluator and simulated by the patient simulator.

Figure 13:
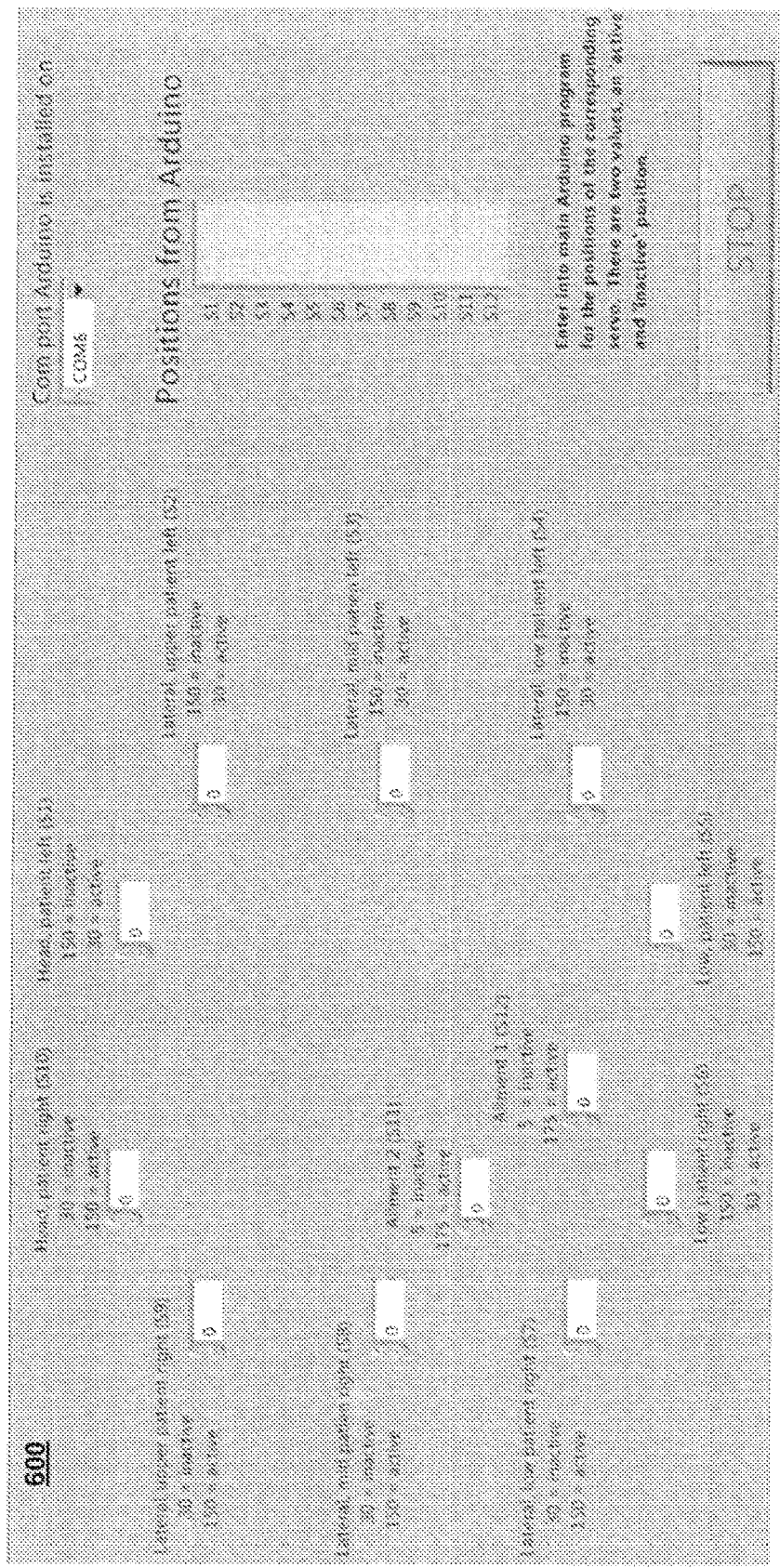
FIG. 13 illustrates an exemplary graphical user interface of a terminal that is coupled to the first embodiment abdominal simulator of FIG. 1.

It will be understood that aspects of FIGS. 28-30 may be combined with aspects of FIGS. 13-15 to generate variations on the illustrated screenshots.

It will be understood that a patient simulator as described herein need not include all of the functional components described herein, but may include any one or more of them. For example, a patient simulator may simulate any one or more anatomical features (e.g., skin, bones, muscle, organs, etc.), any one or more physiological features/responses/sensations (e.g., tenderness, guarding, pushback, normal sensation of tension, etc.), etc.

The following is a description of an exemplary computer system useful for carrying out functionality of one or more embodiments described herein. Such a computer system may be part of a patient simulator (e.g., abdominal simulator 1900) or may be operated in conjunction therewith. Part or all of such a computer system may form, be included in, or operate in conjunction with, a control portion such as control portion 150.

Such a computer system includes at least one processor, which may be a programmable control device that may be programmed to perform steps or processes described herein. Such a processor may be referred to as a central processing unit (CPU) and may be implemented as one or more CPU and/or GPU (Graphics Processing Unit) chips. The processor is in communication with the functional portions of the patient simulator, with network connectivity (or network interface) devices, with input/output (I/O) devices, and with a non-transitory machine-readable medium, which may be a non-transitory computer-readable medium.

The network connectivity or network interface devices may include modems, modem banks, Ethernet cards, universal serial bus (USB) cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network devices. These network connectivity/interface devices may enable the processor to communicate with the Internet or one or more intranets or other communication networks. With such a network connection, the processor may transmit information to and receive information from other entities (including the functional portions of patient simulator), via the network, in the course of performing steps or processes disclosed herein.

The I/O devices may include printers, monitors, displays, speakers, speech synthesizers, touch screens, keyboards, keypads, switches, dials, mice, microphones, voice recognition devices, card readers, tape readers, or other input or output devices.

The machine-readable medium may comprise memory devices including secondary storage, read only memory (ROM), and random access memory (RAM). The secondary storage may include any form of optical or magnetic storage including solid-state storage, such as magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices. The secondary storage may be used for non-volatile storage of data and may be used as an over-flow data storage device if the RAM is not large enough to hold all working data. The secondary storage may be used to store instructions or programs that are loaded into the RAM when such instructions or programs are selected for execution. Execution of such instructions and programs cause the processor to perform any of the steps or processes described in this disclosure. The ROM may also be used to store instructions or programs and may be used to store data to be read by the processor during program execution. The ROM is a non-volatile memory device which typically has a small memory capacity relative to the larger memory capacity of the secondary storage. The RAM is used to store volatile data and may also be used to store programs or instructions. Access to both the ROM and the RAM is typically faster than to the secondary storage.

The processor executes codes, computer programs, and scripts that it accesses from secondary storage, the ROM, the RAM, or the network connectivity/interface devices. The terms "logic" and "module" as referred to herein relate to structure for performing one or more logical operations. For example, a module may comprise circuitry which provides one or more output signals based upon one or more input signals. Such circuitry may comprise a finite state machine that receives a digital input and provides a digital output, or circuitry which provides one or more analog output signals in response to one or more analog input signals. Such circuitry may be provided in an application specific integrated circuit (ASIC) or field programmable gate array (FPGA). Also, a module may comprise machine-readable instructions stored in a memory in combination with processing circuitry to execute such machine-readable instructions. However, these are merely examples of structures which may provide logic, and embodiments disclosed herein are not limited in this respect. Also, items such as applications, modules, components, etc. may be implemented as software constructs stored in a machine-readable storage medium, and those constructs may take the form of applications, programs, subroutines, instructions, objects, methods, classes, or any other suitable form of control logic. Steps or processes described herein may thus be performed by software, hardware, firmware, or any combination of one or more of these.

The computer system may include a server and one or more user interface devices, which may be client devices. As suggested by the server-client configuration, the system may be used to interface with a number of users, e.g., to instruct a number of trainees operating on different patient simulators.

The communication network(s) may include any one or more of a wired network, a wireless network (e.g., Wi-Fi network or cellular network), and facilities for data transmittal over telecommunications networks and services, and the network interface may include appropriate corresponding interfaces. Communication over the communication network(s) may occur in real-time when network connectivity is available. Alternatively, or when network connectivity is not available for immediate transmission, the data for transmission over the network may be stored locally in memory/storage and transmitted at a later time.

Memory/storage may also include one or more databases, which may be used to store, e.g., training data and/or generated output data.

Description of an exemplary computer system useful for implementing a user interface, according some embodiments, is now provided. According to some embodiments, the user interface device may be implemented using the same computer as used to control the patient simulator. However, the user interface may also be implemented by one or more separate computer devices.

A user interface device may include the following components: a processor, a memory, secondary storage, an input device, an output/display device, and a network interface (for each of these components, the user interface device may include one or more of the given component, e.g., one or more input devices, one or more output/display devices, etc.). A general description of these elements of the user interface device has been provided by the immediately preceding description of the same or analogous/similar elements of the exemplary computer system. Software applications may be loaded into the memory. Such software applications may include a software application for implementing a user interface described above, which is defined in part by the screenshots described above. In the above-described user interface, the screenshots may be displayed on the output/display device, and the user may interact with the user interface device via the input device(s). Input devices that may be provided on the user interface device to facilitate such interactions may include a keyboard, a stylus, a touchscreen, etc. The network interface is configured for enabling the user to communicate with (e.g., transmit information to and receive information from) other elements of the system and entities external to the system, via a communication network. Entities external to the system may include, e.g., evaluator users training the trainees.

The user interface device may be a mobile (e.g., client) device or a web (e.g., client) device. Mobile devices are electronic devices that are portable or mobile and include, e.g., mobile phones, such as smartphones (e.g., iPhones™, Android™ phones, Windows™ phones, BlackBerry™ smartphones), tablets (e.g., iPads™, Android™, Microsoft Surface™ tablets), etc. Web devices are electronic devices that are not considered (as) portable or mobile as mobile devices and include, e.g., personal computers, such as laptop and desktop computers, etc. As discussed, the user interface device may (but need not) be remote from other elements of the system.

After reading the description presented herein, it will become apparent to a person skilled in the relevant arts how to implement embodiments disclosed herein using computer systems/architectures and communication networks other than those described herein.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A system for simulating a patient, the system comprising:
   a body portion that simulates at least an abdomen of the patient, the body portion comprising:
   a skin layer that simulates skin of the patient,
   a sensor layer positioned beneath the skin layer, the sensor layer being configured to sense an abdominal palpitation performed by a user,
   a muscle layer positioned beneath the sensor layer that simulates abdominal muscles of the patient, the muscle layer being actuatable to simulate tensing of the abdominal muscles, and
   at least one ailment module positioned beneath the muscle layer, the ailment module being configured to simulate an organ of the patient, wherein the ailment module includes a displaceable head against which the user can press during the abdominal palpitation, wherein the head is configured to provide resistance to the user's press as it is displaced to simulate an ailment of the organ.

2. The system of claim 1, wherein the body portion simulates a torso of the patient.

3. The system of claim 2, wherein the body portion further includes a bone layer positioned under the skin layer that simulates bones of the patient.

4. The system of claim 1, wherein the sensor layer is configured to sense both a location and an intensity of the abdominal palpitation.

5. The system of claim 1, wherein the muscle layer comprises a fabric layer and one or more muscle layer actuators configured to tighten the fabric layer to simulate the tensing of the abdominal muscles.

6. The system of claim 5, wherein discrete portions of the fabric layer can be tightened to simulate the tensing of discrete abdominal muscles positioned near an ailing organ.

7. The system of claim 1, wherein the muscle layer comprises bladders that can be inflated to simulate the tensing of the abdominal muscles.

8. The system of claim 7, wherein discrete bladders of the muscle layer can be individually inflated to simulate the tensing of discrete abdominal muscles positioned near an ailing organ.

9. The system of claim 1, wherein the resistance provided by the head is provided by a spring associated with the head.

10. The system of claim 1, wherein the resistance provided by the head increases with increasing displacement of the head.

11. The system of claim 1, wherein the ailment module further comprises an ailment module actuator configured to position the head in an extended position in which the head is placed relatively close to the muscle layer or a retracted position in which the head is placed relatively far from the muscle layer, wherein the head is placed in the extended position to simulate an ailment of an organ.

12. The system of claim 11, wherein the ailment module further comprises a sensor configured to sense a position of the head.

13. The system of claim 12, further comprising a control portion configured to receive signals from the sensor layer and the ailment module sensor and to control actuation of the muscle layer and the ailment module actuator.

14. The system of claim 1, wherein the body portion comprises multiple ailment modules positioned in various locations within the body portion, each ailment module simulating a different organ of the patient.

15. The system of claim 1, wherein the ailment module is displaceable within the body portion such that it can be moved to different positions to simulate different organs of the patient.

16. The system of claim 15, wherein the body portion comprises only one ailment module.

17. The system of claim 1, wherein the ailment module comprises multiple heads that can be alternatively placed in a position in which the head can be pressed by the user during the abdominal palpitation.

18. The system of claim 1, further comprising a tensing layer that simulates a peritoneal lining of the patient.

19. The system of claim 18, wherein the tensing layer comprises a fabric layer and a motor configured to tighten the fabric layer.

20. A method for providing medical training, the method comprising:
 providing a body portion that simulates at least an abdomen of a patient, the body portion including a skin layer that simulates skin of the patient;
 actuating a muscle layer of the body portion positioned below the skin layer to simulate tensing of abdominal muscles of the patient in a location of an ailing organ of the patient;
 receiving a pressing touch of a user against the skin layer that simulates abdominal palpation of the patient;
 sensing a location and intensity of the pressing touch using a sensor layer of the body portion positioned beneath the skin layer; and
 enabling a head of an ailment module of the body portion positioned below the muscle layer to be displaced downward in response to the pressing touch of the user, the head providing resistance to the pressing touch to simulate the ailing organ of the patient.

* * * * *